United States Patent
Ezaki et al.

(10) Patent No.: US 10,119,462 B2
(45) Date of Patent: Nov. 6, 2018

(54) VARIABLE LENGTH CONNECTING ROD AND VARIABLE COMPRESSION RATIO INTERNAL COMBUSTION ENGINE

(71) Applicant: TOYOTA JIDOSHA KABUSHIKI KAISHA, Toyota-shi, Aichi-ken (JP)

(72) Inventors: Shuichi Ezaki, Susono (JP); Yoshiro Kamo, Kanagawa-ken (JP); Akio Kidooka, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 139 days.

(21) Appl. No.: 15/441,815

(22) Filed: Feb. 24, 2017

(65) Prior Publication Data

US 2017/0248074 A1    Aug. 31, 2017

(30) Foreign Application Priority Data

Feb. 29, 2016 (JP) ................. 2016-037567

(51) Int. Cl.
*F02B 75/04* (2006.01)
*F16C 7/06* (2006.01)
*F02D 15/02* (2006.01)

(52) U.S. Cl.
CPC ............ *F02B 75/045* (2013.01); *F02D 15/02* (2013.01); *F16C 7/06* (2013.01); *F16C 2360/22* (2013.01)

(58) Field of Classification Search
CPC .......... F02B 75/045; F02D 15/02; F16C 7/06; F16C 2360/22
USPC ............................................ 123/48 B, 197.3
See application file for complete search history.

(56) References Cited

U.S. PATENT DOCUMENTS

| 7,789,050 B2* | 9/2010 | Marchisseau | F02B 75/045 123/48 B |
| 9,677,469 B2* | 6/2017 | Wittek | F02B 75/045 |
| 2013/0247879 A1* | 9/2013 | von Mayenburg | F02B 75/045 123/48 B |
| 2015/0059683 A1* | 3/2015 | Schulze | F02B 75/045 123/197.3 |
| 2015/0152794 A1* | 6/2015 | Paul | F02D 15/02 123/48 R |

(Continued)

FOREIGN PATENT DOCUMENTS

| DE | 102012014917 A1 | 2/2013 |
| JP | 2011-196549 A | 10/2011 |
| WO | 2014/019683 A1 | 2/2014 |

*Primary Examiner* — Marguerite McMahon
(74) *Attorney, Agent, or Firm* — Hunton Andrews Kurth LLP

(57) ABSTRACT

A variable length connecting rod comprises a connecting rod body, an eccentric member, a hydraulic cylinder, a hydraulic piston, a check valve, a switching mechanism and a hydraulic mechanism. The check valve permits a flow of hydraulic oil from a primary side of the check valve to a secondary side of the check valve and prohibits the flow from the secondary side to the primary side. The switching mechanism comprises a single switching pin. The connecting rod body is formed with first to fourth oil paths. The switching pin is switched between a first position making the first oil path communicate with the fourth oil path and making the second oil path communicate with the third oil path, and a second position making the first oil path communicate with the third oil path and making the second oil path communicate with the fourth oil path.

15 Claims, 39 Drawing Sheets

(56) References Cited

U.S. PATENT DOCUMENTS

2015/0260094 A1 9/2015 Wittek
2016/0177997 A1* 6/2016 Ezaki ..................... F16C 7/06
                                                                             123/48 B \* cited by examiner

VARIABLE LENGTH CONNECTING ROD AND VARIABLE COMPRESSION RATIO INTERNAL COMBUSTION ENGINE

CROSS-REFERENCE TO RELATED APPLICATION

The present application claims priority to Japanese Patent Application No. 2016-037567 filed on Feb. 29, 2016, which is incorporated herein by reference in its entirety.

TECHNICAL FIELD

The present invention relates to a variable length connecting rod, and a variable compression ratio internal combustion engine comprising a variable length connecting rod.

BACKGROUND ART

Known in the past has been an internal combustion engine comprising a variable compression ratio mechanism which can change a mechanical compression ratio of the internal combustion engine. As such a variable compression ratio mechanism, various mechanisms have been proposed. As one among these, one which can change the effective length of a connecting rod used in the internal combustion engine may be mentioned (for example, PTLs 1 and 2). In this regard, the "effective length of a connecting rod" means the length between a center of a crank receiving opening which receives a crank pin and a center of a piston pin receiving opening which receives a piston pin. Therefore, if the effective length of a connecting rod becomes longer, a combustion chamber volume when the piston is at top dead center of the compression stroke becomes smaller, and therefore the mechanical compression ratio increases. On the other hand, if the effective length of a connecting rod becomes shorter, the combustion chamber volume when the piston is at top dead center of the compression stroke becomes larger, and therefore the mechanical compression ratio falls.

As a variable length connecting rod which can be changed in effective length, known is one which is provided with a connecting rod body with a small diameter end part on which an eccentric member (eccentric arm or eccentric sleeve), which can turn with respect to the connecting rod body, is provided (for example, PTLs 1 and 2). The eccentric member has a piston pin receiving opening which receives the piston pin. This piston pin receiving opening is provided so as to offset with respect to a turning axis of the eccentric member. In such a variable length connecting rod, if changing the turning position of the eccentric member, the effective length of the connecting rod can be changed accordingly.

In the variable length connecting rod described in PLTs 1 and 2, the effective length of the connecting rod is changed by using a hydraulic piston mechanism provided at the connecting rod body to turn an eccentric member. In such a variable length connecting rod, the flow of hydraulic oil to the hydraulic piston mechanism is switched so as to control the turning of the eccentric member. For example, in the variable length connecting rod described in PLT 1, a single switching pin and two check valves are used to switch the flow of hydraulic oil to the hydraulic piston mechanism.

CITATION LIST

Patent Literature

PLT 1. International Publication WO No. 2014/019683A
PLT 2. Japanese Patent Publication No. 2011-196549A

SUMMARY OF INVENTION

Technical Problem

However, to lower the manufacturing cost of variable length connecting rods and improve the reliability of variable length connecting rods, it is preferable to simplify the mechanism for switching the flow of hydraulic oil to the hydraulic piston mechanism as much as possible.

Therefore, in view of the above problem, an object of the present invention is to provide a variable length connecting rod comprising a hydraulic piston mechanism wherein the mechanism for switching the flow of hydraulic oil to the hydraulic piston mechanism is made simple.

Solution to Problem

In order to solve the above problem, in a first aspect, there is provided a variable length connecting rod comprising: a connecting rod body provided with a crank receiving opening for receiving a crank pin; an eccentric member provided with a piston pin receiving opening for receiving a piston pin and attached to the connecting rod body to be able to turn so as to make a length between a center of the piston pin receiving opening and a center of the crank receiving opening change; a hydraulic cylinder formed at the connecting rod body and supplied with hydraulic oil; a hydraulic piston sliding inside the hydraulic cylinder and moving in linkage with the eccentric member; a flow direction switching mechanism provided at the connecting rod body; and a hydraulic mechanism handling the hydraulic oil separate from the hydraulic cylinder, the hydraulic piston, and the flow direction switching mechanism, wherein the flow direction switching mechanism comprises a single check valve and a single switching mechanism, the check valve is configured to permit a flow of hydraulic oil from a primary side of the check valve to a secondary side of the check valve and prohibit the flow of hydraulic oil from the secondary side to the primary side, the switching mechanism comprises a single switching pin, the switching pin is held in a pin holding space formed in the connecting rod body, the connecting rod body is formed with a first oil path making the hydraulic cylinder and the pin holding space communicate, a second oil path making the hydraulic mechanism or the hydraulic mechanism and an outside space of the variable length connecting rod, and the pin holding space communicate, a third oil path making the primary side of the check valve and the pin holding space communicate, and a fourth oil path making the secondary side of the check valve and the pin holding space communicate, and the switching pin is configured to be switched between a first position making the first oil path communicate with the fourth oil path and making the second oil path communicate with the third oil path, and a second position making the first oil path communicate with the third oil path and making the second oil path communicate with the fourth oil path.

In a second aspect, the switching pin linearly moves when switched between the first position and the second position, in the first aspect.

In a third aspect, the switching pin moves in parallel with a center axial line of the crank receiving opening when switched between the first position and the second position, in the second aspect.

In a fourth aspect, the switching pin has a columnar shape and the switching mechanism further comprises a turn preventing member preventing the switching pin from turning in a circumferential direction, in the second or third aspect.

In a fifth aspect, the switching pin is switched between the first position and the second position by oil pressure supplied from outside of the connecting rod body, in any one of the first to fourth aspects.

In a sixth aspect, the hydraulic mechanism is a separate hydraulic cylinder formed at the connecting rod body and supplied with hydraulic oil, the variable length connecting rod further comprises a separate hydraulic piston sliding inside the separate hydraulic cylinder and moving in linkage with the eccentric member, and the second oil path is formed so as to make the separate hydraulic cylinder and the pin holding space communicate, in any one of the first to fifth aspects.

In a seventh aspect, the hydraulic mechanism is a storage chamber able to store hydraulic oil, and the second oil path is formed so as to make the storage chamber and the pin holding space communicate, in any one of the first to fifth aspects.

In an eighth aspect, the hydraulic mechanism is an oil pressure supply source arranged at an outside of the connecting rod body and supplying hydraulic oil to the hydraulic cylinder, the second oil path is a supply oil path for making the oil pressure supply source and the pin holding space communicate and a discharge oil path for making an outside space of the variable length connecting rod and the pin holding space communicate, and the switching pin is configured to be switched between a first position making the first oil path communicate with the fourth oil path and making the supply oil path communicate with the third oil path, and a second position making the first oil path communicate with the third oil path and making the discharge oil path communicate with the fourth oil path, in any one of the first to fifth aspects.

In a ninth aspect, the variable length connecting rod further comprises a backflow prevention mechanism arranged at the discharge oil path, and the backflow prevention mechanism is configured to permit movement of hydraulic oil from the flow direction switching mechanism to the outside space and prohibit movement of oil from the outside space to the flow direction switching mechanism when the switching pin is at the second position, in the first to eighth aspect.

In a tenth aspect, the number of the first oil path is one, in any one of the first to ninth aspects.

In an eleventh aspect, the number of the first oil path is one, and the number of the second oil path is one, in any one of the first to ninth aspects.

In a twelfth aspect, the first oil path is formed on the same straight line as the third oil path or the fourth oil path, in any one of the first to eleventh aspects.

In a thirteenth aspect, the first oil path is formed on the same straight line as the third oil path or the fourth oil path, and the second oil path is formed on the same straight line as the third oil path or the fourth oil path, in any one of the first to seventh aspects.

In a fourteenth aspect, the variable length connecting rod further comprises a stop device configured to switch a stop position of turning of the eccentric member in one direction to two stages by oil pressure supplied from an outside of the connecting rod body, in any one of the seventh to ninth aspects.

In a fifteenth aspect, there is provided a variable compression ratio internal combustion engine able to change a mechanical compression ratio, comprising a variable length connecting rod in any one of the first to fourteenth aspects, wherein the mechanical compression ratio is changed by changing a length between a center of the piston pin receiving opening and a center of the crank receiving opening by the variable length connecting rod.

ADVANTAGEOUS EFFECTS OF INVENTION

According to the present invention, there is provided a variable length connecting rod comprising a hydraulic piston mechanism wherein the mechanism for switching the flow of hydraulic oil to the hydraulic piston mechanism is made simple.

DESCRIPTION OF EMBODIMENTS

Below, an embodiment of the present invention will be explained in detail with reference to the drawings. Note that, in the following explanation, similar component elements will be assigned the same reference notations.

First Embodiment

First, referring to FIGS. 1-12, a variable length connecting rod according to a first embodiment of the present invention will be explained.

<Variable Compression Ratio Internal Combustion Engine>

Figure 1:
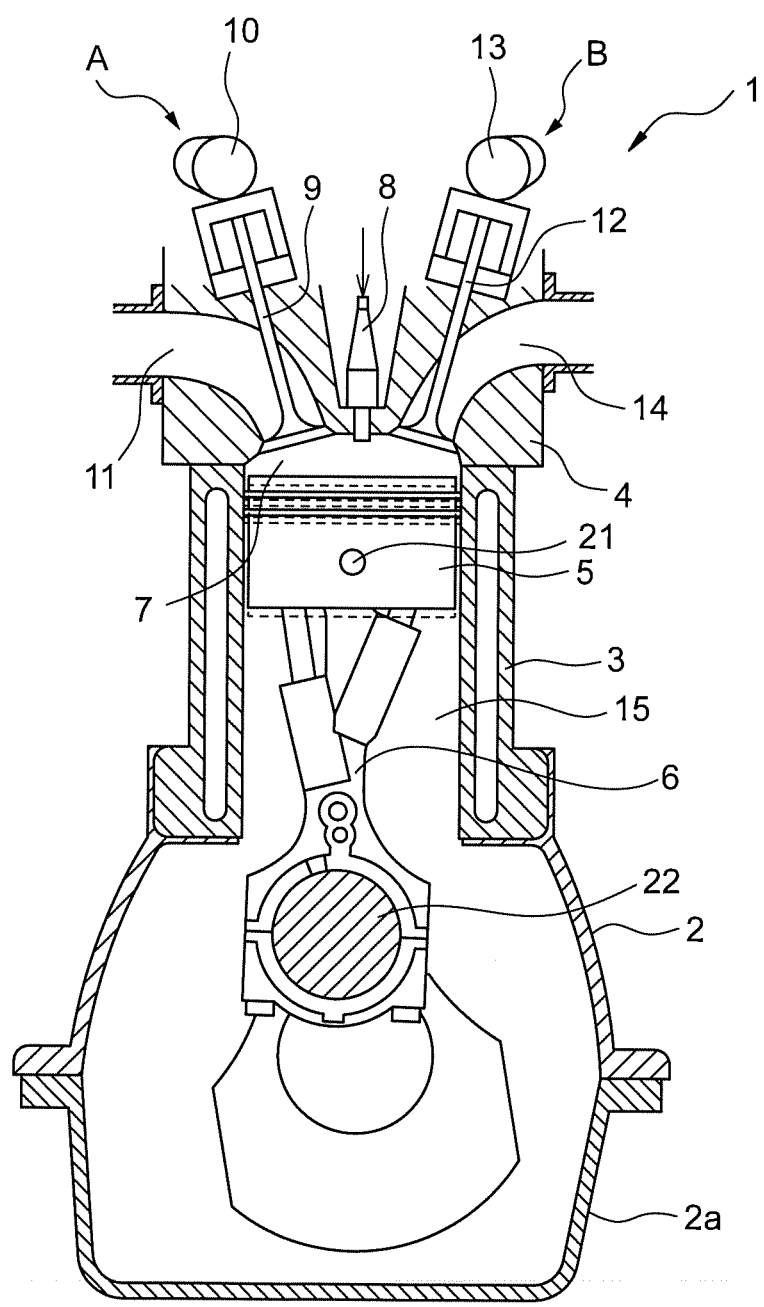
FIG. 1 is a schematic side cross-sectional view of a variable compression ratio internal combustion engine according to a first embodiment.

FIG. 1 is a schematic cross-sectional side view of a variable compression ratio internal combustion engine according to a first embodiment. Referring to FIG. 1, 1 indicates an internal combustion engine. The internal combustion engine 1 comprises a crankcase 2, cylinder block 3, cylinder head 4, piston 5, variable length connecting rod 6, combustion chamber 7, spark plug 8 arranged at the center of the top surface of the combustion chamber 7, intake valve 9, intake cam shaft 10, intake port 11, exhaust valve 12, exhaust cam shaft 13, and exhaust port 14. The cylinder block 3 defines a cylinder 15. The piston 5 slides inside the cylinder 15.

The variable length connecting rod 6 is connected at a small diameter end part thereof to the piston 5 via a piston pin 21, and is connected at a large diameter end part thereof to a crank pin 22 of the crankshaft. The variable length connecting rod 6, as explained later, can change the distance from the axis of the piston pin 21 to the axis of the crank pin 22, that is, the effective length.

If the effective length of the variable length connecting rod 6 becomes longer, the length from the crank pin 22 to the piston pin 21 is longer, and therefore as shown by the solid line in the figure, the volume of the combustion chamber 7 when the piston 5 is at top dead center is smaller. On the other hand, even if the effective length of the variable length connecting rod 6 changes, the stroke length of the piston 5 reciprocating in the cylinder does not change. Therefore, at this time, the mechanical compression ratio at the internal combustion engine 1 becomes higher.

On the other hand, if the effective length of the variable length connecting rod 6 is shorter, the length from the crank pin 22 to the piston pin 21 is shorter, and therefore as shown by the broken line in the figure, the volume of the combustion chamber when the piston 5 is at top dead center is larger. However, as explained above, the stroke length of the piston 5 is constant. Therefore, at this time, the mechanical compression ratio at the internal combustion engine 1 becomes lower.

<Configuration of Variable Length Connecting Rod>

Figure 2:
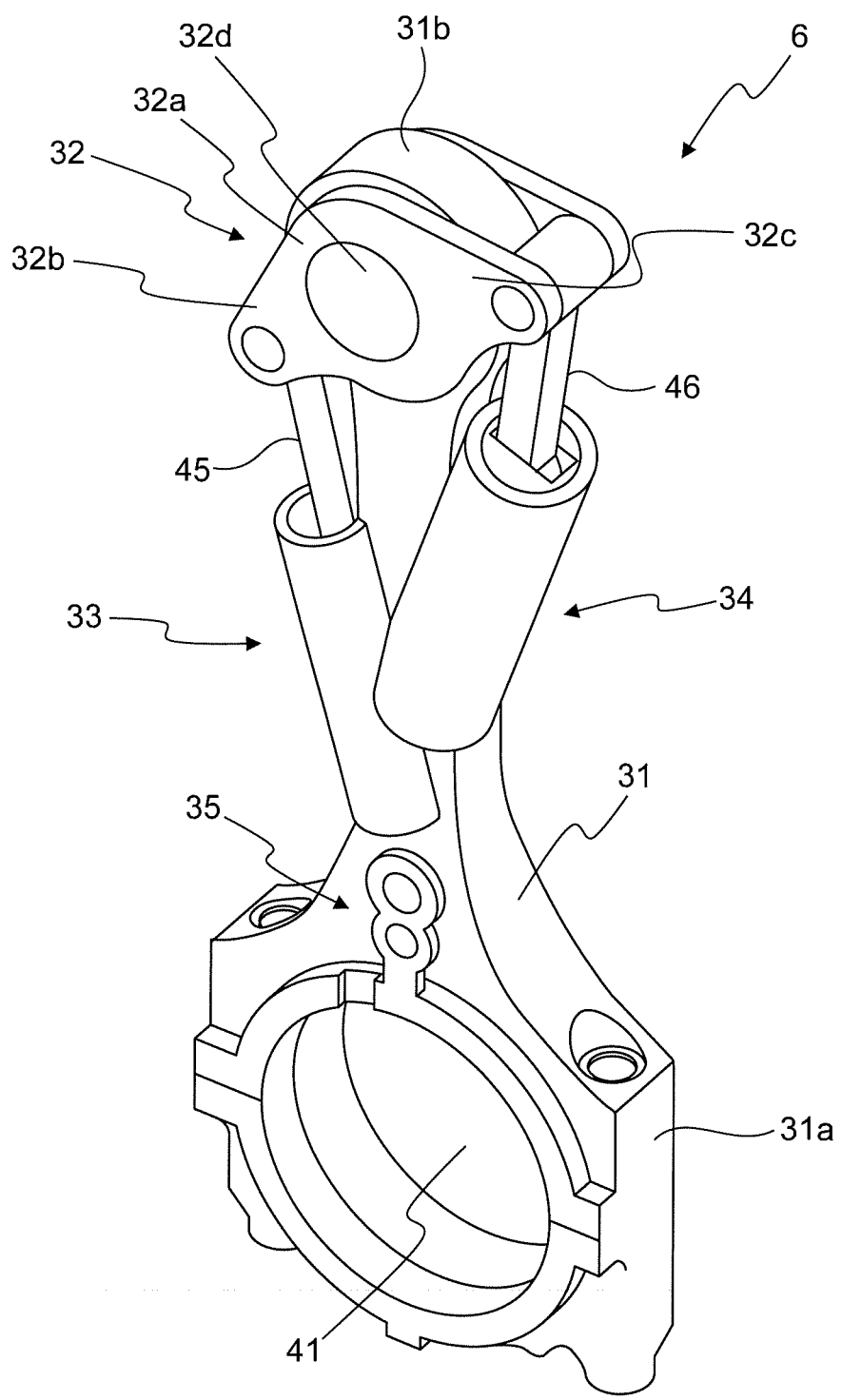
FIG. 2 is a perspective view schematically showing a variable length connecting rod according to the first embodiment.
Figure 3:
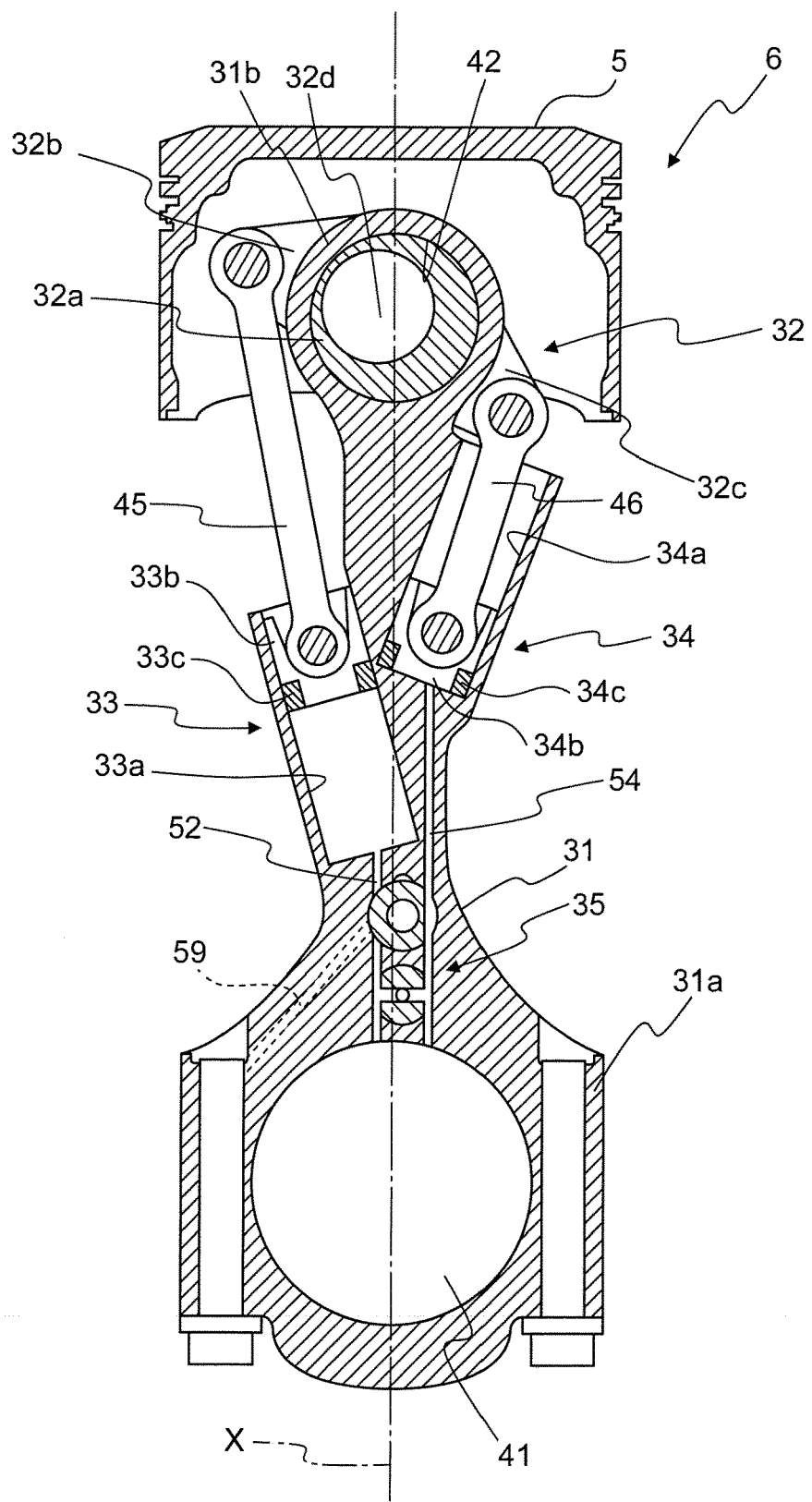
FIG. 3 is a side cross-sectional view schematically showing a variable length connecting rod according to the first embodiment.

FIG. 2 is a perspective view which schematically shows the variable length connecting rod 6 according to the first embodiment, while FIG. 3 is a cross-sectional side view which schematically shows a variable length connecting rod 6 according to the first embodiment. As shown in FIG. 2 and FIG. 3, the variable length connecting rod 6 comprises a connecting rod body 31, an eccentric member 32 which is attached to the connecting rod body 31 to be able to turn, a first hydraulic piston mechanism 33 and a second hydraulic piston mechanism 34 which are provided at the connecting rod body 31, a first connecting member 45 which connects the eccentric member 32 with the first hydraulic piston mechanism 33, a second connecting member 46 which connects the eccentric member 32 with the second hydraulic piston mechanism 34, and a flow direction switching mechanism 35 which switches the flow of hydraulic oil into the first hydraulic piston mechanism 33 and the second hydraulic piston mechanism 34.

<Connecting Rod Body>

First, the connecting rod body 31 will be explained. The connecting rod body 31 includes a large diameter end part 31a which is provided with a crank receiving opening 41 receiving the crank pin 22 of the crankshaft, and a small diameter end part 31b which is provided a sleeve receiving opening 42 receiving a later mentioned sleeve 32a of the eccentric member 32. The small diameter end part 31b is disposed at the piston 5 side and is positioned at the opposite side of the large diameter end part 31a. The crank receiving opening 41 is larger than the sleeve receiving opening 42, and therefore the end of the connecting rod body 31 of the side where the crank receiving opening 41 is provided, will be called the large diameter end part 31a, while the end of the connecting rod body 31 of the side where the sleeve receiving opening 42 is provided, will be called the small diameter end part 31b.

Further, in this Description, an axis X extending between a center axis of the crank receiving opening 41 (that is, the axis of the crank pin 22 received in the crank receiving opening 41) and a center axis of the sleeve receiving opening 42 (that is, the axis of the sleeve 32a received in the sleeve receiving opening 42) (FIG. 3), that is, the line passing through the center of the connecting rod body 31, will be called the "axis X of the connecting rod 6 and connecting rod body 31".

Further, the length of the connecting rod 6 in the direction perpendicular to the axis X of the connecting rod 6 and perpendicular to the center axis of the crank receiving opening 41 will be called the "width of the connecting rod 6". In addition, the length of the connecting rod 6 in the direction parallel to the center axis of the crank receiving opening 41 will be called the "thickness of the connecting rod 6". As will be understood from FIG. 2 and FIG. 3, the width of the connecting rod body 31 is narrowest at the intermediate part between the large diameter end part 31a and the small diameter end part 31b, except for the region at which the hydraulic piston mechanisms 33, 34 are provided. Further, the width of the large diameter end part 31a is larger than the width of the small diameter end part 31b. On the other hand, the thickness of the connecting rod body 31 is substantially a constant thickness, except for the region at which the hydraulic piston mechanisms 33, 34 are provided.

<Eccentric Member>

Figure 4:
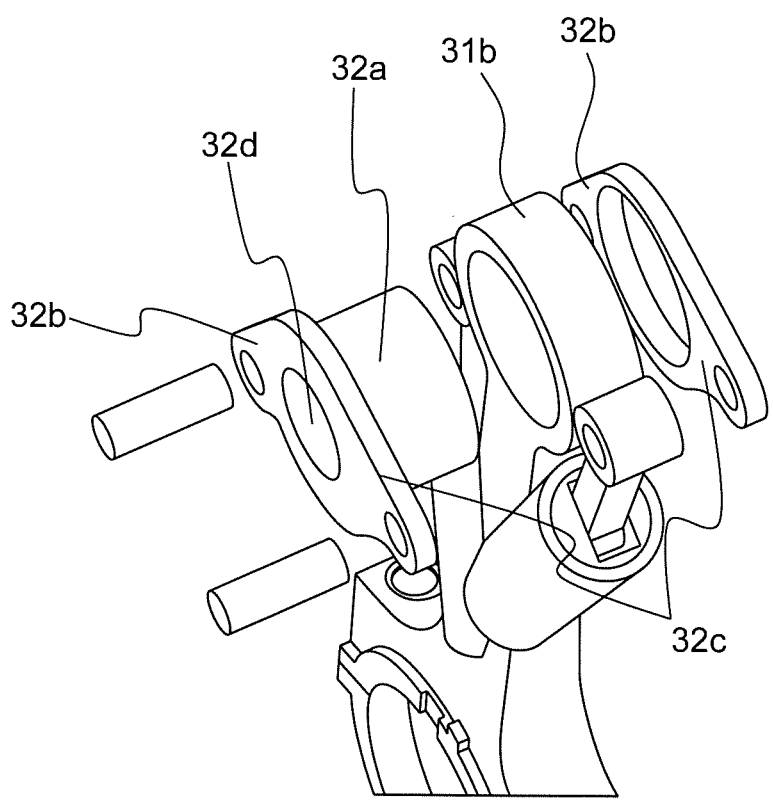
FIG. 4 is a schematic disassembled perspective view of the vicinity of the small diameter end part of the connecting rod body.

Next, the eccentric member 32 will be explained. FIG. 4 is a schematic perspective view of the vicinity of the small diameter end part 31b of the connecting rod body 31. In FIG. 4, the eccentric member 32 is shown in the disassembled state. Referring to FIG. 2 to FIG. 4, the eccentric member 32 comprises a cylindrically shaped sleeve 32a received inside the sleeve receiving opening 42 formed at the connecting rod body 31, a pair of first arms 32b extending from the sleeve 32a in one direction in the width direction of the connecting rod body 31, and a pair of second arms 32c extending from the sleeve 32a in the other direction in the width direction of the connecting rod body 31 (a generally opposite direction to the above one direction). The sleeve 32a can turn inside the sleeve receiving opening 42, so the eccentric member 32 is attached at the small diameter end part 31b of the connecting rod body 31 to be able to turn with respect to the connecting rod body 31 in a circumferential direction of the small diameter end part 31b. The turning axis of the eccentric member 32 matches with the center axis of the sleeve receiving opening 42.

Further, the sleeve 32a of the eccentric member 32 is provided with a piston pin receiving opening 32d for receiving the piston pin 21. This piston pin receiving opening 32d is formed in a cylindrical shape. The cylindrically shaped piston pin receiving opening 32d has an axis which is parallel to the center axis of the cylindrically shaped sleeve 32a, but is formed so as not to become coaxial. Therefore, the axial line of the piston pin receiving opening 32d is offset from the center axis of the cylindrically shaped outer shape of the sleeve 32a, that is, the turning axis of the eccentric member 32.

In this way, in the present embodiment, the center axis of the piston pin receiving opening 32d is offset from the turning axis of the eccentric member 32. For this reason, if the eccentric member 32 turns, the position of the piston pin receiving opening 32d inside the sleeve receiving opening 42 changes. When the position of the piston pin receiving opening 32d inside the sleeve member receiving opening 42 is at the large diameter end part 31a side, the effective length of the connecting rod becomes shorter. Conversely, when the position of the piston pin receiving opening 32d in the sleeve receiving opening 42 is at the opposite side to the large diameter end part 31a side, that is, is at the small diameter end part 31b side, the effective length of the connecting rod becomes longer. Therefore, according to the present embodiment, by making the eccentric member 32 turn, the effective length of the connecting rod 6 changes. That is, the eccentric member 32 is attached to the small diameter end part 31b of the connecting rod body 31 to be able to turn so as to change the effective length of the connecting rod 6.

<Hydraulic Piston Mechanism>

Next, referring to FIG. 3, a first hydraulic piston mechanism 33 will be explained. The first hydraulic piston mechanism 33 includes a first hydraulic cylinder 33a formed at the connecting rod body 31, a first hydraulic piston 33b sliding inside the first hydraulic cylinder 33a, and a first oil seal 33c sealing in the hydraulic oil supplied to the inside of the first hydraulic cylinder 33a. The first hydraulic cylinder 33a is arranged in almost its entirety or in its entirety at the first arm 32b side from the axial line X of the connecting rod 6. Further, the first hydraulic cylinder 33a extends tilted by a certain extent of angle from the axial line X so as to stick out to the outside of the connecting rod body 31 in the width direction the closer to the small diameter end part 31b.

The first hydraulic piston 33b is connected by the first connecting member 45 to the first arm 32b of the eccentric member 32. The first hydraulic piston 33b is connected by a pin to the first connecting member 45 to be able to turn. As shown in FIG. 4, the first arm 32b of the eccentric member 32 is connected by a pin to the first connecting member 45 to be able to turn at the end part at the opposite side to the side joined to the sleeve 32a. Therefore, the first hydraulic piston 33b moves linked with the eccentric member 32. The first oil seal 33c has a ring shape and is attached around the bottom end part of the first hydraulic piston 33b.

Next, the second hydraulic piston mechanism 34 will be explained. The second hydraulic piston mechanism 34 includes a second hydraulic cylinder 34a formed at the connecting rod body 31, a second hydraulic piston 34b sliding inside of the second hydraulic cylinder 34a, and a second oil seal 34c sealing in the hydraulic oil supplied to the inside of the second hydraulic cylinder 34a. The second hydraulic cylinder 34a is arranged in almost its entirety or in its entirety at the second arm 32c side from the axial line X of the connecting rod 6. Further, the second hydraulic cylinder 34a extends tilted by exactly a certain extent of angle with respect to the axial line X so that it sticks out to the outside of the connecting rod body 31 in the width direction the closer to the small diameter end part 31b.

The second hydraulic piston 34b is linked by the second connecting member 46 to the second arm 32c of the eccentric member 32. The second hydraulic piston 34b is linked by a pin to the second connecting member 46 to be able to turn. As shown in FIG. 4, the second arm 32c is connected by a pin to the second connecting member 46 to be able to turn at the end part at the opposite side to the side connected to the sleeve 32a. Therefore, the second hydraulic piston 34b moves linked with the eccentric member 32. The second oil seal 34c has a ring shape and is attached to the circumference of the bottom end part of the second hydraulic piston 34b.

<Flow Direction Switching Mechanism>

Figure 5:
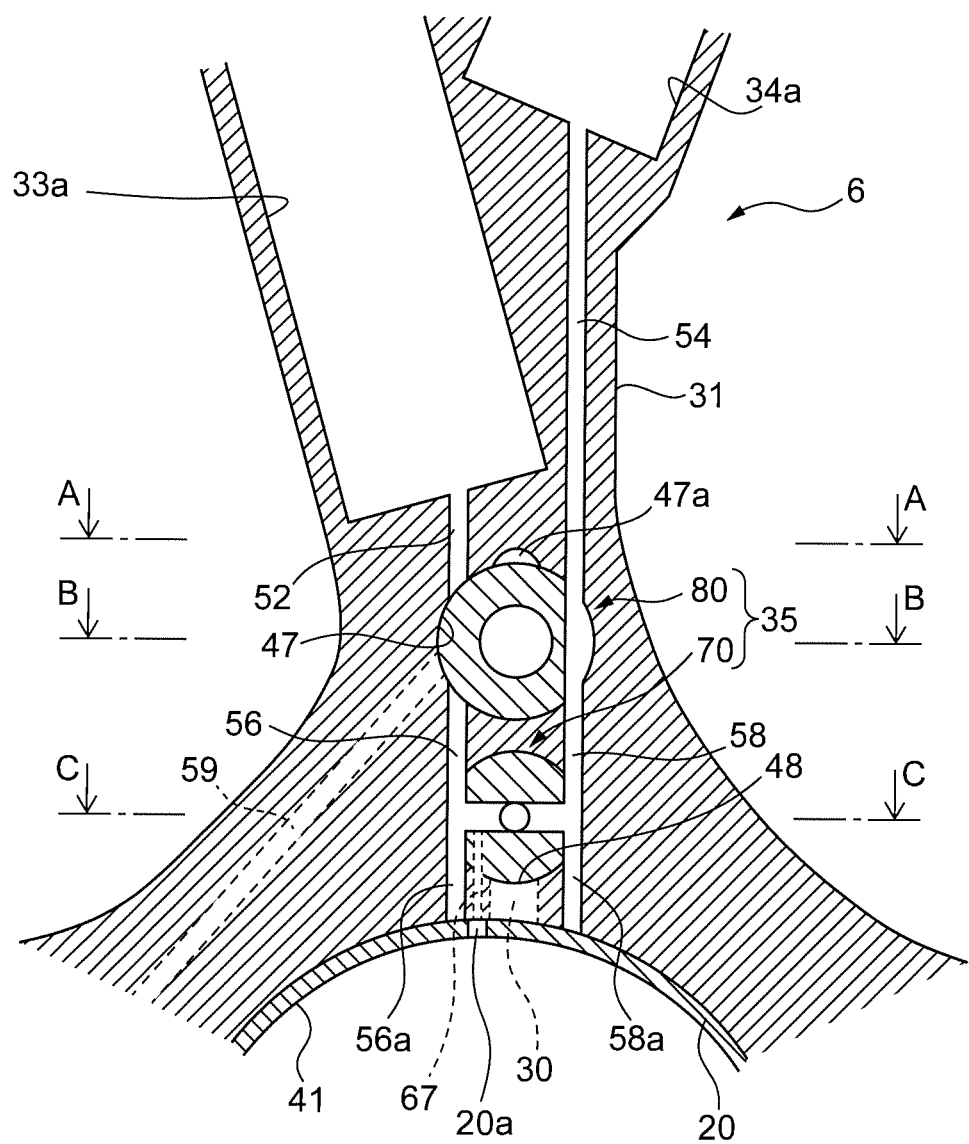
FIG. 5 is a side cross-sectional view of a variable length connecting rod enlarging the region in which the flow direction switching mechanism is provided.
Figure 6:
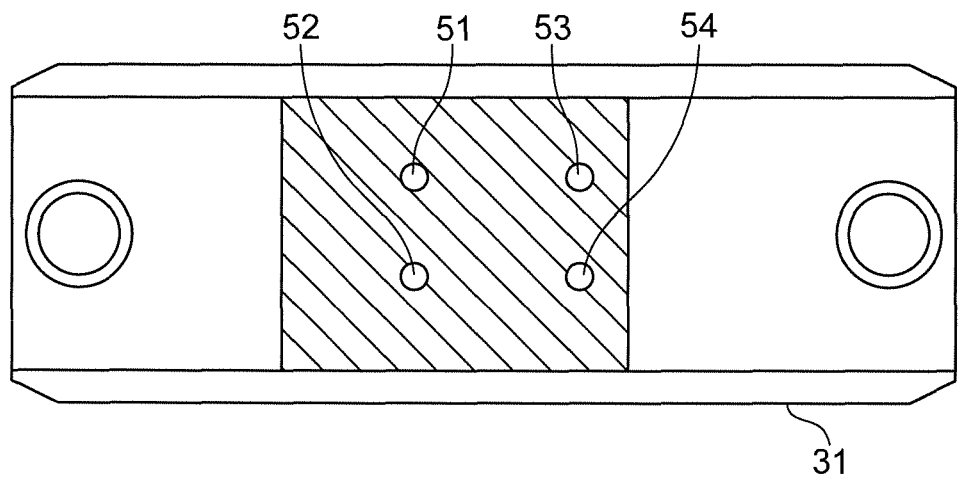
FIG. 6 is a cross-sectional view of a variable length connecting rod along the line A-A of FIG. 5.
Figure 7:
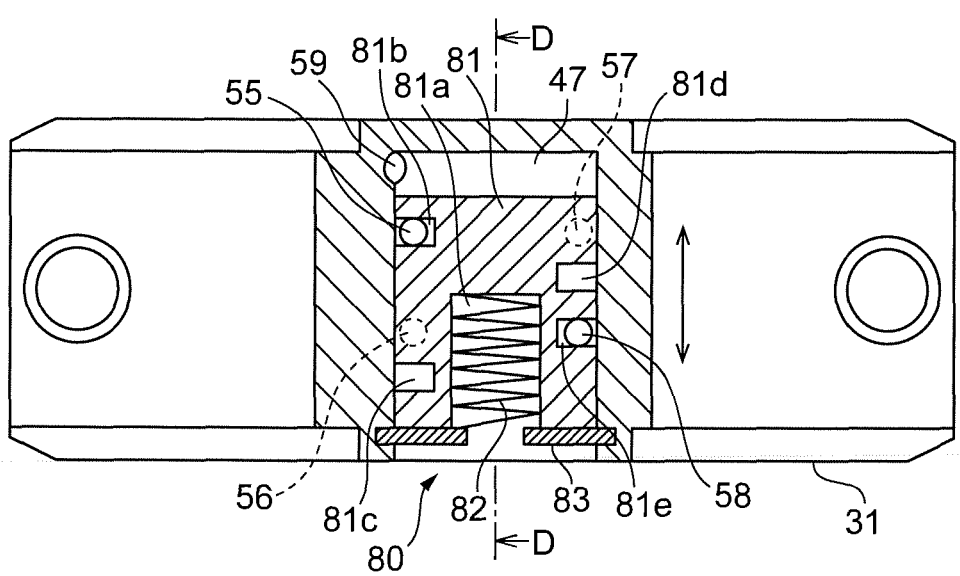
FIG. 7 is a cross-sectional view of a variable length connecting rod along the line B-B of FIG. 5.
Figure 8:
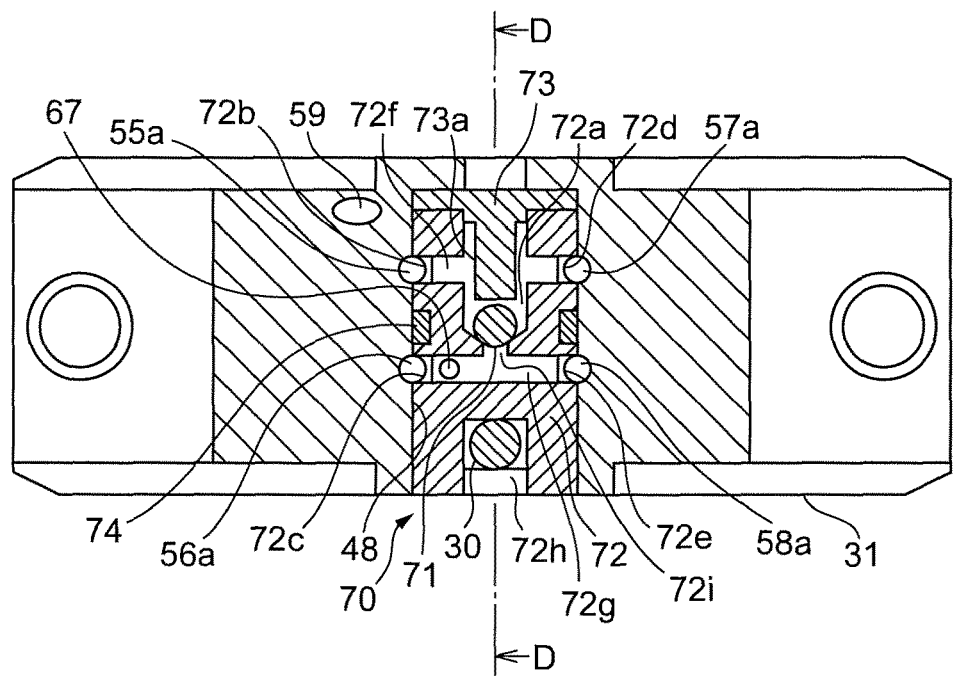
FIG. 8 is a cross-sectional view of a variable length connecting rod along the line C-C of FIG. 5.
Figure 9:
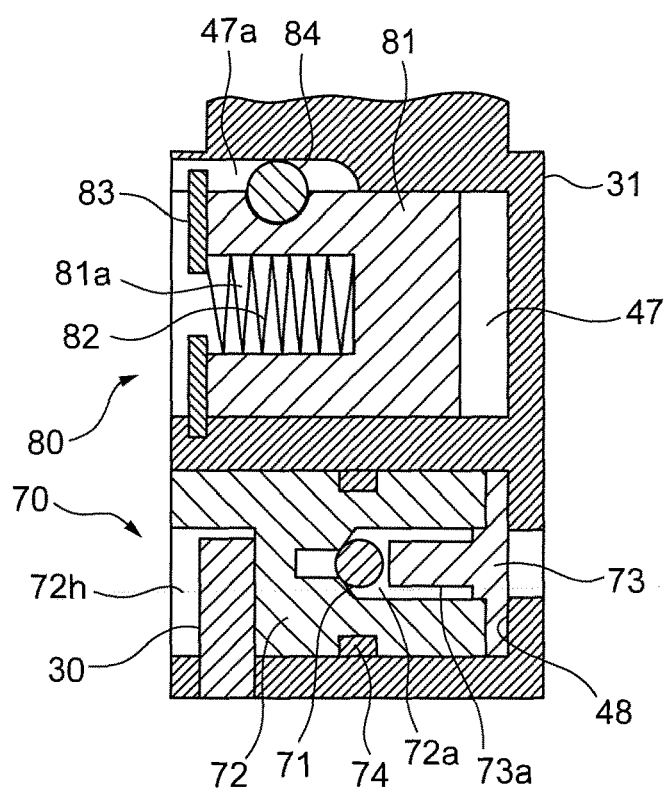
FIG. 9 is a partial cross-sectional view of a variable length connecting rod along the line D-D of FIG. 7 and FIG. 8.

Next, referring to FIG. 5 to FIG. 9, the configuration of the flow direction switching mechanism 35 will be explained. FIG. 5 is a side cross-sectional view of a variable length connecting rod 6 enlarging the region in which the flow direction switching mechanism 35 is provided. FIG. 6 is a cross-sectional view of the variable length connecting rod 6 along the line A-A of FIG. 5. FIG. 7 is a cross-sectional view of the variable length connecting rod 6 along the line B-B of FIG. 5. FIG. 8 is a cross-sectional view of the variable length connecting rod 6 along the line C-C of FIG. 5. FIG. 9 is a partial cross-sectional view of the variable length connecting rod 6 along the line D-D of FIG. 7 and FIG. 8. Note that, in FIG. 5, the first hydraulic piston 33b and second hydraulic piston 34b are omitted.

The flow direction switching mechanism 35 is provided at the connecting rod body 31. More specifically, the flow direction switching mechanism 35 is arranged between the first hydraulic cylinder 33a and second hydraulic cylinder 34a, and the crank receiving opening 41 in the axial line direction of the connecting rod body 31. The first hydraulic cylinder 33a and second hydraulic cylinder 34a are communicated with each other through the flow direction switching mechanism 35.

The flow direction switching mechanism 35 comprises a check valve 70 and a switching mechanism 80. In the present embodiment, the check valve 70 is arranged at the crank receiving opening 41 side from the switching mechanism 80 in the axial line direction of the connecting rod body 31. Further, the check valve 70 and switching mechanism 80 are arranged at the same position in the width direction of the connected rod body 31.

The switching mechanism 80 comprises a single switching pin 81, a first biasing spring 82 biasing the switching pin 81, and a first support member 83 supporting the first biasing spring 82. The switching pin 81, first biasing spring 82, and first support member 83 are held in a pin holding space 47 formed in the connecting rod body 31. In the present embodiment, the pin holding space 47 has a cylindrical shape and is formed so that its axial line extends in parallel with a center axial line of the crank receiving opening 41. The pin holding space 47, as shown in FIG. 7, is closed at one end part in the thickness direction of the connecting rod body 31 and is open at the other end part. The switching mechanism 80 is inserted into the pin holding space 47 from the open end part of the pin holding space 47 at the time of assembly of the variable length connecting rod 6.

The first biasing spring 82 is, for example, a coil spring and is held in a spring holding hole 81a formed in the switching pin 81. The first support member 83 is, for example, a C-ring, E-ring, or other snap ring and is arranged in a circumferential groove formed in the pin holding space 47. The first biasing spring 82 biases the switching pin 81 toward the closed end of the pin holding space 47 in a direction parallel to the center axial line of the crank receiving opening 41.

As explained later, the switching pin 81 is supplied with oil pressure from an oil pressure supply source at the outside of the connecting rod body 31. Due to the oil pressure supplied from the outside oil pressure supply source, the switching pin 81 is switched between a first position where it is separated from the closed end part of the pin holding space 47 and a second position where it abuts against the closed end part of the pin holding space 47. Specifically, the switching pin 81 moves against the biasing force of the first biasing spring 82 to the first position when the switching pin 81 is supplied with a predetermined pressure or more of oil pressure, and moves due to the biasing force of the first biasing spring 82 to the second position when the switching pin 81 is supplied with less than a predetermined pressure of oil pressure or the switching pin 81 is not being supplied with oil pressure. The switching pin 81 linearly moves in the direction of the arrow of FIG. 7 when switched between the first position and the second position. The direction of movement of the switching pin 81 is parallel with the center axial line of the crank receiving opening 41. Note that, in FIG. 7, the switching pin 81 is positioned at the first position.

The switching pin 81 has a columnar shape and is held in the pin holding space 47 so that its axial line matches with the axial line of the pin holding space 47. Therefore, the switching pin 81 extends with its axial line in parallel with the center axial line of the crank receiving opening 41. The switching pin 81 is formed with a first through hole 81b, second through hole 81c, third through hole 81d, and fourth through hole 81e so as to extend vertical to the axial line of the switching pin 81. The switching pin 81 is arranged in the pin holding space 47 by the later explained turn preventing member 84 so that the first through hole 81b to fourth through hole 81e extend in the axial line direction of the connecting rod body 31.

The first through hole 81b and second through hole 81c are separated from each other in the axial line direction of the switching pin 81 and are formed at the same position in the circumferential direction of the switching pin 81. The third through hole 81d and fourth through hole 81e are separated from each other in the axial line direction of the switching pin 81 and are formed at the same position in the circumferential direction of the switching pin 81. The first through hole 81b and second through hole 81c are separated from third through hole 81d and fourth through hole 81e in the axial line direction and circumferential direction of the switching pin 81.

The switching mechanism 80, as shown in FIG. 9, further comprises a turn preventing member 84 preventing turning of the switching pin 81 in the circumferential direction. In the present embodiment, the turn preventing member 84 is a spherical ball. The turn preventing member 84 is arranged in a recessed part formed in the switching pin 81 so as to be immovable in the circumferential direction of the switching pin 81. As shown in FIG. 5 and FIG. 9, the pin holding space 47 is formed with a sliding groove 47a having a semicircular shaped cross-section. The sliding groove 47a extends in parallel with the center axial line of the crank receiving opening 41.

If the switching pin 81 tries to turn in the circumferential direction, the turn preventing member 84 abuts against the surroundings of the sliding groove 47a, so turning of the switching pin 81 in the circumferential direction is prevented. On the one hand, the turn preventing member 84 can move along the sliding groove 47a together with the switching pin 81 in the axial line direction of the switching pin 81. Therefore, the turn preventing member 84 enables movement of the switching pin 81 in the axial line direction while preventing turning of the switching pin 81. As a result, when the switching pin 81 moves between the first position and the second position, it is possible to keep the direction of extension of the first through hole 81b to fourth through hole 81e from deviating from the axial line direction of the connecting rod body 31.

Note that, the configuration for preventing turning of the switching pin 81 in the circumferential direction is not limited to the above-mentioned configuration. For example, the turn preventing member 84 may have a rectangular parallelepiped shape while the sliding groove 47a may have a square shaped cross-section. Further, the turn preventing member 84 may be arranged in a recessed part formed in the wall surface defining the pin holding space 47 and the switching pin 81 may be formed with a sliding groove having a semicircular shaped cross-section and extending in an axial line direction of the switching pin 81. Further, the wall surface defining the pin holding space 47 may be formed with a projection projecting out in the axial line direction of the connecting rod body 31 and the switching pin 81 may be formed with a sliding groove receiving the projection of the pin holding space 47 and extending in the axial line direction of the switching pin 81. In this case, the projection of the pin holding space 47 functions as a turn preventing member. Further, the switching pin 81 and pin holding space 47 may have rectangular parallelepiped shapes. In this case, the switching pin 81 cannot turn inside the pin holding space 47 in the circumferential direction, so a turn preventing member is unnecessary.

The check valve 70 is held in a check valve holding space 48 formed in the connecting rod body 31. In the present embodiment, the check valve holding space 48 has a cylindrical shape and is formed so that its axial line extends in parallel with a center axial line of the crank receiving opening 41. Further, the check valve holding space 48 is formed at the crank receiving opening 41 side from the pin holding space 47 in the axial line direction of the connecting rod body 31. The check valve holding space 48, as shown in FIG. 8, opens at the both end parts in the thickness direction of the connecting rod body 31. The opening formed at one end part of the check valve holding space 48 (top side in FIG. 8) is smaller than the opening formed at the other end part of the check valve holding space 48 (bottom side in FIG. 8). The check valve 70 is inserted from the other end part of the check valve holding space 48 into the check valve holding space 48 at the time of assembly of the variable length connecting rod 6. The opening formed at the one end part functions as a discharge port for discharging the air from the check valve holding space 48 at the time of insertion of the check valve 70.

The check valve 70 comprises a valve element 71, a valve element holding member 72 for holding the valve element 71, and a valve element restricting member 73 for restricting the range of possible movement of the valve element 71. The valve element 71 is a spherical shaped ball and is held in a valve element holding hole 72a formed in the valve element holding member 72. The valve element restricting member 73 has a projecting part 73a projecting out inside the valve element holding hole 72a toward the valve element 71.

The valve element holding member 72 has a columnar shape and is held in the check valve holding space 48 so that its axial line matches the axial line of the check valve holding space 48. Therefore, the valve element holding member 72 extends with its axial line in parallel with the center axial line of the crank receiving opening 41. The valve element holding member 72 is formed with a fifth through hole 72b, sixth through hole 72c, seventh through hole 72d, and eighth through hole 72e so as to extend vertical to the axial line of the valve element holding member 72. The valve element holding member 72 is arranged in the check valve holding space 48 by the later explained fastening pin 30 so that the fifth through hole 72b to eighth through hole 72e extend in the axial line direction of the connecting rod body 31.

The fifth through hole 72b and sixth through hole 72c are separated from each other in the axial line direction of the valve element holding member 72 and are formed at the same position in the circumferential direction of the valve element holding member 72. The seventh through hole 72d and eighth through hole 72e are separated from each other in the axial line direction of the valve element holding member 72 and are formed at the same position in the circumferential direction of the valve element holding member 72. The fifth through hole 72b and seventh through hole 72d are separated from each other in the circumferential direction of the valve element holding member 72 and are formed at the same position in the axial line direction of the valve element holding member 72. The sixth through hole 72c and eighth through hole 72e are separated from each other in the circumferential direction of the valve element holding member 72 and are formed at the same position in the axial line direction of the valve element holding member 72.

Further, the valve element holding member 72 is formed with a first communicating path 72f making the fifth through hole 72b and seventh through hole 72d, and the valve element holding hole 72a communicate, and a second communicating path 72g making the sixth through hole 72c and the eighth through hole 72*e* communicate. The first communicating oil path 72*f* and second communicating oil path 72*g* are formed so as to extend vertical to the axial line of the valve element holding member 72 and direction of extension of the fifth through hole 72*b* to eighth through hole 72*e*. Further, between the valve element holding hole 72*a* and second communicating oil path 72*g*, a through hole 72*i* extending in the axial line direction of the valve element holding member 72 is formed.

When hydraulic oil is supplied from the second communicating oil path 72*g* to the valve element 71, the valve element 71 moves in a direction separating from the through hole 72*i* and opens the through hole 72*i*. As a result, the valve element 71 makes the second communicating oil path 72*g* and the valve element holding hole 72*a* communicate. At this time, if the valve element 71 abuts against the projecting part 73*a* of the valve element restricting member 73, movement of the valve element 71 is restricted. On the one hand, if hydraulic oil is supplied from the first communicating oil path 72*f* and valve element holding hole 72*a* to the valve element 71, the valve element 71 moves toward the through hole 72*i* to close the through hole 72*i* and cuts the communication between the valve element holding hole 72*a* and the second communicating oil path 72*g*. Therefore, the check valve 70 is configured to allow the flow of hydraulic oil from the primary side of the check valve 70 (in FIG. 8, the space at the bottom side from the valve element 71) to the secondary side of the check valve 70 (in FIG. 8, the space at the top side from the valve element 71) and to prohibit the flow of hydraulic oil from the secondary side of the check valve 70 to the primary side of the check valve 70. In the present embodiment, the primary side of the check valve 70 is the second communicating oil path 72*g*, while the secondary side of the check valve 70 is the valve element holding hole 72*a* and first communicating oil path 72*f*.

The check valve 70 further comprises a seal member 74. The seal member 74 is, for example, an O-ring and is arranged in a circumferential groove formed in the valve element holding member 72. The seal member 74 prevents the hydraulic oil from moving between the primary side and secondary side of the check valve 70 without going through the through hole 72*i*.

The variable length connecting rod 6 further comprises a fixing pin 30 for fixing the position of the valve element holding member 72 in the check valve holding space 48. The valve element holding member 72 is formed with a pin insertion hole 72*h* into which the fixing pin 30 is inserted. The pin insertion hole 72*h* extends in the direction of extension of the fifth through hole 72*b* to eighth through hole 72*e* and a direction perpendicular to the same. The fixing pin 30 is arranged in a through hole extending from the check valve holding space 48 to the crank receiving opening 41 in the axial line direction of the connecting rod body 31. Due to the fixing pin 30, movement of the valve element holding member 72 in the check valve holding space 48 is restricted. As a result, the direction of extension of the fifth through hole 72*b* to eighth through hole 72*e* is kept from deviating from the axial line direction of the connecting rod body 31. Note that, for reference, the fixing pin 30 is shown by the broken line in FIG. 5.

As will be understood from FIG. 5 and FIG. 6, inside the connecting rod body 31, a first piston communicating oil path 51 and second piston communicating oil path 52 for making the first hydraulic cylinder 33*a* and pin holding space 47 communicate and a third piston communicating oil path 53 and fourth piston communicating oil path 54 for making the second hydraulic cylinder 34*a* and pin holding space 47 communicate are formed. The first piston communicating oil path 51 to fourth piston communicating oil path 54 extend in the axial line direction of the connecting rod body 31.

The first piston communicating oil path 51 and the second piston communicating oil path 52 are separated from each other in the thickness direction of the connecting rod body 31 and are formed at the same position in the axial line direction and width direction of the connecting rod body 31. The third piston communicating oil path 53 and the fourth piston communicating oil path 54 are separated from each other in the thickness direction of the connecting rod body 31 and are formed at the same position in the axial line direction and width direction of the connecting rod body 31. The first piston communicating oil path 51 and the third piston communicating oil path 53 are separated from each other in the width direction of the connecting rod body 31 and are formed at the same position in the thickness direction of the connecting rod body 31. The second piston communicating oil path 52 and the fourth piston communicating oil path 54 are separated from each other in the width direction of the connecting rod body 31 and are formed at the same position in the thickness direction of the connecting rod body 31.

Further, as will be understood from FIG. 5 and FIG. 7, inside the connecting rod body 31, a first space communicating oil path 55, second space communicating oil path 56, third space communicating oil path 57, and fourth space communicating oil path 58, which are making the pin holding space 47 and the check valve holding space 48 communicate, are formed. The first space communicating oil path 55 to fourth space communicating oil path 58 extend in the axial line direction of the connecting rod body 31. The first space communicating oil path 55 is formed so as to communicate with the fifth through hole 72*b* of the valve element holding member 72, while the third space communicating oil path 57 is formed so as to communicate with the seventh through hole 72*d* of the valve element holding member 72. Therefore, the first space communicating oil path 55 and third space communicating oil path 57 make the secondary side of the check valve 70 and pin holding space 47 communicate. On the one hand, the second space communicating oil path 56 is formed so as to communicate with the sixth through hole 72*c* of the valve element holding member 72, while the fourth space communicating oil path 58 is formed so as to communicate with the eighth through hole 72*e* of the valve element holding member 72. Therefore, the second space communicating oil path 56 and fourth space communicating oil path 58 make the primary side of the check valve 70 and the pin holding space 47 communicate.

The first space communicating oil path 55 and the second space communicating oil path 56 are separated from each other in the thickness direction of the connecting rod body 31 and are formed at the same position in the axial line direction and width direction of the connecting rod body 31. The third space communicating oil path 57 and the fourth space communicating oil path 58 are separated from each other in the thickness direction of the connecting rod body 31 and are formed at the same position in the axial line direction and width direction of the connecting rod body 31. The first space communicating oil path 55 and the third space communicating oil path 57 are separated from each other in the width direction of the connecting rod body 31 and are formed at the same position in the axial line direction and thickness direction of the connecting rod body 31. The second space communicating oil path 56 and the fourth space communicating oil path 58 are separated from each other in the width direction of the connecting rod body 31 and are formed at the same position in the axial line direction and thickness direction of the connecting rod body 31.

As explained above, the oil paths 51 to 58 extend in the axial line direction of the connecting rod body 31. Further, the first piston communicating oil path 51 and the first space communicating oil path 55 are formed on the same straight line, the second piston communicating oil path 52 and the second space communicating oil path 56 are formed on the same straight line, the third piston communicating oil path 53 and third space communicating oil path 57 are formed on the same straight line, and the fourth piston communicating oil path 54 and fourth space communicating oil path 58 are formed on the same straight line. For this reason, the oil paths 51 to 58 can be easily formed by a cutting operation from the crank receiving opening 41 by a drill etc.

As a result, as shown in FIG. 5 and FIG. 8, at the crank receiving opening 41 side of the space communicating oil path 55 to 58, extended oil paths 55a to 58a coaxial with the space communicating oil paths are formed. The extended oil paths 55a to 58a are, for example, closed by bearing metal 20. Due to this, it is possible to easily close the extended oil paths 55a to 58a by just using bearing metal 20 to assemble the connecting rod 6 with the crank pin 22.

Further, inside the connecting rod body 31, an oil pressure supply path 59 for supplying oil pressure from an oil pressure supply source outside of the connecting rod body 31 to the switching pin 81 is formed. Note that, for reference, the oil pressure supply path 59 is shown by the broken lines in FIG. 3 and FIG. 5. As shown in FIG. 7, the oil pressure supply path 59 is communicated with the pin holding space 47 at the closed end part side of the pin holding space 47 in the thickness direction of the connecting rod body 31. The oil pressure supply path 59 is formed so as to communicate with the crank receiving opening 41 and is communicated with an oil pressure supply source outside of the connecting rod body 31 through an oil path (not shown) formed inside the crank pin 22.

Furthermore, inside of the connecting rod body 31, a refill-use oil path 67 for refilling hydraulic oil to the primary side of the check valve 70 is formed. Note that, for reference, the refill-use oil path 67 is shown by the broken line in FIG. 5. As shown in FIG. 8, one end part of the refill-use oil path 67 is communicated with the check valve holding space 48 at the primary side of the check valve 70. The other end part of the refill-use oil path 67 is communicated with the crank receiving opening 41. Further, the bearing metal 20 is formed with a through hole 20a matched with the refill-use oil path 67. The refill-use oil path 67 is communicated with the oil pressure supply source outside of the connecting rod body 31 through the through hole 20a and an oil path (not shown) formed inside the crank pin 22. Therefore, the refill-use oil path 67 causes the primary side of the check valve 70 to communicate with the oil pressure supply source constantly or periodically matched with rotation of the crankshaft. Note that, the position at which the refill-use oil path 67 communicates with the primary side of the check valve 70 may differ from the position shown in FIG. 8.

<Operation of Variable Length Connecting Rod>

Figure 10:
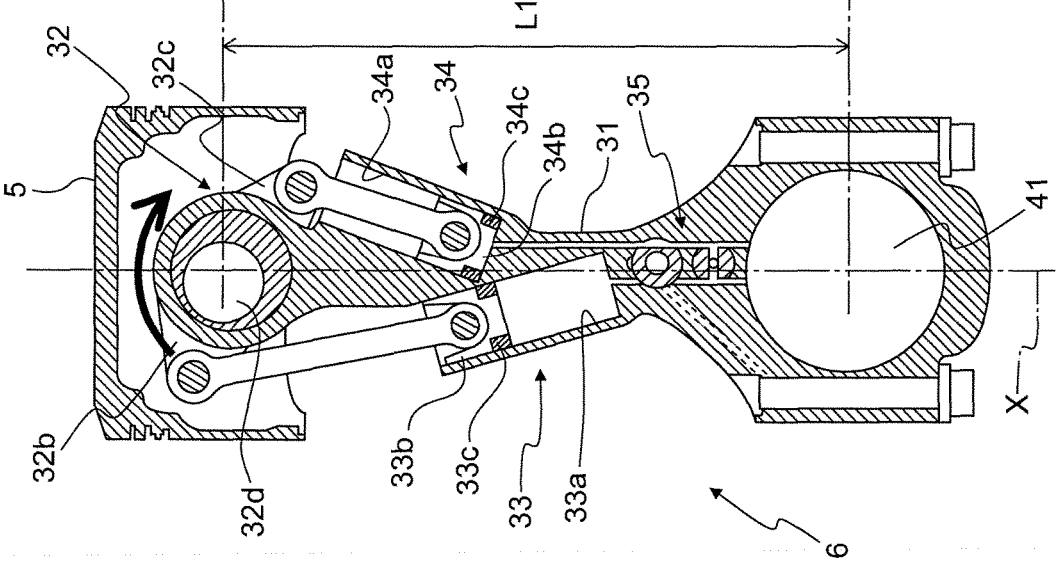
FIG. 10A is a side cross-sectional view schematically showing a variable length connecting rod according to the first embodiment.
FIG. 10B is a side cross-sectional view schematically showing a variable length connecting rod according to the first embodiment.
Figure 11:
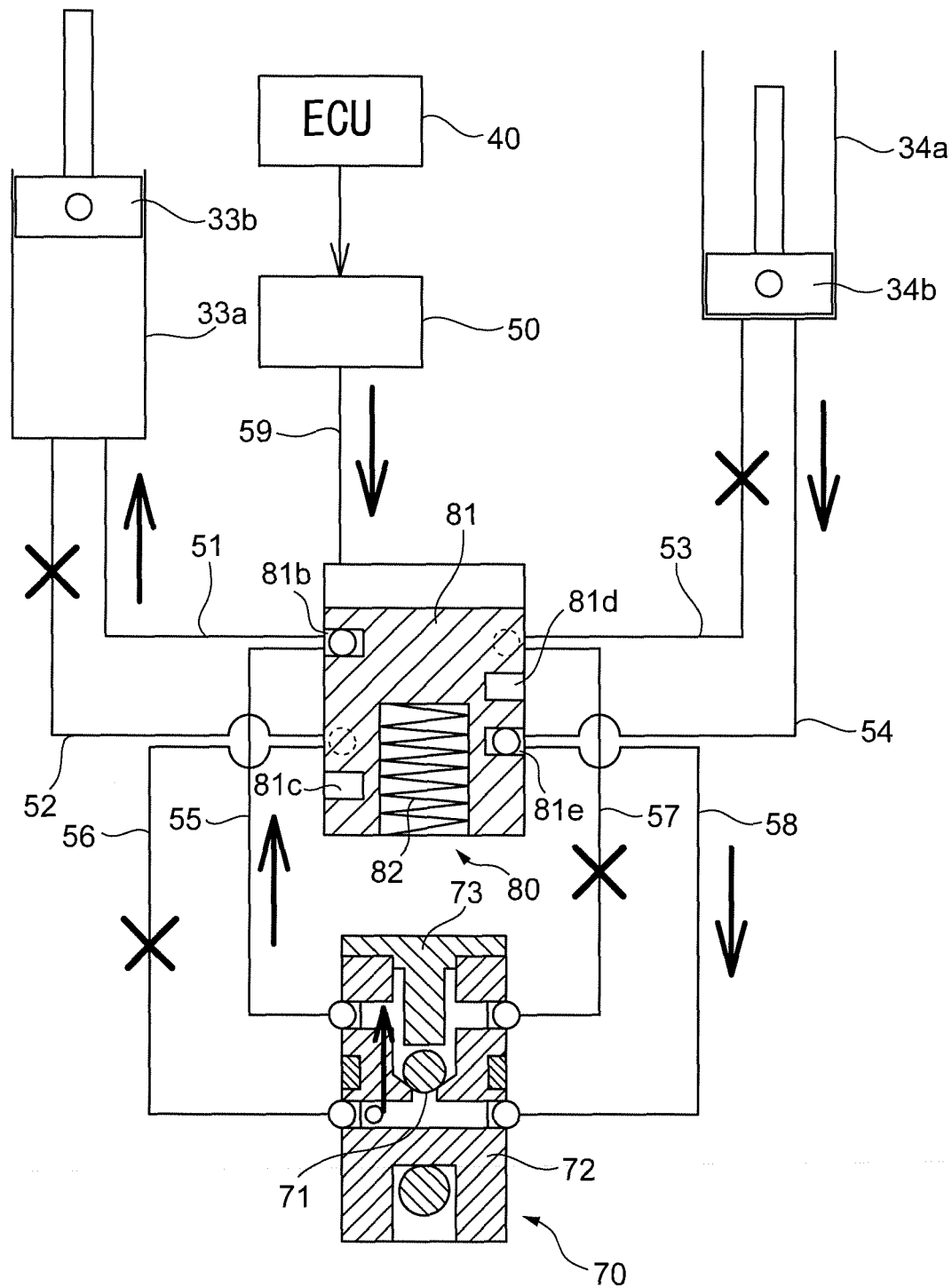
FIG. 11 is a schematic view explaining the flow of hydraulic oil when oil pressure is being supplied from an oil pressure supply source to a switching pin.
Figure 12:
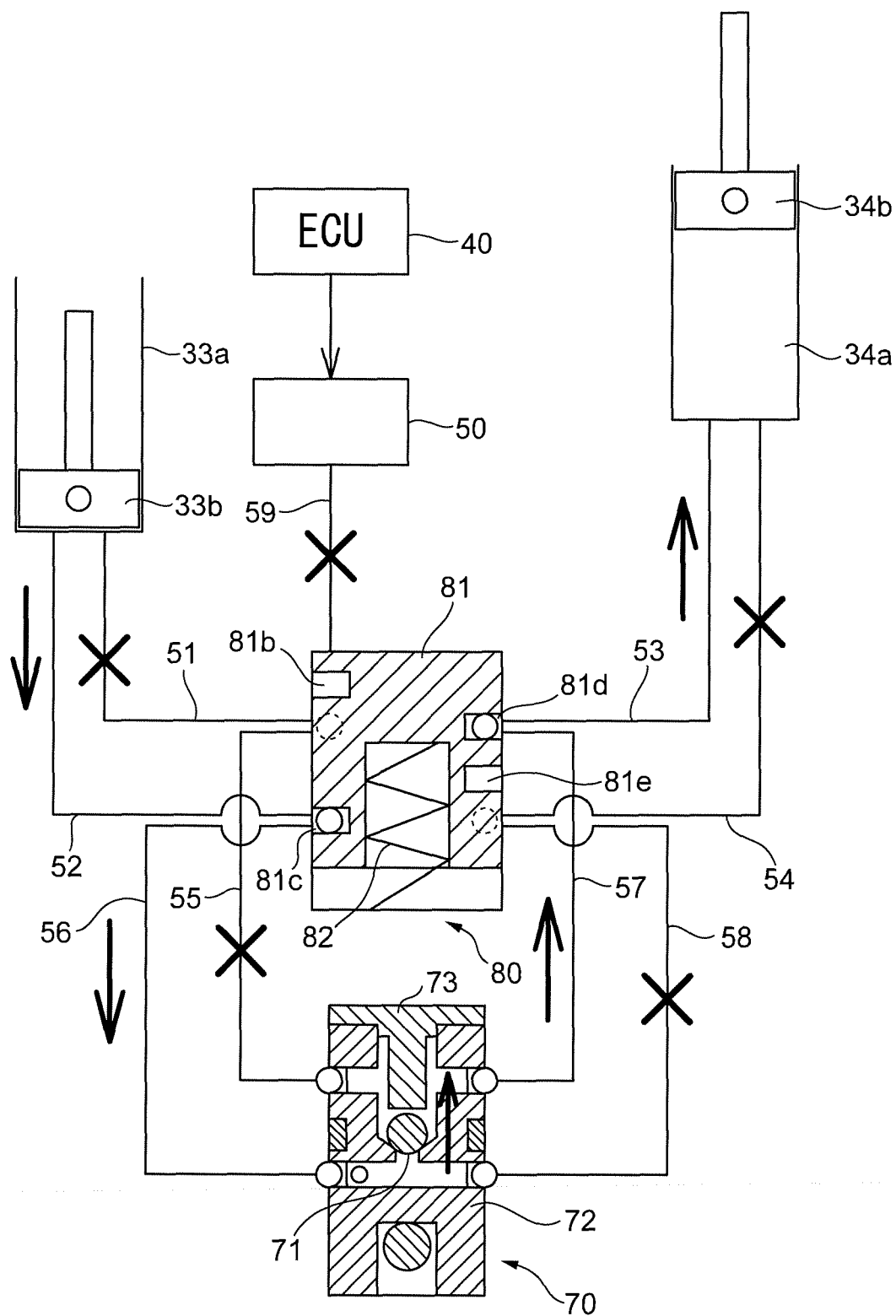
FIG. 12 is a schematic view explaining the flow of hydraulic oil when oil pressure is not being supplied from an oil pressure supply source to a switching pin.

Next, referring to FIG. 10A to FIG. 12, the operation of the variable length connecting rod 6 will be explained. FIG. 10A shows a state where the first hydraulic cylinder 33a is being supplied with hydraulic oil and the second hydraulic cylinder 34a is not being supplied with hydraulic oil. On the one hand, FIG. 10B shows a state where the first hydraulic cylinder 33a is not being supplied with hydraulic oil and the second hydraulic cylinder 34a is being supplied with hydraulic oil. FIG. 11 is a schematic view explaining the flow of hydraulic oil when oil pressure is being supplied from the oil pressure supply source 50 to the switching pin 81. Further, FIG. 12 is a schematic view explaining the flow of hydraulic oil when oil pressure is not being supplied from the oil pressure supply source 50 to the switching pin 81.

The variable length connecting rod 6 further comprises the oil pressure supply source 50 and electronic control unit (ECU) 40. The oil pressure supply source 50 supplies oil pressure through the oil pressure supply path 59 to the switching pin 81. The oil pressure supply source 50 is arranged outside of the connecting rod body 31 and is controlled by the ECU 40. Therefore, the ECU 40 can control the oil pressure supplied by the oil pressure supply source 50 to the switching pin 81.

As shown in FIG. 11, when a predetermined pressure or more of oil pressure is being supplied from the oil pressure supply source 50, the switching pin 81 is positioned at the first position against the biasing force of the first biasing spring 82. At this time, the first piston communicating oil path 51 communicating with the first hydraulic cylinder 33a, and the first space communicating oil path 55 communicating with the secondary side of the check valve 70 are communicated through the first through hole 81b of the switching pin 81. Further, the fourth piston communicating oil path 54 communicating with the second hydraulic cylinder 34a, and the fourth space communicating oil path 58 communicating with the primary side of the check valve 70 are communicated through the fourth through hole 81e of the switching pin 81. On the one hand, the communication between the second piston communicating oil path 52 communicating with the first hydraulic cylinder 33a, and the second space communicating oil path 56 communicating with the primary side of the check valve 70 is cut by the switching pin 81. Further, the communication between the third piston communicating oil path 53 communicating with the second hydraulic cylinder 34a, and the third space communicating oil path 57 communicating with the secondary side of the check valve 70 is cut by the switching pin 81.

Therefore, at the first position, the switching pin 81 makes the first piston communicating oil path 51 communicate with the first space communicating oil path 55, and makes the fourth piston communicating oil path 54 communicate with the fourth space communicating oil path 58. In other words, at the first position, the switching pin 81 makes the first hydraulic cylinder 33a communicate with the secondary side of the check valve 70, and makes the second hydraulic cylinder 34a communicate with the primary side of the check valve 70. Further, at the first position, the switching pin 81 cuts the communication between the second piston communicating oil path 52 and second space communicating oil path 56, and cuts the communication between the third piston communicating oil path 53 and the third space communicating oil path 57. In other words, at the first position, the switching pin 81 cuts the communication between the first hydraulic cylinder 33a and the primary side of the check valve 70, and cuts the communication between the second hydraulic cylinder 34a and the secondary side of the check valve 70.

As a result, flow of hydraulic oil from the second hydraulic cylinder 34a to the first hydraulic cylinder 33a is permitted, while flow of hydraulic oil from the first hydraulic cylinder 33a to the second hydraulic cylinder 34a is prohibited. Therefore, when the switching pin 81 is positioned at the first position, the flow direction switching mechanism 35 is in the first state where it prohibits the flow of hydraulic oil from the first hydraulic cylinder 33a to the second hydraulic cylinder 34a and permits the flow of hydraulic oil from the second hydraulic cylinder 34a to the first hydraulic cylinder 33a.

In this regard, if an upward inertial force caused by the reciprocating motion of the piston 5 in the cylinder 15 of the internal combustion engine 1 acts on the piston pin 21, a downward inertial force will act on the second hydraulic piston 34b. If such an inertial force is generated after the flow direction switching mechanism 35 is switched to the first state, the hydraulic oil inside the second hydraulic cylinder 34a is discharged from the second hydraulic cylinder 34a. As a result, the hydraulic oil inside the second hydraulic cylinder 34a is supplied through the fourth piston communicating oil path 54, fourth space communicating oil path 58, first space communicating oil path 55, and first piston communicating oil path 51 to the first hydraulic cylinder 33a. Therefore, the second hydraulic cylinder 34a supplies hydraulic oil to the first hydraulic cylinder 33a. For this reason, the first hydraulic piston 33b rises and the second hydraulic piston 34b descends. As a result, in the example shown in FIG. 10A, the eccentric member 32 is turned in the direction of the arrow in the figure and the piston pin receiving opening 32d rises in position. Therefore, the length between the center of the crank receiving opening 41 and the center of the piston pin receiving opening 32d, that is, the effective length of the connecting rod 6, becomes long and becomes L1 in the figure. Therefore, if the switching pin 81 moves to the first position and the flow direction switching mechanism 35 is made the first state, the effective length of the connecting rod 6 becomes longer. As a result, the mechanical compression ratio at the internal combustion engine 1 becomes higher.

On the one hand, as shown in FIG. 12, when oil pressure is not being supplied from the oil pressure supply source 50, the switching pin 81 is positioned at the second position by the biasing force of the first biasing spring 82. At this time, the second piston communicating oil path 52 communicating with the first hydraulic cylinder 33a, and the second space communicating oil path 56 communicating with the primary side of the check valve 70 are communicated through the second through hole 81c of the switching pin 81. Further, the third piston communicating oil path 53 communicating with the second hydraulic cylinder 34a, and the third space communicating oil path 57 communicating with the secondary side of the check valve 70 are communicated through the third through hole 81d of the switching pin 81. On the one hand, the communication between the first piston communicating oil path 51 communicating with the first hydraulic cylinder 33a, and the first space communicating oil path 55 communicating with the secondary side of the check valve 70 is cut by the switching pin 81. Further, the communication between the fourth piston communicating oil path 54 communicating with the second hydraulic cylinder 34a, and the fourth space communicating oil path 58 communicating with the primary side of the check valve 70 is cut by the switching pin 81.

Therefore, at the second position, the switching pin 8 makes the second piston communicating oil path 52 communicate with the second space communicating oil path 56, and makes the third piston communicating oil path 53 communicate with the third space communicating oil path 57. In other words, at the second position, the switching pin 81 makes the first hydraulic cylinder 33a communicate with the primary side of the check valve 70, and makes the second hydraulic cylinder 34a communicate with the secondary side of the check valve 70. Further, at the second position, the switching pin 81 cuts the communication between the first piston communicating oil path 51 and the first space communicating oil path 55, and cuts the communication between the fourth piston communicating oil path 54 and the fourth space communicating oil path 58. In other words, at the second position, the switching pin 81 cuts the communication between the first hydraulic cylinder 33a and the secondary side of the check valve 70, and cuts the communication between the second hydraulic cylinder 34a and the primary side of the check valve 70.

As a result, the flow of hydraulic oil from the first hydraulic cylinder 33a to the second hydraulic cylinder 34a is permitted, while the flow of hydraulic oil from the second hydraulic cylinder 34a to the first hydraulic cylinder 33a is prohibited. Therefore, when the switching pin 81 is positioned at the second position, the flow direction switching mechanism 35 is in the second state where it prohibits the flow of hydraulic oil from the second hydraulic cylinder 34a to the first hydraulic cylinder 33a and permits the flow of hydraulic oil from the first hydraulic cylinder 33a to the second hydraulic cylinder 34a.

In this regard, if the downward inertial force caused by the reciprocating motion of the piston 5 in the cylinder 15 of the internal combustion engine 1 and the downward explosive force caused by combustion of the air-fuel mixture in the combustion chamber 7 act on the piston pin 21, a downward force acts on the first hydraulic piston 33b. If such inertial force and explosive force occur after the flow direction switching mechanism 35 is switched to the second state, the hydraulic oil inside the first hydraulic cylinder 33a is discharged from the first hydraulic cylinder 33a. As a result, the hydraulic oil inside the first hydraulic cylinder 33a passes through the second piston communicating oil path 52, second space communicating oil path 56, third space communicating oil path 57, and third piston communicating oil path 53 and is supplied to the second hydraulic cylinder 34a. Therefore, the second hydraulic cylinder 34a receives the hydraulic oil from the first hydraulic cylinder 33a. For this reason, the second hydraulic piston 34b rises, while the first hydraulic piston 33b descends. As a result, in the example shown in FIG. 10B, the eccentric member 32 is turned in the direction of the arrow in the figure (opposite direction from the arrow of FIG. 10A) and the piston pin receiving opening 32d descends in position. Therefore, the length between the center of the crank receiving opening 41 and the center of the piston pin receiving opening 32d, that is, the effective length of the connecting rod 6, becomes L2 which is shorter than L1 in the figure. Therefore, if the switching pin 81 moves to the second position and the flow direction switching mechanism 35 is made the second state, the effective length of the connecting rod 6 becomes shorter. As a result, the mechanical compression ratio in the internal combustion engine 1 becomes lower.

In the present embodiment, as explained above, by switching the switching pin 81 between the first position and the second position, the effective length of the connecting rod 6 can be switched between L1 and L2. As a result, in the internal combustion engine 1 comprising the connecting rod 6, the mechanical compression ratio can be changed.

Note that, in the present embodiment, the first piston communicating oil path 51 and the second piston communicating oil path 52 correspond to a first oil path making the hydraulic cylinder (first hydraulic cylinder 33a) and pin holding space 47 communicate. The third piston communicating oil path 53 and fourth piston communicating oil path 54 correspond to a second oil path making the hydraulic mechanism (second hydraulic cylinder 34a) handling the hydraulic oil and pin holding space 47 communicate. The second space communicating oil path 56 and the fourth space communicating oil path 58 correspond to a third oil path making the primary side of the check valve 70 and pin holding space 47 communicate. The first space communicating oil path 55 and the third space communicating oil path 57 correspond to a fourth oil path making the secondary side of the check valve 70 and the pin holding space 47 communicate.

Effect in First Embodiment

In the present embodiment, as explained above, the flow direction switching mechanism 35 for switching the flow of hydraulic oil to the hydraulic piston mechanisms 33, 34 comprises a single check valve 70, and a single switching mechanism 80 comprising a single switching pin 81. For this reason, compared with a configuration comprising a plurality of switching pins or check valves etc., the mechanism for switching the flow of hydraulic oil to the hydraulic piston mechanism can be made simpler.

Further, in the present embodiment, the switching pin 81 linearly moves when switched between the first position and the second position. For this reason, compared with the case of making the switching pin 81 turn etc., the mechanism for switching the position of the switching pin 81 can be made simpler.

In this regard, the inertial force caused by the reciprocating motion of the piston 5 in the cylinder 15 of the internal combustion engine 1, and the explosive force caused by the combustion of an air-fuel mixture in the combustion chamber 7 basically act in a direction vertical to the center axial line of the crank receiving opening 41. As opposed to this, in the present embodiment, when the switching pin 81 is switched between the first position and the second position, it moves in parallel with the center axial line of the crank receiving opening 41. For this reason, in the present embodiment, since the inertial force and explosive force do not act much at all in the operating direction of the switching pin 81, it is possible to suppress mistaken operation of the switching pin 81 due to the inertial force or explosive force.

Second Embodiment

Next, referring to FIG. 13 to FIG. 19, a variable length connecting rod 6a according to a second embodiment of the present invention will be explained. The configuration and operation of the variable length connecting rod 6a according to the second embodiment are basically similar to the configuration and operation of the variable length connecting rod 6 according to the first embodiment except for the points explained below.

Figure 13:
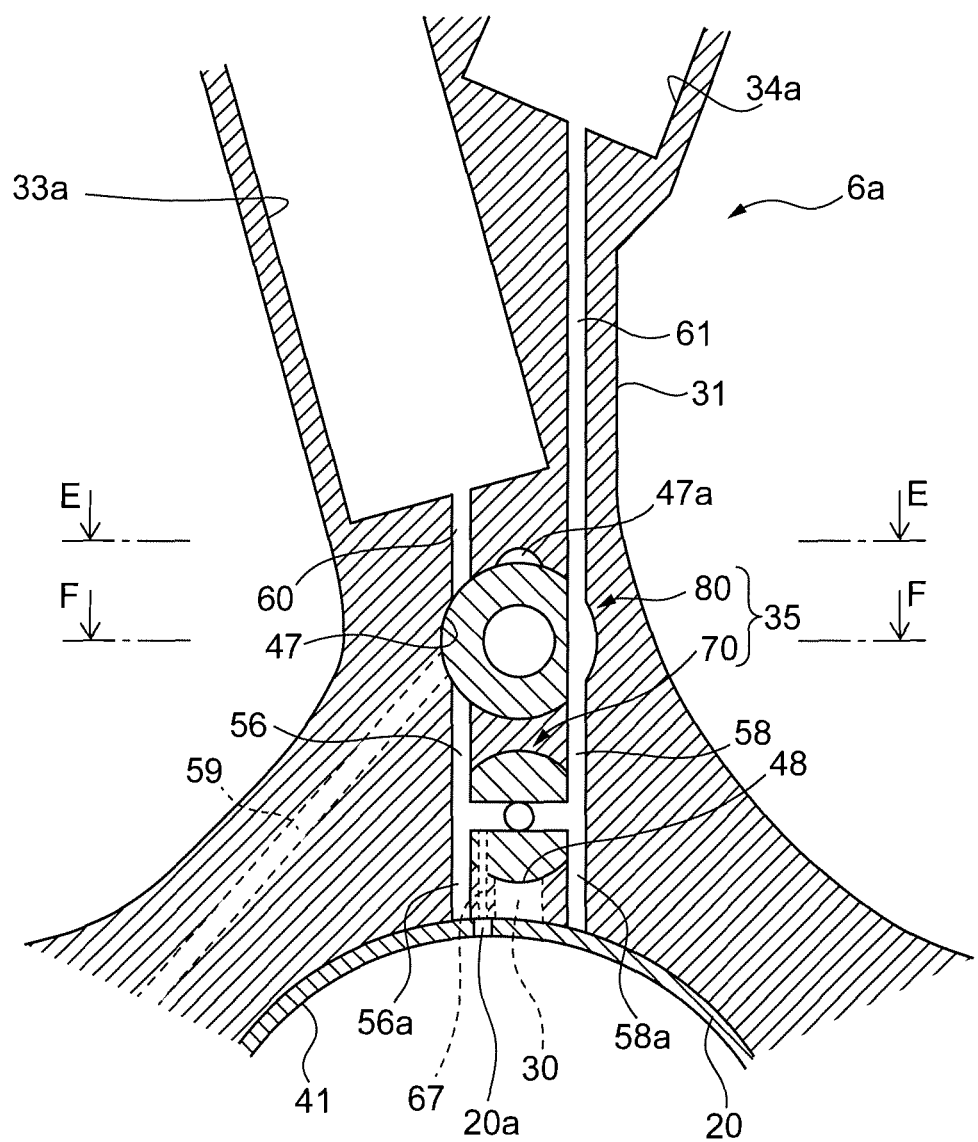
FIG. 13 is a side cross-sectional view of a variable length connecting rod according to a second embodiment enlarging the region in which the flow direction switching mechanism is provided.
Figure 14:
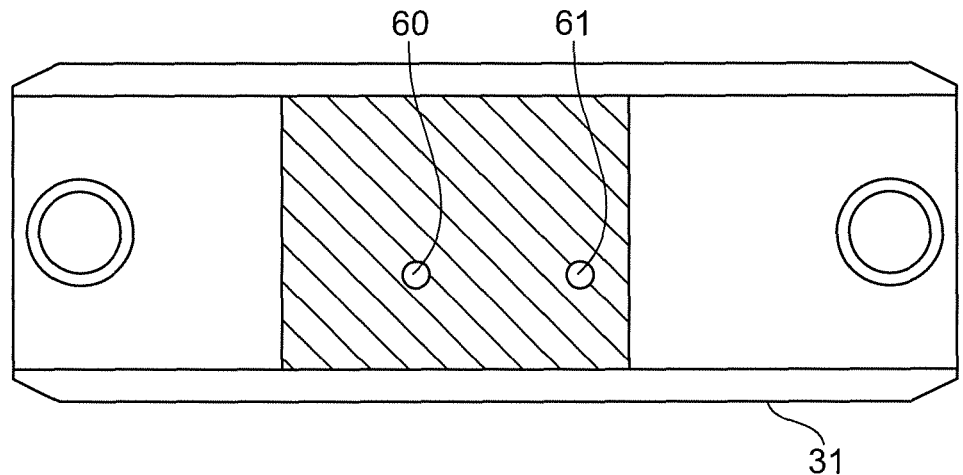
FIG. 14 is a cross-sectional view of a variable length connecting rod along the line E-E of FIG. 13.
Figure 15:
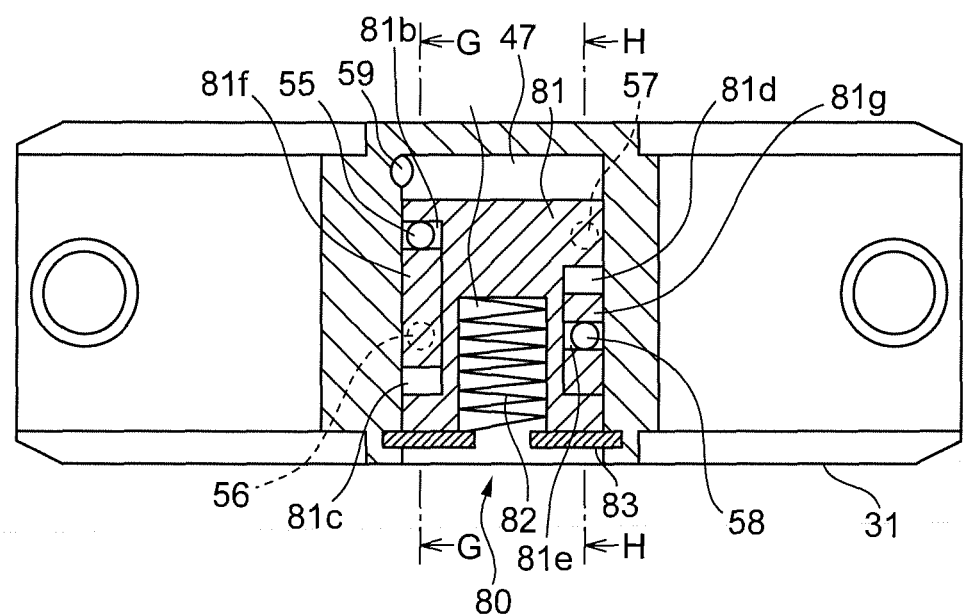
FIG. 15 is a cross-sectional view of a variable length connecting rod along the line F-F of FIG. 13.
Figure 16:
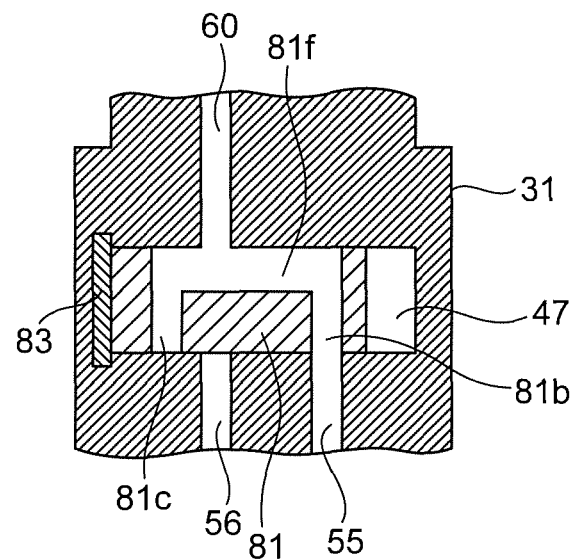
FIG. 16 is a cross-sectional view of a variable length connecting rod along the line G-G of FIG. 15.
Figure 17:
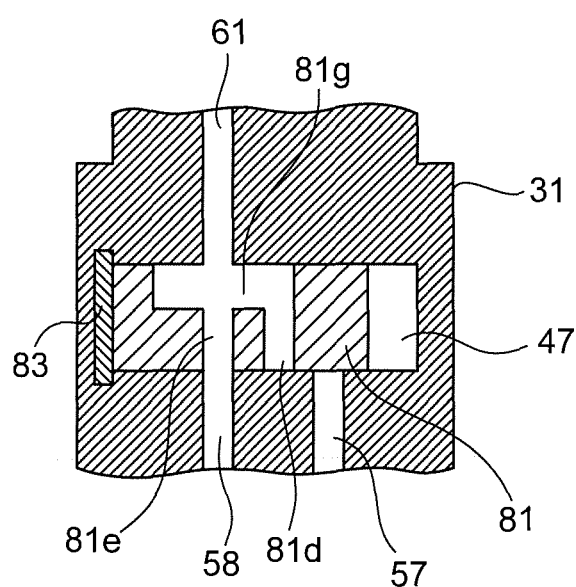
FIG. 17 is a partial cross-sectional view of a variable length connecting rod along the line H-H of FIG. 15.

FIG. 13 is a side cross-sectional view of a variable length connecting rod 6a enlarging the region in which the flow direction switching mechanism 35 is provided. FIG. 14 is a cross-sectional view of the variable length connecting rod 6a along the line E-E of FIG. 13. FIG. 15 is a cross-sectional view of the variable length connecting rod 6a along the line F-F of FIG. 13. FIG. 16 is a cross-sectional view of the variable length connecting rod 6a along the line G-G of FIG. 15. FIG. 17 is a partial cross-sectional view of the variable length connecting rod 6a along the line H-H of FIG. 15. Note that, in FIG. 13, the first hydraulic piston 33b and second hydraulic piston 34b are omitted.

As will be understood from FIG. 13 and FIG. 14, inside the connecting rod body 31, a fifth piston communicating oil path 60 making the first hydraulic cylinder 33a and the pin holding space 47 communicate, and a sixth piston communicating oil path 61 making the second hydraulic cylinder 34a and the pin holding space 47 communicate are formed. The fifth piston communicating oil path 60 and the sixth piston communicating oil path 61 extend in the axial line direction of the connecting rod body 31. The fifth piston communicating oil path 60 and sixth piston communicating oil path 61 are separated from each other in the width direction of the connecting rod body 31 and are formed at the same position in the thickness direction of the connecting rod body 31. Further, the fifth piston communicating oil path 60 and the second space communicating oil path 56 are formed on the same straight line, while the sixth piston communicating oil path 61 and the fourth space communicating oil path 58 are formed on the same straight line.

In the second embodiment, the switching pin 81 is further formed with a first communication groove 81f and a second communication groove 81g. The first communication groove 81f and the second communication groove 81g extend in the axial line direction of the switching pin 81. As shown in FIG. 16, the first communication groove 81f is communicated with the first through hole 81b and second through hole 81c. Further, the first communication groove 81f is formed so as to be communicated with the fifth piston communicating oil path 60 regardless of the sliding position of the switching pin 81. Therefore, the first communication groove 81f is communicated with the fifth piston communicating oil path 60 at the first position and second position of the switching pin 81.

As shown in FIG. 17, the second communication groove 81g is communicated with the third through hole 81d and the fourth through hole 81e. Further, the second communication groove 81g is formed so as to be communicated with the sixth piston communicating oil path 61 regardless of the sliding position of the switching pin 81. Therefore, the second communication groove 81g is communicated with the sixth piston communicating oil path 61 at the first position and second position of the switching pin 81.

<Operation of Variable Length Connecting Rod>

Figure 18:
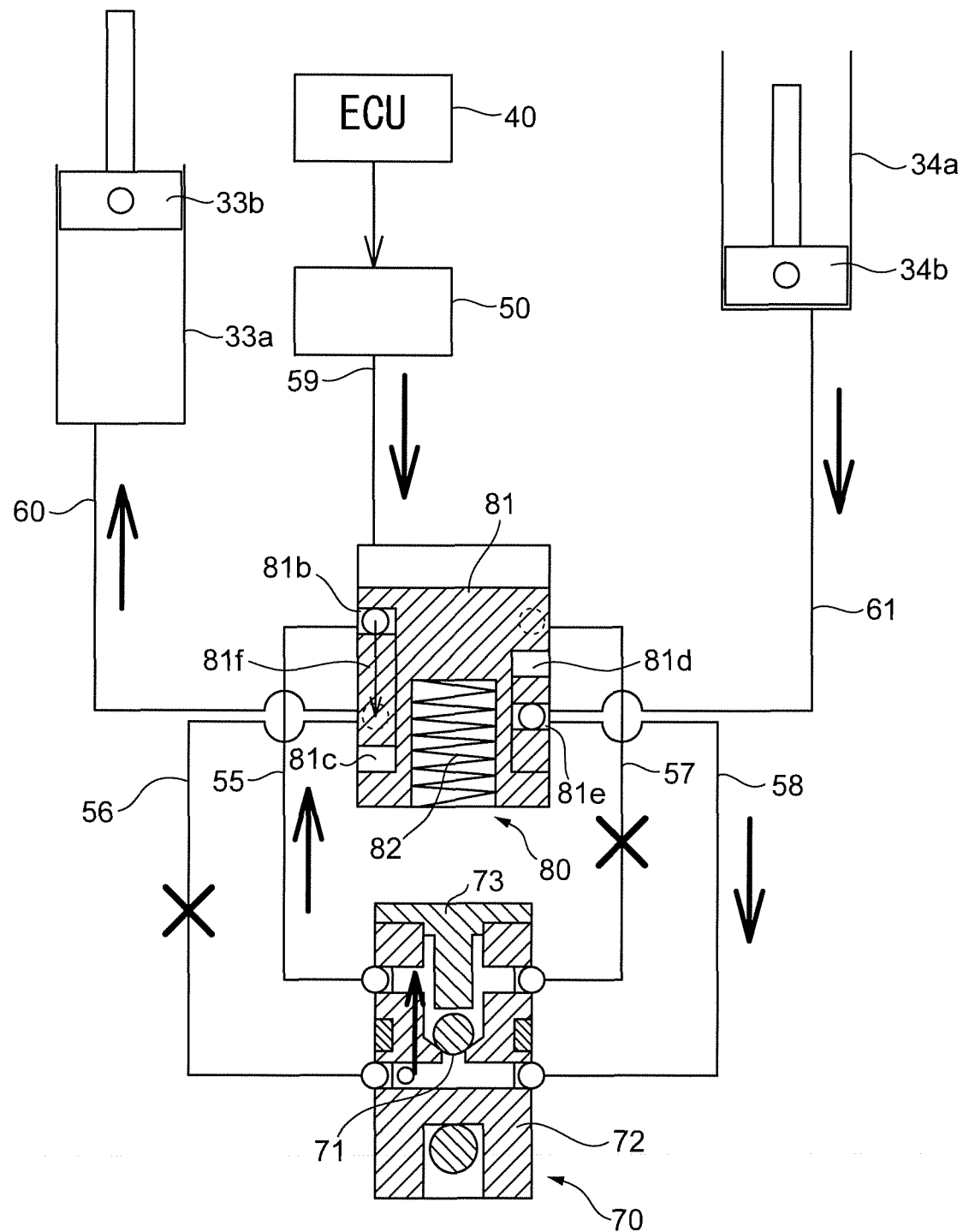
FIG. 18 is a schematic view explaining a flow of hydraulic oil when oil pressure is being supplied from an oil pressure supply source to a switching pin.
Figure 19:
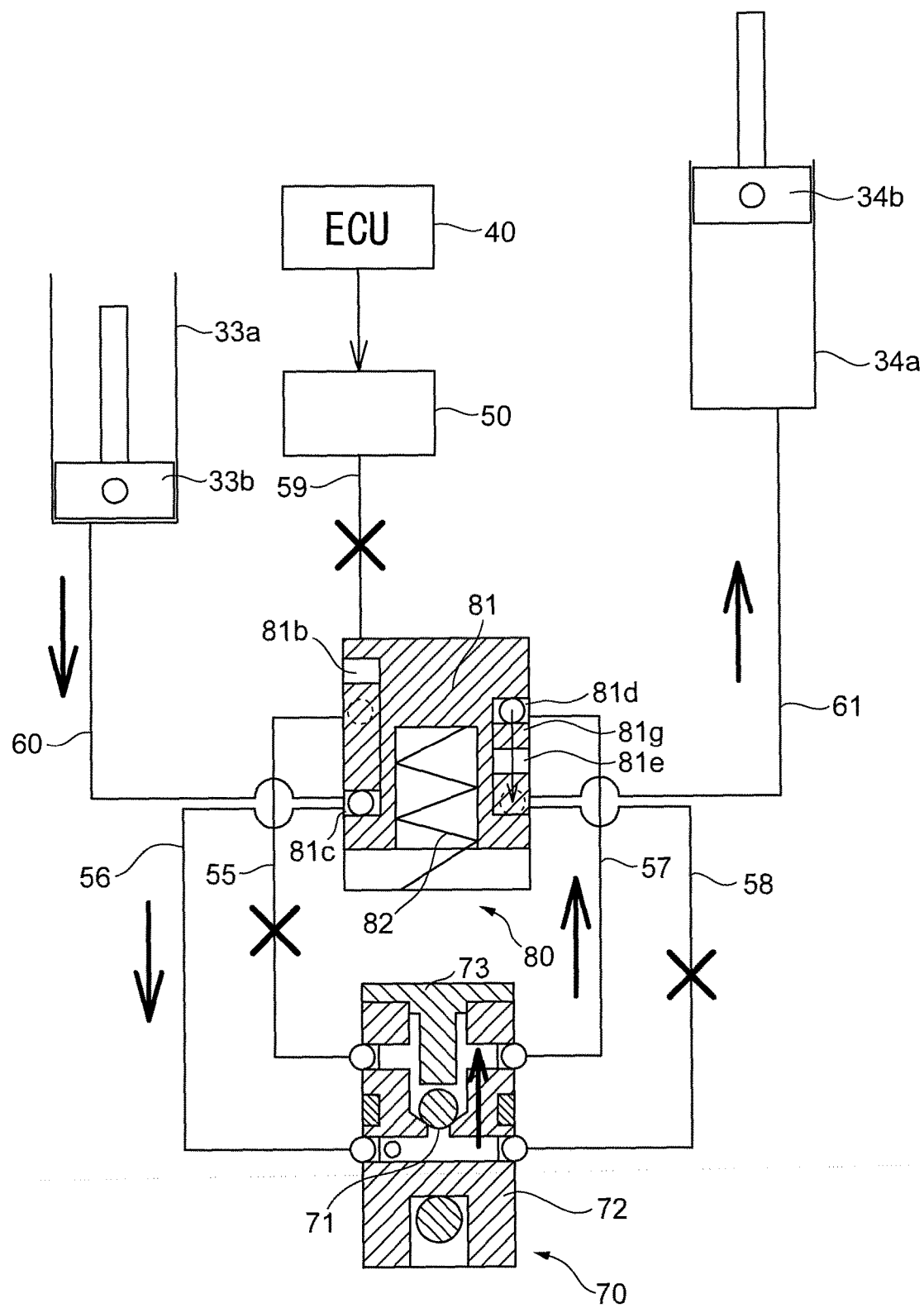
FIG. 19 is a schematic view explaining a flow of hydraulic oil when oil pressure is not being supplied from an oil pressure supply source to a switching pin.

Below, referring to FIG. 18 and FIG. 19, the operation of the variable length connecting rod 6a will be explained. FIG. 18 is a schematic view explaining a flow of hydraulic oil when oil pressure is being supplied from the oil pressure supply source 50 to the switching pin 81. Further, FIG. 19 is a schematic view explaining a flow of hydraulic oil when oil pressure is not being supplied from the oil pressure supply source 50 to the switching pin 81.

As shown in FIG. 18, when a predetermined pressure or more of oil pressure is being supplied from the oil pressure supply source 50, the switching pin 81 is positioned at the first position against the biasing force of the first biasing spring 82. At this time, the fifth piston communicating oil path 60 communicating with the first hydraulic cylinder 33a, and the first space communicating oil path 55 communicating with the secondary side of the check valve 70 are communicated through the first through hole 81b and the first communication groove 81f of the switching pin 81. Further, the sixth piston communicating oil path 61 communicating with the second hydraulic cylinder 34a, and the fourth space communicating oil path 58 communicating with the primary side of the check valve 70 are communicated through the fourth through hole 81e of the switching pin 81. On the one hand, the communication between the fifth piston communicating oil path 60 and the second space communicating oil path 56 communicating with the primary side of the check valve 70 is cut by the switching pin 81. Further, the communication between the sixth piston communicating oil path 61 and the third space communicating oil path 57 communicating with the secondary side of the check valve 70 is cut by the switching pin 81.

Therefore, at the first position, the switching pin 81 makes the fifth piston communicating oil path 60 communicate with the first space communicating oil path 55, and makes the sixth piston communicating oil path 61 communicate with the fourth space communicating oil path 58. In other words, at the first position, the switching pin 81 makes the first hydraulic cylinder 33a communicate with the secondary side of the check valve 70, and makes the second hydraulic cylinder 34a communicate with the primary side of the check valve 70. Further, at the first position, the switching pin 81 cuts the communication between the fifth piston communicating oil path 60 and second space communicating oil path 56, and cuts the communication between the sixth piston communicating oil path 61 and the third space communicating oil path 57. In other words, at the first position, the switching pin 81 cuts the communication between the first hydraulic cylinder 33a and the primary side of the check valve 70, and cuts the communication between the second hydraulic cylinder 34a and the secondary side of the check valve 70.

As a result, flow of hydraulic oil from the second hydraulic cylinder 34a to the first hydraulic cylinder 33a is permitted, while flow of hydraulic oil from the first hydraulic cylinder 33a to the second hydraulic cylinder 34a is prohibited. Therefore, when the switching pin 81 is positioned at the first position, the flow direction switching mechanism 35 is in the first state where it prohibits the flow of hydraulic oil from the first hydraulic cylinder 33a to the second hydraulic cylinder 34a and permits the flow of hydraulic oil from the second hydraulic cylinder 34a to the first hydraulic cylinder 33a. If the flow direction switching mechanism 35 is made the first state, similarly to the first embodiment, the eccentric member 32 is turned in one direction and the effective length of the connecting rod 6 becomes longer. As a result, the mechanical compression ratio at the internal combustion engine 1 becomes higher.

On the one hand, as shown in FIG. 19, when oil pressure is not being supplied from the oil pressure supply source 50, the switching pin 81 is positioned at the second position by the biasing force of the first biasing spring 82. At this time, the fifth piston communicating oil path 60 communicating with the first hydraulic cylinder 33a, and the second space communicating oil path 56 communicating with the primary side of the check valve 70 are communicated through the second through hole 81c of the switching pin 81. Further, the sixth piston communicating oil path 61 communicating with the second hydraulic cylinder 34a, and the third space communicating oil path 57 communicating with the secondary side of the check valve 70 are communicated through the third through hole 81d and the second communication groove 81g of the switching pin 81. On the one hand, the communication between the fifth piston communicating oil path 60 and the first space communicating oil path 55 communicating with the secondary side of the check valve 70 is cut by the switching pin 81. Further, the communication between the sixth piston communicating oil path 61 and the fourth space communicating oil path 58 communicating with the primary side of the check valve 70 is cut by the switching pin 81.

Therefore, at the second position, the switching pin 8 makes the fifth piston communicating oil path 60 communicate with the second space communicating oil path 56, and makes the sixth piston communicating oil path 61 communicate with the third space communicating oil path 57. In other words, at the second position, the switching pin 81 makes the first hydraulic cylinder 33a communicate with the primary side of the check valve 70, and makes the second hydraulic cylinder 34a communicate with the secondary side of the check valve 70. Further, at the second position, the switching pin 81 cuts the communication between the fifth piston communicating oil path 60 and the first space communicating oil path 55, and cuts the communication between the sixth piston communicating oil path 61 and the fourth space communicating oil path 58. In other words, at the second position, the switching pin 81 cuts the communication between the first hydraulic cylinder 33a and the secondary side of the check valve 70, and cuts the communication between the second hydraulic cylinder 34a and the primary side of the check valve 70.

As a result, the flow of hydraulic oil from the first hydraulic cylinder 33a to the second hydraulic cylinder 34a is permitted, while the flow of hydraulic oil from the second hydraulic cylinder 34a to the first hydraulic cylinder 33a is prohibited. Therefore, when the switching pin 81 is positioned at the second position, the flow direction switching mechanism 35 is in the second state where it prohibits the flow of hydraulic oil from the second hydraulic cylinder 34a to the first hydraulic cylinder 33a and permits the flow of hydraulic oil from the first hydraulic cylinder 33a to the second hydraulic cylinder 34a. If the flow direction switching mechanism 35 is made the second state, similarly to the first embodiment, the eccentric member 32 is turned in the other direction and the effective length of the connecting rod 6 becomes shorter. As a result, the mechanical compression ratio in the internal combustion engine 1 becomes lower.

Note that, in the present embodiment, the fifth piston communicating oil path 60 corresponds to a first oil path making the hydraulic cylinder (first hydraulic cylinder 33a) and the pin holding space 47 communicate. Further, the sixth piston communicating oil path 61 corresponds to a second oil path making the hydraulic mechanism (second hydraulic cylinder 34a) handling the hydraulic oil and the pin holding space 47 communicate. In the present embodiment, unlike the first embodiment, there are a single first oil path and a single second oil path. Therefore, in the present embodiment, the mechanism for switching the flow of hydraulic oil to the hydraulic piston mechanism can be made much simpler.

Third Embodiment

Next, referring to FIG. 20 to FIG. 27, a variable length connecting rod 6b according to a third embodiment of the present invention will be explained. The configuration and operation of the variable length connecting rod 6b according to the third embodiment are basically similar to the configuration and operation of the variable length connecting rod 6 according to the first embodiment except for the points explained below.

<Configuration of Variable Length Connecting Rod>

Figure 20:
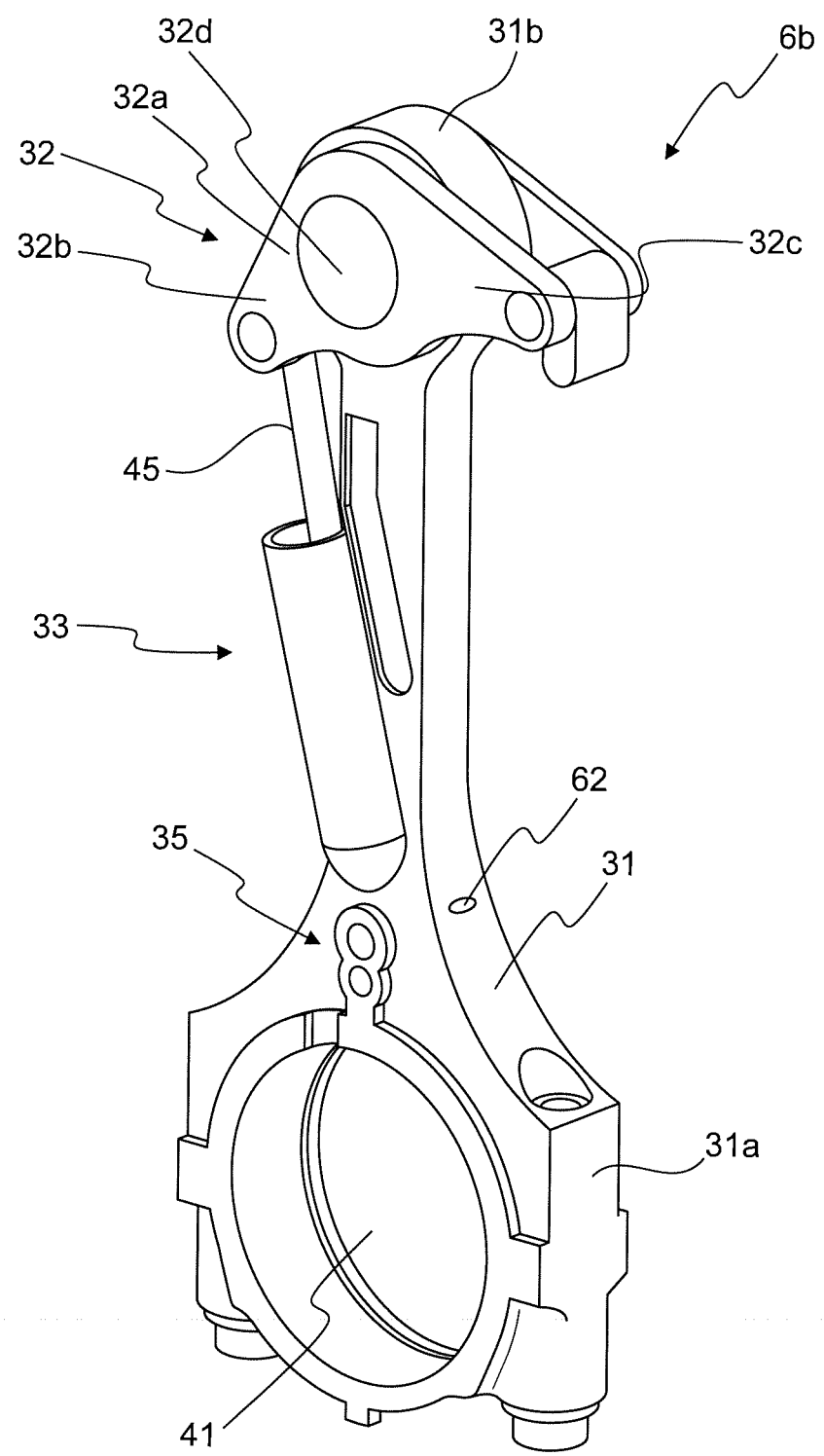
FIG. 20 is a perspective view schematically showing a variable length connecting rod according to a third embodiment.
Figure 21:
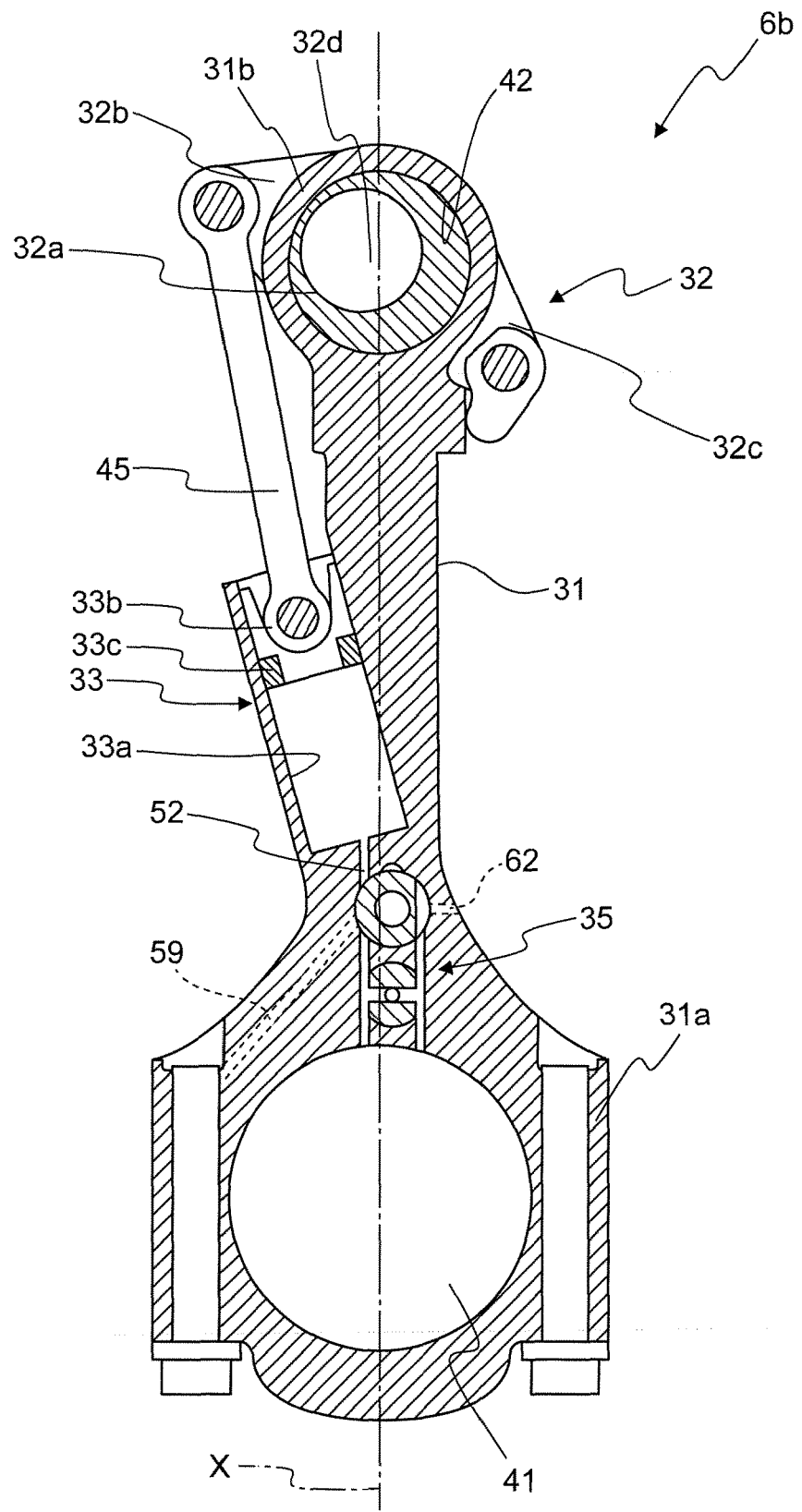
FIG. 21 is a side cross-sectional view schematically showing a variable length connecting rod according to the third embodiment.

FIG. 20 is a perspective view schematically showing a variable length connecting rod 6b according to the third embodiment. FIG. 21 is a side cross-sectional view schematically showing the variable length connecting rod 6b according to the third embodiment. As shown in FIG. 20 and FIG. 21, the variable length connecting rod 6b comprises a connecting rod body 31, an eccentric member 32 attached to the connecting rod body 31 to be able to turn, a hydraulic piston mechanism 33 provided at the connecting rod body 31, a connecting member 45 connecting the eccentric member 32 with the hydraulic piston mechanism 33, and a flow direction switching mechanism 35 switching the flow of hydraulic oil to the hydraulic piston mechanism 33.

In the third embodiment, unlike first embodiment, there are a single hydraulic piston mechanism 33 and a single connecting member 45. Therefore, it is possible to reduce the number of parts of the variable length connecting rod. As a result, in the third embodiment, it is possible to reduce the total weight and manufacturing cost of the variable length connecting rod comprising the hydraulic piston mechanism.

<Flow Direction Switching Mechanism>

Figure 22:
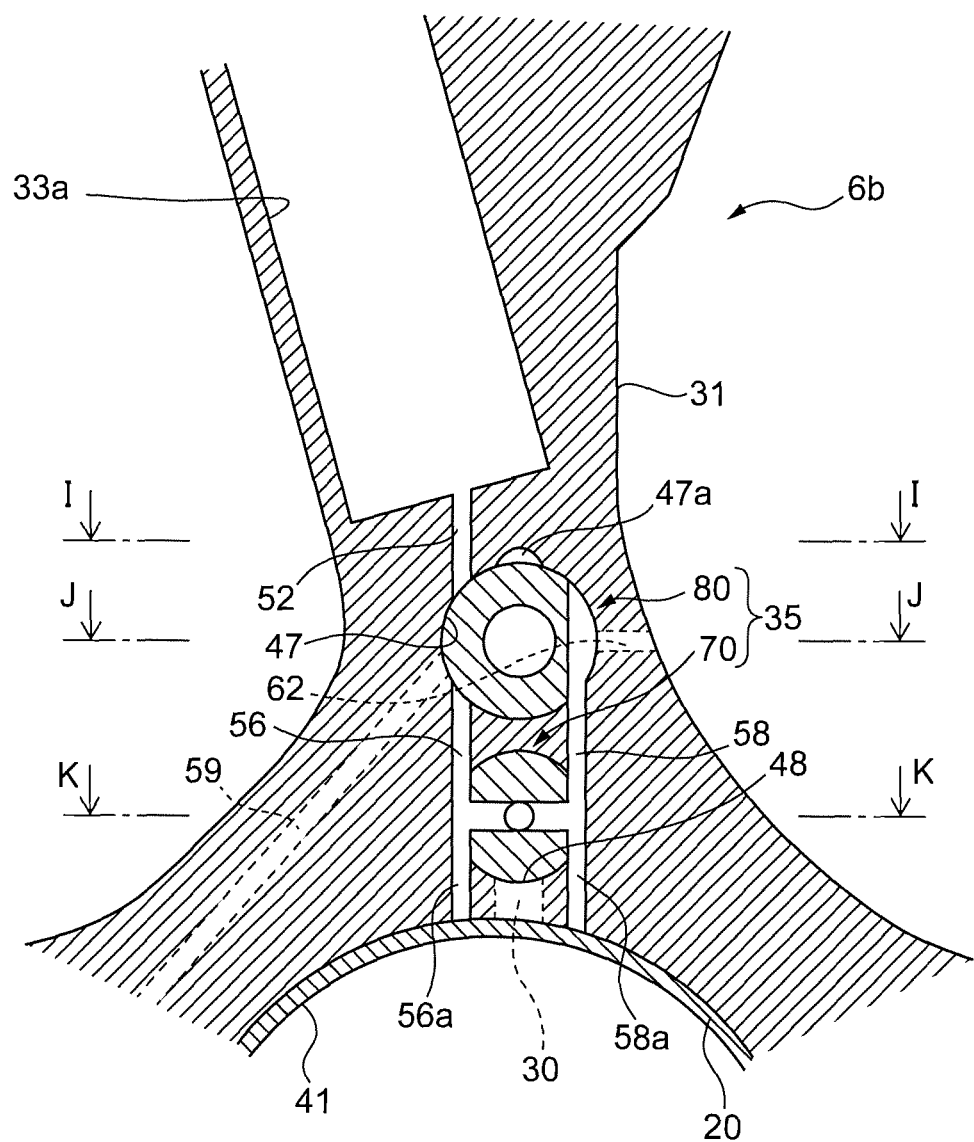
FIG. 22 is a side cross-sectional view of a variable length connecting rod enlarging the region in which the flow direction switching mechanism is provided.
Figure 23:
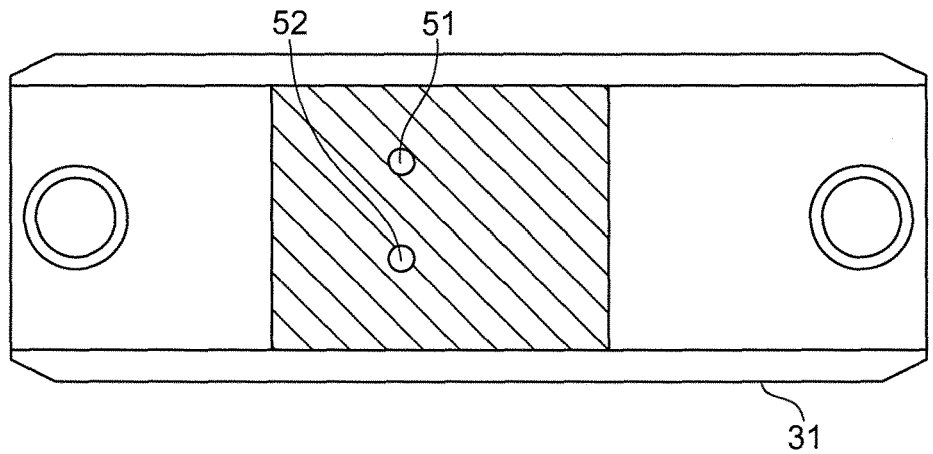
FIG. 23 is a cross-sectional view of a variable length connecting rod along the line I-I of FIG. 22.
Figure 24:
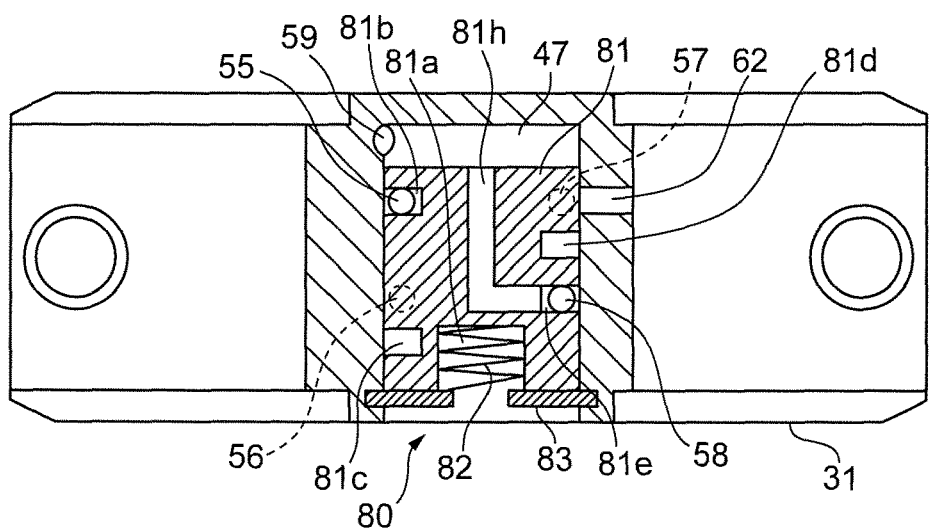
FIG. 24 is a cross-sectional view of a variable length connecting rod along the line J-J of FIG. 22.
Figure 25:
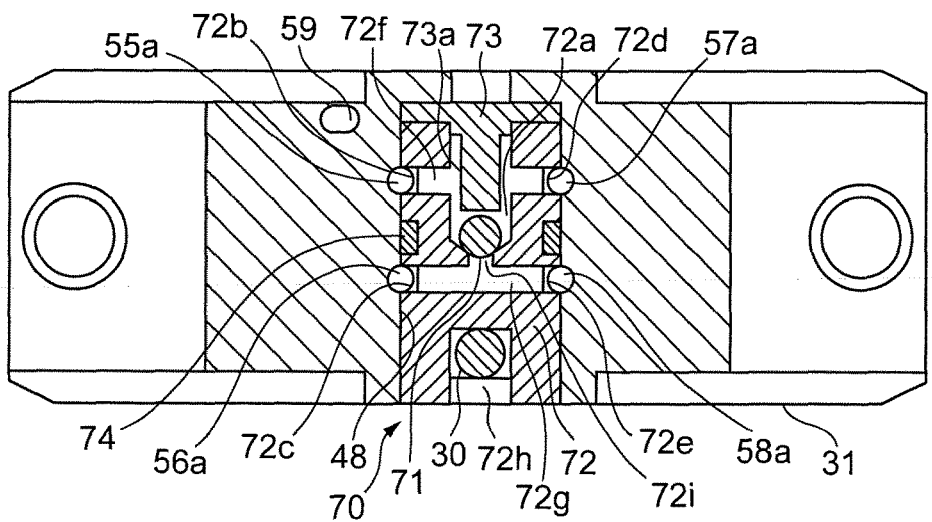
FIG. 25 is a cross-sectional view of a variable length connecting rod along the line K-K of FIG. 22.

Below, referring to FIG. 22 to FIG. 27, the configuration of the flow direction switching mechanism 35 will be explained focusing on the parts different from the first embodiment. FIG. 22 is a side cross-sectional view of a variable length connecting rod 6b enlarging the region in which the flow direction switching mechanism 35 is provided. FIG. 23 is a cross-sectional view of the variable length connecting rod 6b along the line I-I of FIG. 22. FIG. 24 is a cross-sectional view of the variable length connecting rod 6b along the line J-J of FIG. 22. FIG. 25 is a cross-sectional view of the variable length connecting rod 6b along the line K-K of FIG. 22.

In the third embodiment, the oil pressure supply source 50 arranged outside of the connecting rod body 31 supplies hydraulic oil to the hydraulic cylinder 33a. For this reason, as shown in FIG. 24, the switching pin 81 is further formed with a hydraulic oil supply path 81h. The hydraulic oil supply path 81h extends from the fourth through hole 81e in a direction vertical to the axial line direction of the switching pin 81 and in the axial line direction of the switching pin 81 and opens at one end part in the axial line direction of the switching pin 81. For this reason, the hydraulic oil supply path 81h makes the oil pressure supply path 59 and the fourth through hole 81e communicate through the pin holding space 47 when the switching pin 81 is at the first position.

Further, as will be understood from FIG. 22 and FIG. 23, inside the connecting rod body 31, a first piston communicating oil path 51 and second piston communicating oil path 52 making the hydraulic cylinder 33a and the pin holding space 47 communicate are formed. The first piston communicating oil path 51 and the second piston communicating oil path 52 extend in the axial line direction of the connecting rod body 31. The first piston communicating oil path 51 and second piston communicating oil path 52 are separated from each other in the thickness direction of the connecting rod body 31 and are formed at the same position in the axial line direction and width direction of the connecting rod body 31. Further, the first piston communicating oil path 51 and first space communicating oil path 55 are formed on the same straight line, while the second piston communicating oil path 52 and second space communicating oil path 56 are formed on the same straight line.

Further, in the third embodiment, the hydraulic oil inside the hydraulic cylinder 33a is discharged to the outside space of the connecting rod 6b. The hydraulic oil discharged to the outside space is recovered in an oil pan 2a provided at the internal combustion engine 1. The recovered hydraulic oil is again supplied from the oil pressure supply source 50 to the hydraulic cylinder 33a.

To discharge the hydraulic oil to the outside of the connecting rod body 31, the connecting rod body 31 is further formed with a discharge oil path 62. Note that, for reference, the discharge oil path 62 is shown by broken lines in FIG. 21 and FIG. 22. The discharge oil path 62 extends in the width direction of the connecting rod body 31 and makes the pin holding space 47 and the outside space of the connecting rod 6b communicate. As shown in FIG. 24, the discharge oil path 62 is formed at the same position as the third space communicating oil path 57 in the thickness direction of the connecting rod body 31. Further, the discharge oil path 62 adjoins the third space communicating oil path 57 in the width direction of the connecting rod body 31. The discharge oil path 62 is formed by cutting from the outside of the connecting rod body 31 by a drill etc. Note that, the discharge oil path 62 may extend at a slant with respect to the width direction of the connecting rod body 31.

<Operation of Variable Length Connecting Rod>

Figure 26:
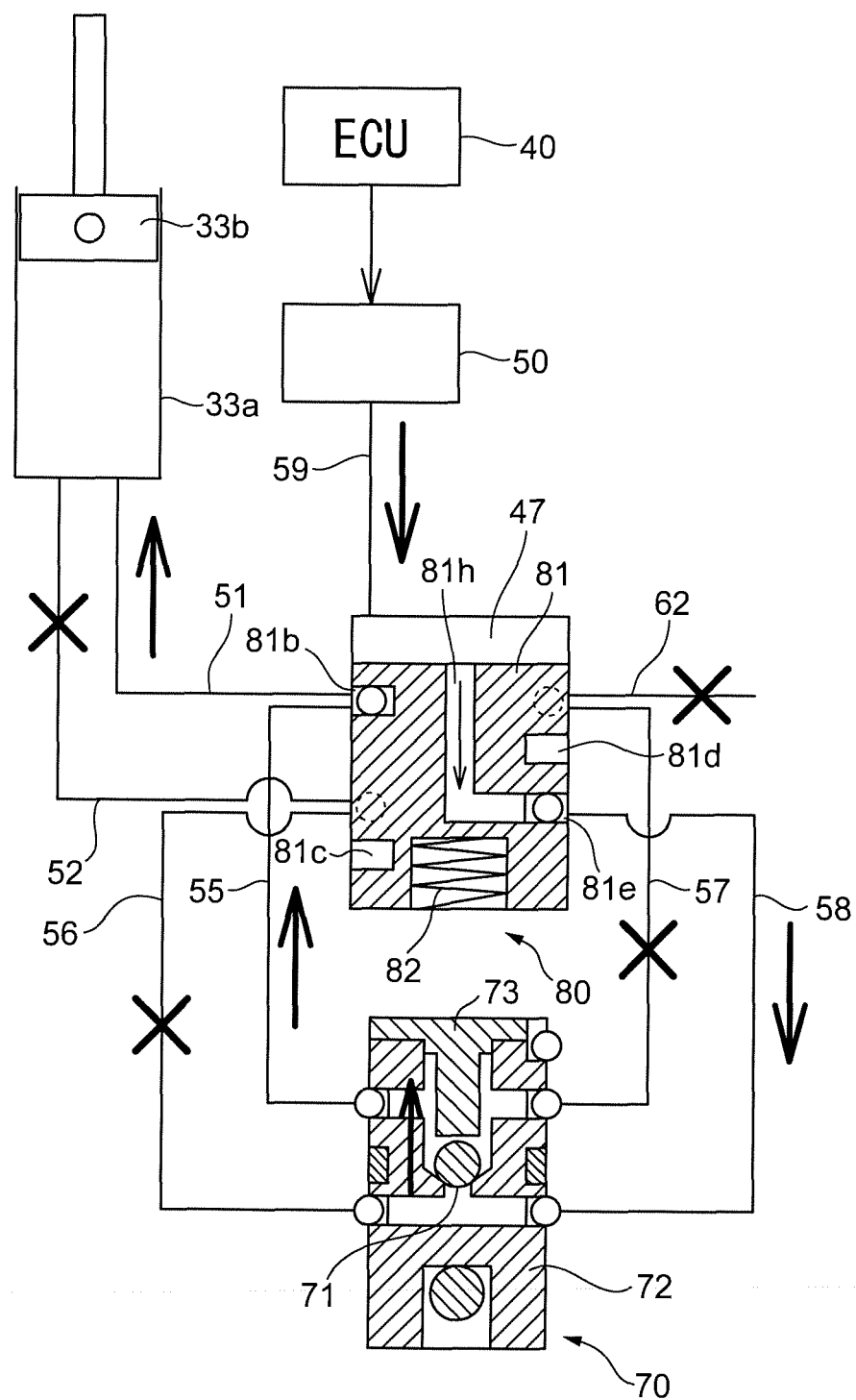
FIG. 26 is a schematic view explaining a flow of hydraulic oil when oil pressure is being supplied from an oil pressure supply source to a switching pin.
Figure 27:
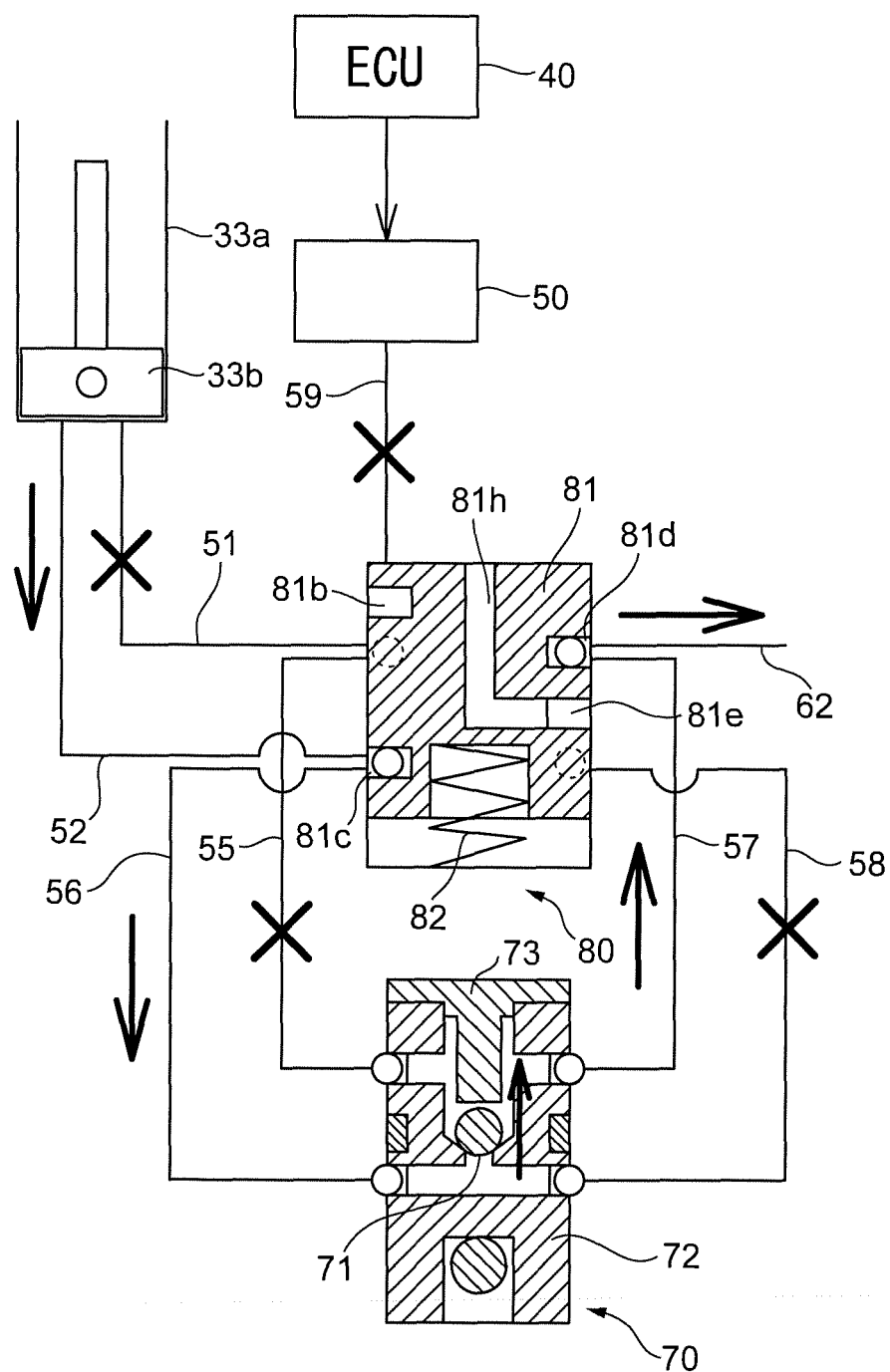
FIG. 27 is a schematic view explaining a flow of hydraulic oil when oil pressure is not being supplied from an oil pressure supply source to a switching pin.

Next, referring to FIG. 26 and FIG. 27, the operation of the variable length connecting rod 6b will be explained. FIG. 26 is a schematic view explaining the flow of hydraulic oil when oil pressure is being supplied from the oil pressure supply source 50 to the switching pin 81. Further, FIG. 27 is a schematic view explaining the flow of hydraulic oil when oil pressure is not being supplied from the oil pressure supply source 50 to the switching pin 81.

As shown in FIG. 26, when a predetermined pressure or more of oil pressure is being supplied from the oil pressure supply source 50, the switching pin 81 is positioned at the first position against the biasing force of the first biasing spring 82. At this time, the first piston communicating oil path 51 communicated with the hydraulic cylinder 33a and the first space communicating oil path 55 communicated with the secondary side of the check valve 70 are communicated through the first through hole 81b of the switching pin 81. Further, the oil pressure supply path 59 communicated with the oil pressure supply source 50 and the fourth space communicating oil path 58 communicated with the primary side of the check valve 70 are communicated through the pin holding space 47, hydraulic oil supply path 81h, and fourth through hole 81e. On the other hand, the communication between the second piston communicating oil path 52 communicated with the hydraulic cylinder 33a and the second space communicating oil path 56 communicated with the primary side of the check valve 70 is cut by the switching pin 81. Further, the communication between the discharge oil path 62 communicated with the outside space of the connecting rod 6b and the third space communicating oil path 57 communicated with the secondary side of the check valve 70 is cut by the switching pin 81.

Therefore, at the first position, the switching pin 81 makes the first piston communicating oil path 51 communicate with the first space communicating oil path 55, and makes the oil pressure supply path 59 communicate with the fourth space communicating oil path 58. In other words, at the first position, the switching pin 81 makes the hydraulic cylinder 33a communicate with the secondary side of the check valve 70, and makes the oil pressure supply source 50 communicate with the primary side of the check valve 70. Further, at the first position, the switching pin 81 cuts the communication between the second piston communicating oil path 52 and the second space communicating oil path 56, and cuts the communication between the discharge oil path 62 and the third space communicating oil path 57. In other words, at the first position, the switching pin 81 cuts the communication between the hydraulic cylinder 33a and the primary side of the check valve 70, and cuts the communication between the outside space of the connecting rod 6b and the secondary side of the check valve 70.

As a result, the flow of hydraulic oil from the oil pressure supply source 50 to the hydraulic cylinder 33a is permitted, while the flow of hydraulic oil from the hydraulic cylinder 33a to the outside space of the connecting rod 6b is prohibited. Therefore, when the switching pin 81 is positioned at the first position, the flow direction switching mechanism 35 is in the first state where it prohibits the flow of hydraulic oil from the hydraulic cylinder 33a to the outside space of the connecting rod 6b and permits the flow of hydraulic oil from the oil pressure supply source 50 to the hydraulic cylinder 33a. When the flow direction switching mechanism 35 is made the first state, as shown in FIG. 21, the eccentric member 32 turns in one direction whereby the effective length of the connecting rod 6b becomes longer. As a result, the mechanical compression ratio in the internal combustion engine 1 becomes higher.

On the one hand, as shown in FIG. 27, when oil pressure is not being supplied from the oil pressure supply source 50, the switching pin 81 is positioned at the second position by the biasing force of the first biasing spring 82. At this time, the second piston communicating oil path 52 communicated with the hydraulic cylinder 33a and the second space communicating oil path 56 communicated with the primary side of the check valve 70 are communicated through the second through hole 81c of the switching pin 81. Further, the discharge oil path 62 communicated with the outside space of the connecting rod 6b and the third space communicating oil path 57 communicated with secondary side of the check valve 70 are communicated through the third through hole 81d of the switching pin 81. On the one hand, the communication between the first piston communicating oil path 51 communicated with the hydraulic cylinder 33a and the first space communicating oil path 55 communicated with the secondary side of the check valve 70 is cut by the switching pin 81. Further, the communication between the oil pressure supply path 59 communicated with the oil pressure supply source 50 and the fourth space communicating oil path 58 communicated with the primary side of the check valve 70 is cut by the switching pin 81.

Therefore, at the second position, the switching pin 81 makes the second piston communicating oil path 52 communicate with the second space communicating oil path 56, and makes the discharge oil path 62 communicate with the third space communicating oil path 57. In other words, at the second position, the switching pin 81 makes the hydraulic cylinder 33a communicate with the primary side of the check valve 70, and makes the outside space of the connecting rod 6b communicate with the secondary side of the check valve 70. Further, at the second position, the switching pin 81 cuts the communication between the first piston communicating oil path 51 and the first space communicating oil path 55, and cuts the communication between the oil pressure supply path 59 and the fourth space communicating oil path 58. In other words, at the second position, the switching pin 81 cuts the communication between the hydraulic cylinder 33a and secondary side of the check valve 70, and cuts the communication between the oil pressure supply source 50 and the primary side of the check valve 70.

As a result, the flow of hydraulic oil from the hydraulic cylinder 33a to the outside space of the connecting rod 6b is permitted, while the flow of hydraulic oil from the oil pressure supply source 50 to the hydraulic cylinder 33a is prohibited. Therefore, when the switching pin 81 is positioned at the second position, the flow direction switching mechanism 35 is in the second state where it prohibits the flow of hydraulic oil from the oil pressure supply source 50 to the hydraulic cylinder 33a and permits the flow of hydraulic oil from the hydraulic cylinder 33a to the outside space of the connecting rod 6b. If the flow direction switching mechanism 35 is made the second state, the eccentric member 32 turns in the other direction and the effective length of the connecting rod 6b becomes shorter. As a result, the mechanical compression ratio in the internal combustion engine 1 becomes lower.

Note that, in the present embodiment, the first piston communicating oil path 51 and the second piston communicating oil path 52 correspond to a first oil path making the hydraulic cylinder 33a and the pin holding space 47 communicate. Further, the oil pressure supply path 59 and discharge oil path 62 correspond to a second oil path making the hydraulic mechanism handling the hydraulic oil (oil pressure supply source 50) and the outside space of the connecting rod 6b, and the pin holding space 47 communicate.

Fourth Embodiment

Next, referring to FIG. 28 to FIG. 32, a variable length connecting rod 6c according to a fourth embodiment of the present invention will be explained. The configuration and operation of the variable length connecting rod 6c according to the fourth embodiment are basically similar to the configuration and operation of the variable length connecting rod 6b according to the third embodiment except for the points explained below.

<Problems Due to Supply and Discharge of Hydraulic Oil>

As explained above in the explanation of the third embodiment, in the present embodiment, when the flow direction switching mechanism 35 is in the first state, hydraulic oil is supplied from the oil pressure supply source 50 at the outside of the connecting rod body 31 to the hydraulic cylinder 33a. On the one hand, when the flow direction switching mechanism 35 is in the second state, hydraulic oil is discharged from the hydraulic cylinder 33a to the outside of the connecting rod body 31. At this time, the hydraulic oil inside the hydraulic cylinder 33a is discharged from the discharge oil path 62 opened to the atmosphere to the outside space of the connecting rod 6c.

Right after the hydraulic oil inside the hydraulic cylinder 33a is discharged, hydraulic oil still remains in the oil path inside the connecting rod body 31. In this state, the air at the outside space of the connecting rod 6c cannot flow from the discharge oil path 62 to the oil path inside the connecting rod body 31. However, after the hydraulic oil is discharged, due to the operation of the connecting rod 6 accompanying rotation of the crankshaft, inertial force acts on the hydraulic oil inside the connecting rod body 31. As a result, the hydraulic oil inside the connecting rod body 31 is discharged from the discharge oil path 62. Due to this, sometimes air flows from the discharge oil path 62 into the oil path inside the connecting rod body 31.

If air flows through the oil path inside the connecting rod body 31 into the hydraulic cylinder 33a, when a downward force is applied to the hydraulic piston 33b, the position of the hydraulic piston 33b is liable to change due to the compression of the inflowing air. In this case, the turn position of the eccentric member 32 and in turn the mechanical compression ratio of the internal combustion engine 1 cannot be suitably controlled. For this reason, to suppress the inflow of air to the hydraulic cylinder 33a, it is necessary to keep air from flowing from the discharge oil path 62 to the flow direction switching mechanism 35 after the discharge of the hydraulic oil inside the hydraulic cylinder 33a.

<Configuration of Backflow Prevention Mechanism>

Figure 28:
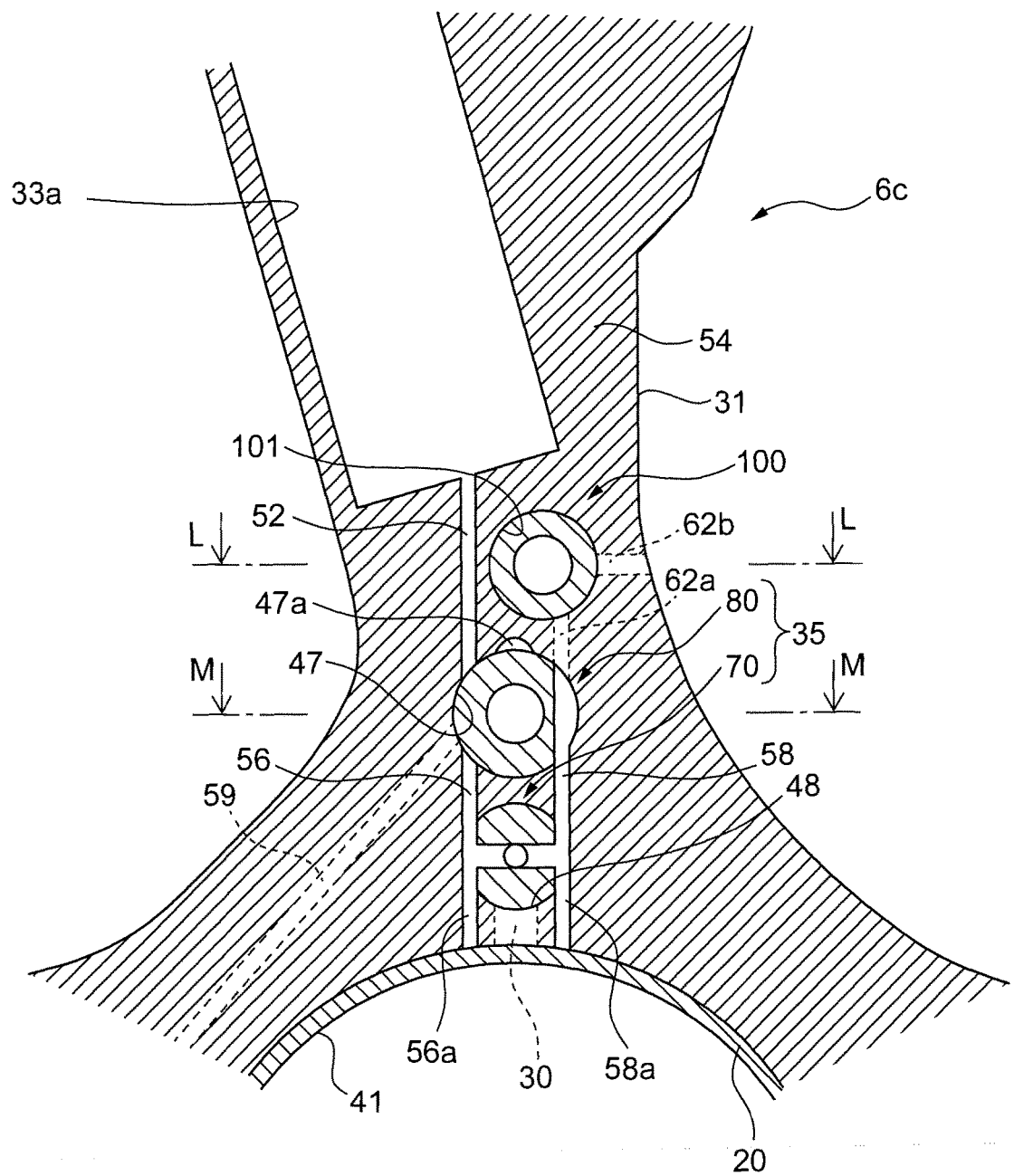
FIG. 28 is a side cross-sectional view of a variable length connecting rod enlarging the region in which the backflow prevention mechanism and flow direction switching mechanism are provided.
Figure 29:
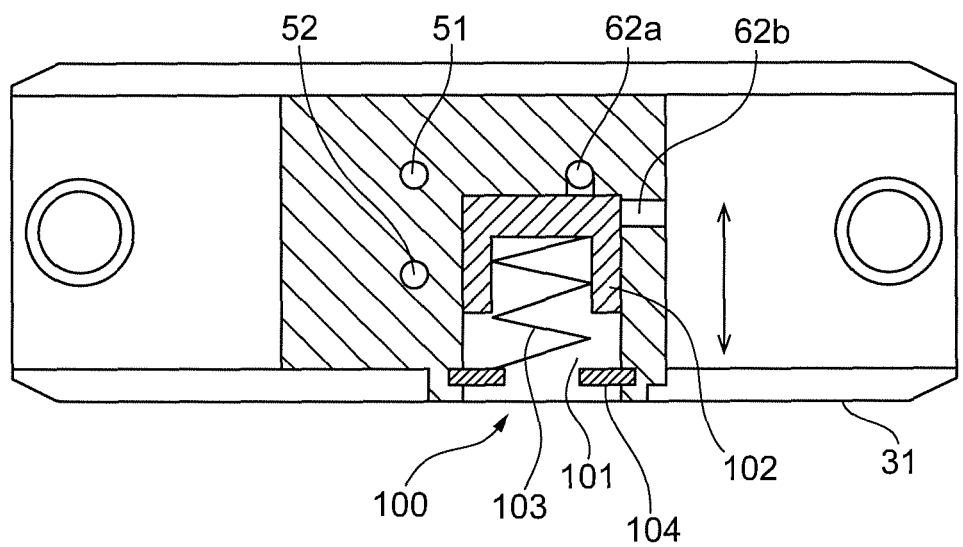
FIG. 29 is a cross-sectional view of a variable length connecting rod along the line L-L of FIG. 28.
Figure 30:
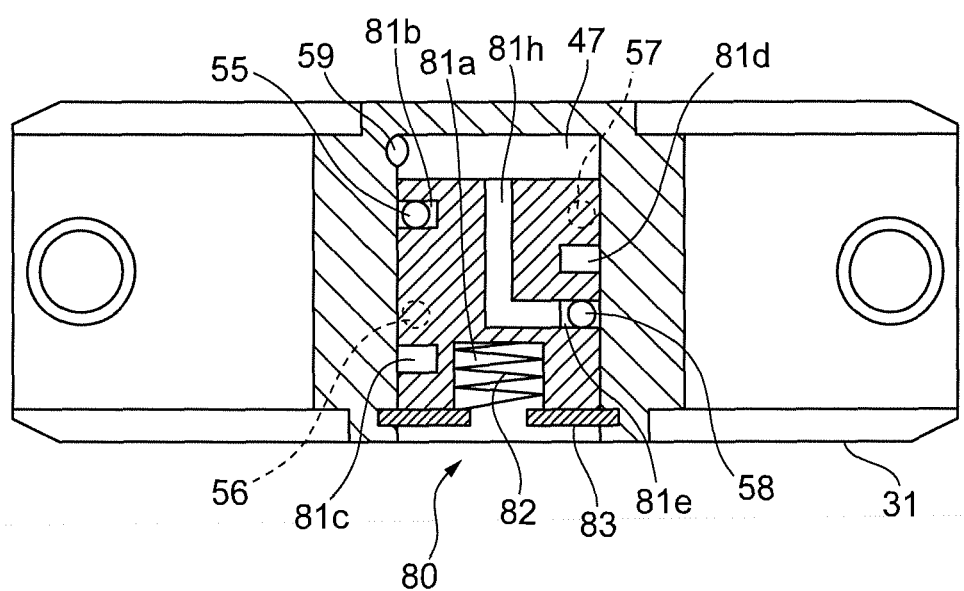
FIG. 30 is a cross-sectional view of a variable length connecting rod along the line M-M of FIG. 28.

Therefore, in the fourth embodiment, the variable length connecting rod 6c further comprises a backflow prevention mechanism 100. Below, referring to FIG. 28 to FIG. 30, the configuration of the backflow prevention mechanism 100 will be explained. FIG. 28 is a side cross-sectional view of the variable length connecting rod 6c enlarging the region in which the backflow prevention mechanism and flow direction switching mechanism 35 are provided. FIG. 29 is a cross-sectional view of the variable length connecting rod 6c along the line L-L of FIG. 28. FIG. 30 is a cross-sectional view of the variable length connecting rod 6c along the line M-M of FIG. 28. The backflow prevention mechanism 100 is arranged in the discharge oil path between the pin holding space 47 and the outside space of the connecting rod 6c. As explained below, when the switching pin 81 is at the second position, the backflow prevention mechanism 100 is configured to permit the movement of hydraulic oil from the flow direction switching mechanism 35 to the outside space of the connecting rod 6c and prohibit the movement of fluid from the outside space of the connecting rod 6c to the flow direction switching mechanism 35.

The backflow prevention mechanism 100 is held in the backflow prevention mechanism holding space 101 formed in the connecting rod body 31. The backflow prevention mechanism holding space 101 is formed between the hydraulic cylinder 33a and the flow direction switching mechanism 35 in the axial line direction of the connecting rod body 31. In the present embodiment, the backflow prevention mechanism holding space 101 has a cylindrical shape and is formed so that its axial line extends in parallel with the center axial line of the crank receiving opening 41. The backflow prevention mechanism holding space 101, as shown in FIG. 29, is closed at one end part in the thickness direction of the connecting rod body 31 and is open at the other end part. The backflow prevention mechanism 100 is inserted from the open end part of the backflow prevention mechanism holding space 101 into the backflow prevention mechanism holding space 101 at the time of assembly of the variable length connecting rod 6c.

The backflow prevention mechanism 100 comprises a backflow prevention pin 102, a second biasing spring 103 biasing the backflow prevention pin 102, and a second support member 104 supporting the second biasing spring 103. The backflow prevention pin 102 has a columnar shape and is held in the backflow prevention mechanism holding space 101 so that its axial line extends in parallel with the center axial line of the crank receiving opening 41. The second biasing spring 103 is, for example, a coil spring and is arranged between the backflow prevention pin 102 and the second support member 104. The second support member 104 is for example a C-ring, E-ring, or other snap ring and is arranged in a circumferential groove formed in the backflow prevention mechanism holding space 101. The second biasing spring 103 biases the backflow prevention pin 102 in a direction parallel to the center axial line of the crank receiving opening 41 toward the closed end part of the backflow prevention mechanism holding space 101.

As explained later, the backflow prevention pin 102 is supplied with oil pressure by the hydraulic oil discharged from the hydraulic cylinder 33a. The backflow prevention pin 102 is switched by oil pressure between a first position separated from the closed end part of the backflow prevention mechanism holding space 101 and a second position abutting against the closed end part of the backflow prevention mechanism holding space 101. Specifically, the backflow prevention pin 102 moves to the first position against the biasing force of the second biasing spring 103 when the backflow prevention pin 102 is supplied with a predetermined pressure or more of oil pressure, and moves to the second position by the biasing force of the second biasing spring 103 when the backflow prevention pin 102 is supplied with less than a predetermined pressure of oil pressure or the backflow prevention pin 102 is not supplied with oil pressure. The backflow prevention pin 102 linearly moves in the direction of the arrow of FIG. 29 when switched between the first position and the second position. The direction of movement of the backflow prevention pin 102 is parallel to the center axial line of the crank receiving opening 41. Note that, in FIG. 29, the switching pin 81 is positioned at the second position.

Further, in the present embodiment, to discharge the hydraulic oil to the outside space of the connecting rod 6c through the backflow prevention mechanism 100, the connecting rod body 31 is formed with a first discharge oil path 62a and a second discharge oil path 62b. Note that, for reference, the first discharge oil path 62a and the second discharge oil path 62b are shown by the broken lines in FIG. 28. The first discharge oil path 62a extends in the axial line direction of the connecting rod body 31 and makes the pin holding space 47 and the backflow prevention mechanism holding space 101 communicate. The second discharge oil path 62b extends in the width direction of the connecting rod body 31 and makes the backflow prevention mechanism holding space 101 and the outside space of the connecting rod 6c communicate.

The first discharge oil path 62a is formed on the same straight line as the third space communicating oil path 57. For this reason, it is possible to easily form the first discharge oil path 62a by cutting from the crank receiving opening 41 by a drill etc. On the one hand, the second discharge oil path 62b is formed at the closed end part side of the backflow prevention mechanism holding space 101 in the thickness direction of the connecting rod body 31. The second discharge oil path 62b is formed by cutting from outside of the connecting rod body 31 by a drill etc. Note that, the second discharge oil path 62b may extend at a slant with respect to the width direction of the connecting rod body 31.

<Operation of Variable Length Connecting Rod>

Figure 31:
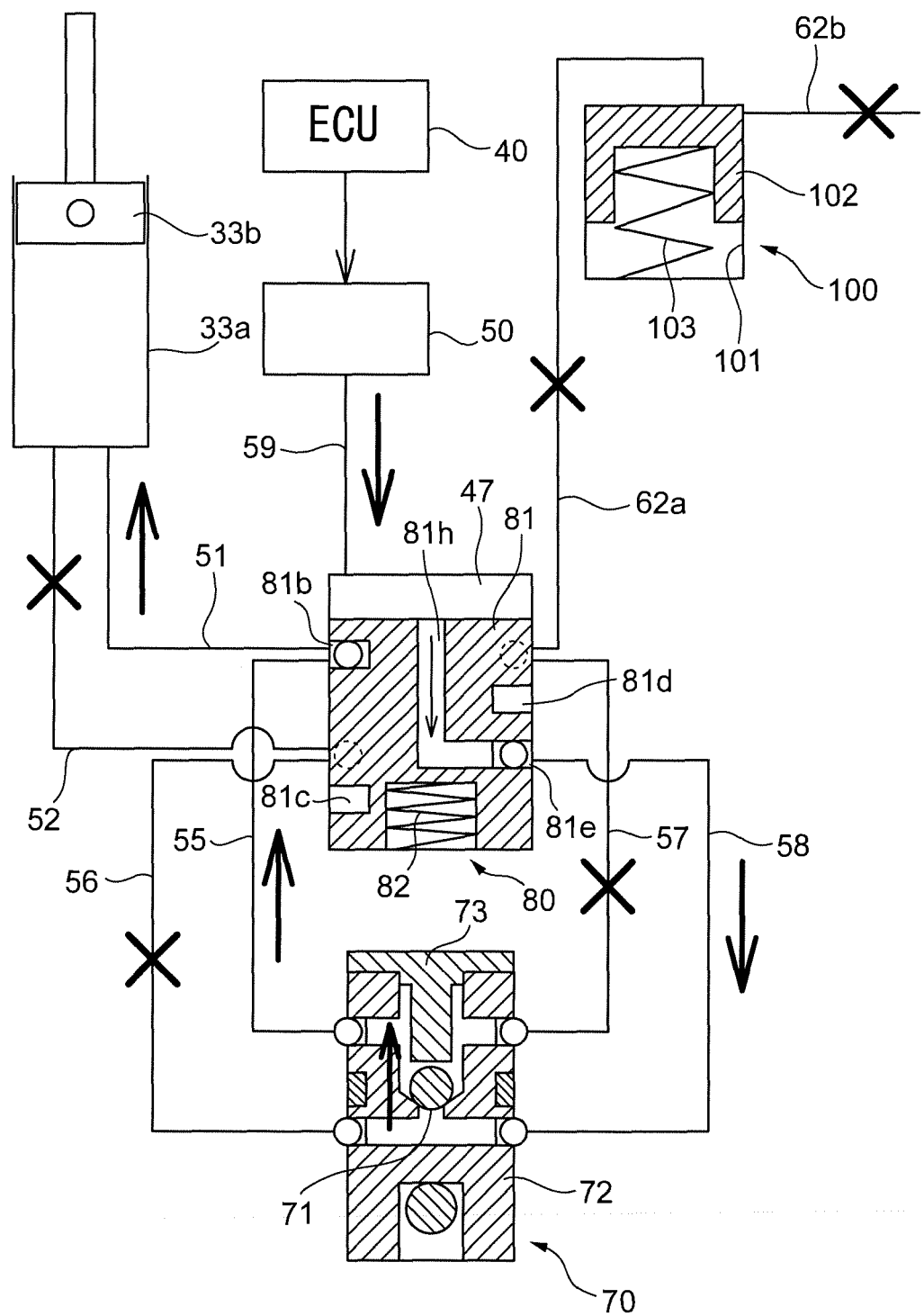
FIG. 31 is a schematic view explaining a flow of hydraulic oil when oil pressure is being supplied from an oil pressure supply source to a switching pin.
Figure 32:
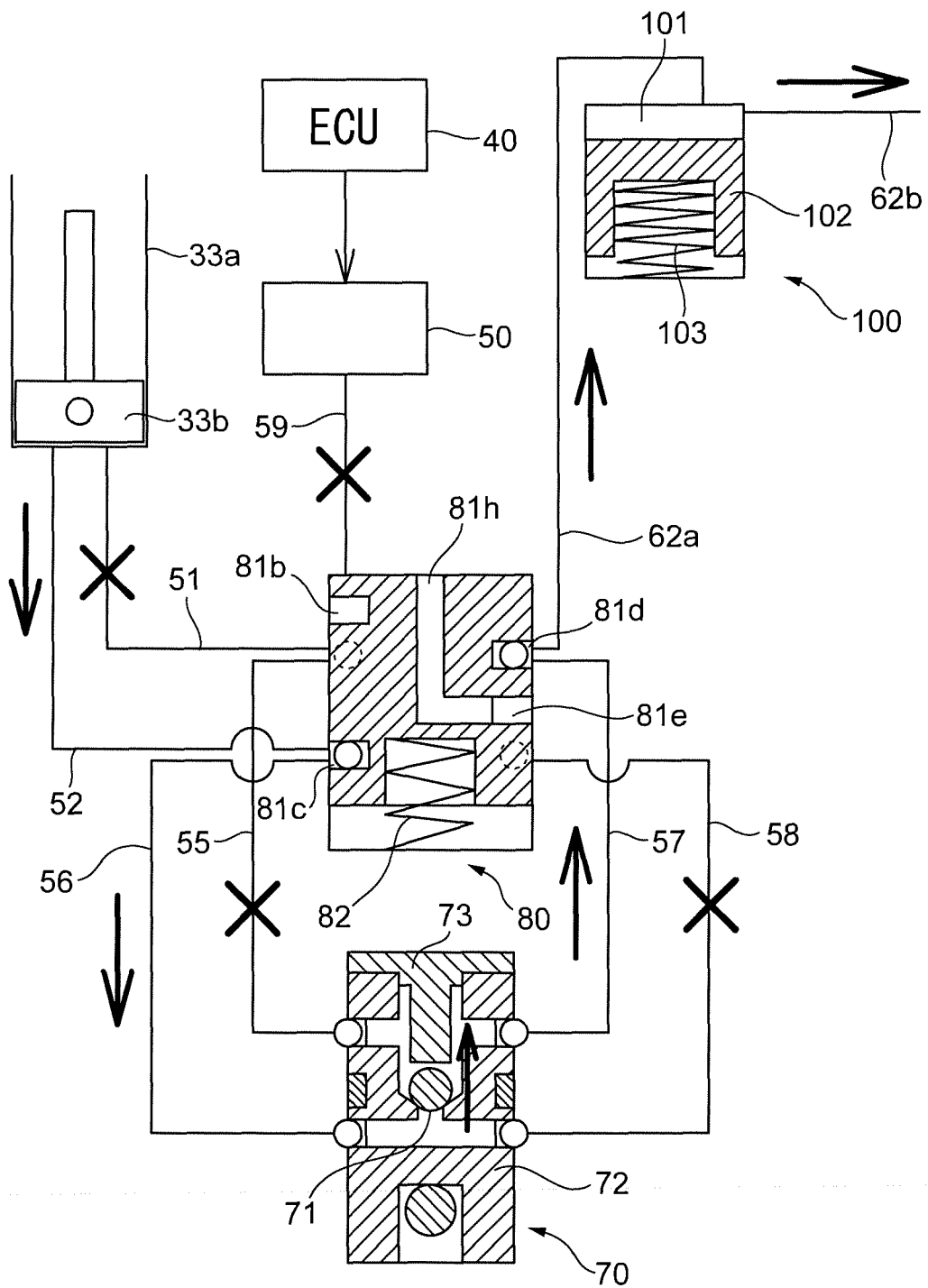
FIG. 32 is a schematic view explaining a flow of hydraulic oil when oil pressure is not being supplied from an oil pressure supply source to a switching pin.

Next, referring to FIG. 31 and FIG. 32, the operation of the variable length connecting rod 6c will be explained. FIG. 31 is a schematic view explaining a flow of hydraulic oil when oil pressure is being supplied from the oil pressure supply source 50 to the switching pin 81. Further, FIG. 32 is a schematic view explaining a flow of hydraulic oil when oil pressure is not being supplied from the oil pressure supply source 50 to the switching pin 81.

As shown in FIG. 31, when a predetermined pressure or more of oil pressure is being supplied from the oil pressure supply source 50, the switching pin 81 is positioned at the first position against the biasing force of the first biasing spring 82. At this time, the first piston communicating oil path 51 communicated with the hydraulic cylinder 33a and the first space communicating oil path 55 communicated with the secondary side of the check valve 70 are communicated through the first through hole 81b of the switching pin 81. Further, the oil pressure supply path 59 communicated with the oil pressure supply source 50 and the fourth space communicating oil path 58 communicated with the primary side of the check valve 70 are communicated through the pin holding space 47, hydraulic oil supply path 81h, and fourth through hole 81e. On the one hand, the communication between the second piston communicating oil path 52 communicated with the hydraulic cylinder 33a and the second space communicating oil path 56 communicated with the primary side of the check valve 70 is cut by the switching pin 81. Further, the communication between the first discharge oil path 62a communicated with the backflow prevention mechanism holding space 101 and the third space communicating oil path 57 communicated with the secondary side of the check valve 70 is cut by the switching pin 81.

Therefore, at the first position, the switching pin 81 makes the first piston communicating oil path 51 communicate with the first space communicating oil path 55, and makes the oil pressure supply path 59 communicate with the fourth space communicating oil path 58. In other words, at the first position, the switching pin 81 makes the hydraulic cylinder 33a communicate with the secondary side of the check valve 70, and makes the oil pressure supply source 50 communicate with the primary side of the check valve 70. Further, at the first position, the switching pin 81 cuts the communication between the second piston communicating oil path 52 and the second space communicating oil path 56, and cuts the communication between the first discharge oil path 62a and the third space communicating oil path 57. In other words, at the first position, the switching pin 81 cuts the communication between the hydraulic cylinder 33a and the primary side of the check valve 70, and cuts the communication between the backflow prevention mechanism holding space 101 and the secondary side of the check valve 70.

In this case, the backflow prevention pin 102 is not being supplied with oil pressure, so the backflow prevention pin 102 is positioned at the second position by the biasing force of the second biasing spring 103. For this reason, the communication between the first discharge oil path 62a communicated with the pin holding space 47 and the second discharge oil path 62b communicated with the outside space of the connecting rod 6c is cut by the backflow prevention pin 102.

As a result, the flow of hydraulic oil from the oil pressure supply source 50 to the hydraulic cylinder 33a is permitted, while the flow of hydraulic oil from the hydraulic cylinder 33a to the outside space of the connecting rod 6c is prohibited. Therefore, when the switching pin 81 is positioned at the first position, the flow direction switching mechanism 35 is in the first state where it prohibits the flow of hydraulic oil from the hydraulic cylinder 33a to the outside space of the connecting rod 6c and permits the flow of hydraulic oil from the oil pressure supply source 50 to the hydraulic cylinder 33a. If the flow direction switching mechanism 35 is made the first state, in the same way as the third embodiment, the eccentric member 32 turns in one direction and the effective length of the connecting rod 6b becomes longer. As a result, the mechanical compression ratio at the internal combustion engine 1 becomes higher.

On the one hand, as shown in FIG. 32, when oil pressure is not being supplied from the oil pressure supply source 50, the switching pin 81 is positioned at the second position by the biasing force of the first biasing spring 82. At this time, the second piston communicating oil path 52 communicated with the hydraulic cylinder 33a and the second space communicating oil path 56 communicated with the primary side of the check valve 70 are communicated through the second through hole 81c of the switching pin 81. Further, the first discharge oil path 62a communicated with the backflow prevention mechanism holding space 101 and the third space communicating oil path 57 communicated with the secondary side of the check valve 70 are communicated through the third through hole 81d of the switching pin 81. On the other hand, the communication between the first piston communicating oil path 51 communicated with the hydraulic cylinder 33a and the first space communicating oil path 55 communicated with the secondary side of the check valve 70 is cut by the switching pin 81. Further, the communication between the oil pressure supply path 59 communicated with the oil pressure supply source 50 and the fourth space communicating oil path 58 communicated with the primary side of the check valve 70 is cut by the switching pin 81.

Therefore, at the second position, the switching pin 81 makes the second piston communicating oil path 52 communicate with the second space communicating oil path 56, and makes the first discharge oil path 62a communicate with the third space communicating oil path 57. In other words, at the second position, the switching pin 81 makes the hydraulic cylinder 33a communicate with the primary side of the check valve 70, and makes the backflow prevention mechanism holding space 101 communicate with the secondary side of the check valve 70. Further, at the second position, the switching pin 81 cuts the communication between the first piston communicating oil path 51 and the first space communicating oil path 55, and cuts the communication between the oil pressure supply path 59 and the fourth space communicating oil path 58. In other words, at the second position, the switching pin 81 cuts the communication between the hydraulic cylinder 33a and the secondary side of the check valve 70, and cuts the communication between the oil pressure supply source 50 and the primary side of the check valve 70.

In this case, the backflow prevention pin 102 is supplied with a predetermined pressure or more of oil pressure, so the backflow prevention pin 102 is positioned at the first position against the second biasing spring 103. For this reason, the first discharge oil path 62a communicated with the pin holding space 47 and the second discharge oil path 62b communicated with the outside of the connecting rod body 31 are communicated through the backflow prevention mechanism holding space 101.

As a result, the flow of hydraulic oil from the hydraulic cylinder 33a to the outside space of the connecting rod 6c is permitted, while the flow of hydraulic oil from the oil pressure supply source 50 to the hydraulic cylinder 33a is prohibited. Therefore, when the switching pin 81 is positioned at the second position, the flow direction switching mechanism 35 is in the second state where it prohibits the flow of hydraulic oil from the oil pressure supply source 50 to the hydraulic cylinder 33a and permits the flow of hydraulic oil from the hydraulic cylinder 33a to the outside space of the connecting rod 6c. If the flow direction switching mechanism 35 is made the second state, in the same way as the third embodiment, the eccentric member 32 turns in the other direction and the effective length of the connecting rod 6b becomes shorter. As a result, the mechanical compression ratio at the internal combustion engine 1 becomes lower.

When the flow direction switching mechanism 35 is in the second state, if the hydraulic piston 33b abuts against the bottom part of the hydraulic cylinder 33a, the discharge of the hydraulic oil inside the hydraulic cylinder 33a ends. If the discharge of the hydraulic oil ends, the oil pressure acting on the backflow prevention pin 102 becomes smaller than the biasing force of the second biasing spring 103. As a result, the backflow prevention pin 102 moves to the second position due to the biasing force of the second biasing spring 103 and cuts the communication between the first discharge oil path 62a and the second discharge oil path 62b. For this reason, movement of the oil from the second discharge oil path 62b to the flow direction switching mechanism 35 is prohibited. Therefore, when the switching pin 81 is in the second position, the backflow prevention mechanism 100 permits the movement of hydraulic oil from the flow direction switching mechanism 35 to the outside space of the connecting rod 6c and prohibits the movement of the fluid from the outside space of the connecting rod 6c to the flow direction switching mechanism 35. Therefore, in the present embodiment, due to the backflow prevention mechanism 100, it is possible to keep air from flowing from the second discharge oil path 62b to the flow direction switching mechanism 35 and in turn to suppress the inflow of air to the hydraulic cylinder 33a.

Note that, in the present embodiment, the first piston communicating oil path 51 and the second piston communicating oil path 52 correspond to a first oil path making the hydraulic cylinder 33a and the pin holding space 47 communicate. Further, the oil pressure supply path 59 and the discharge oil path (first discharge oil path 62a and second discharge oil path 62b) correspond to a second oil path making the hydraulic mechanism handling the hydraulic oil (oil pressure supply source 50) and the outside space of the connecting rod 6c, and pin holding space 47 communicate.

Fifth Embodiment

Next, referring to FIG. 33 to FIG. 39, a variable length connecting rod 6d according to a fifth embodiment of the present invention will be explained. The configuration and operation of the variable length connecting rod 6d according to the fifth embodiment are basically similar to the configuration and operation of the variable length connecting rod 6b according to the third embodiment except for the points explained below.

Figure 33:
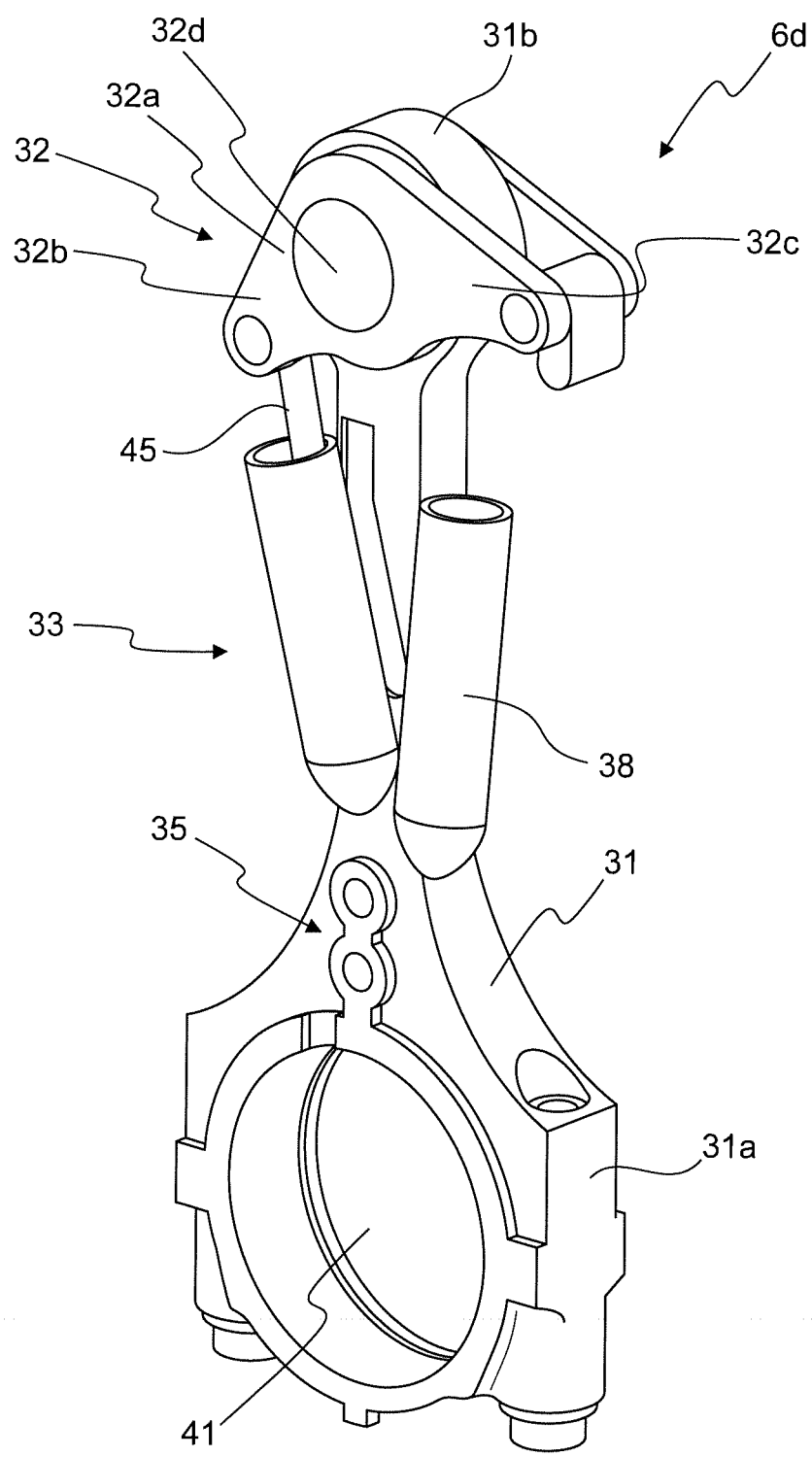
FIG. 33 is a perspective view schematically showing a variable length connecting rod according to a fifth embodiment.
Figure 34:
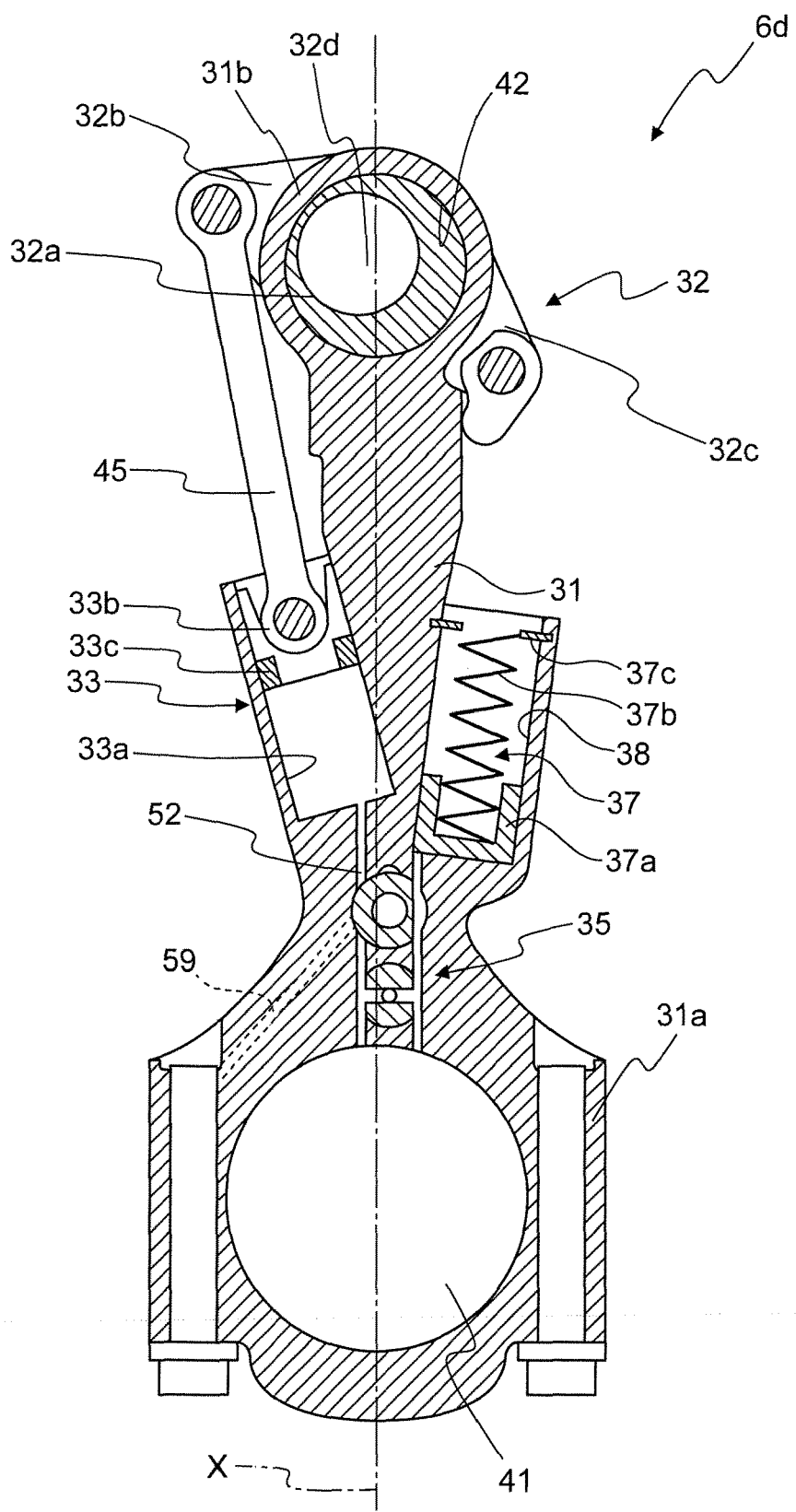
FIG. 34 is a side cross-sectional view schematically showing a variable length connecting rod according to the fifth embodiment.
Figure 35:
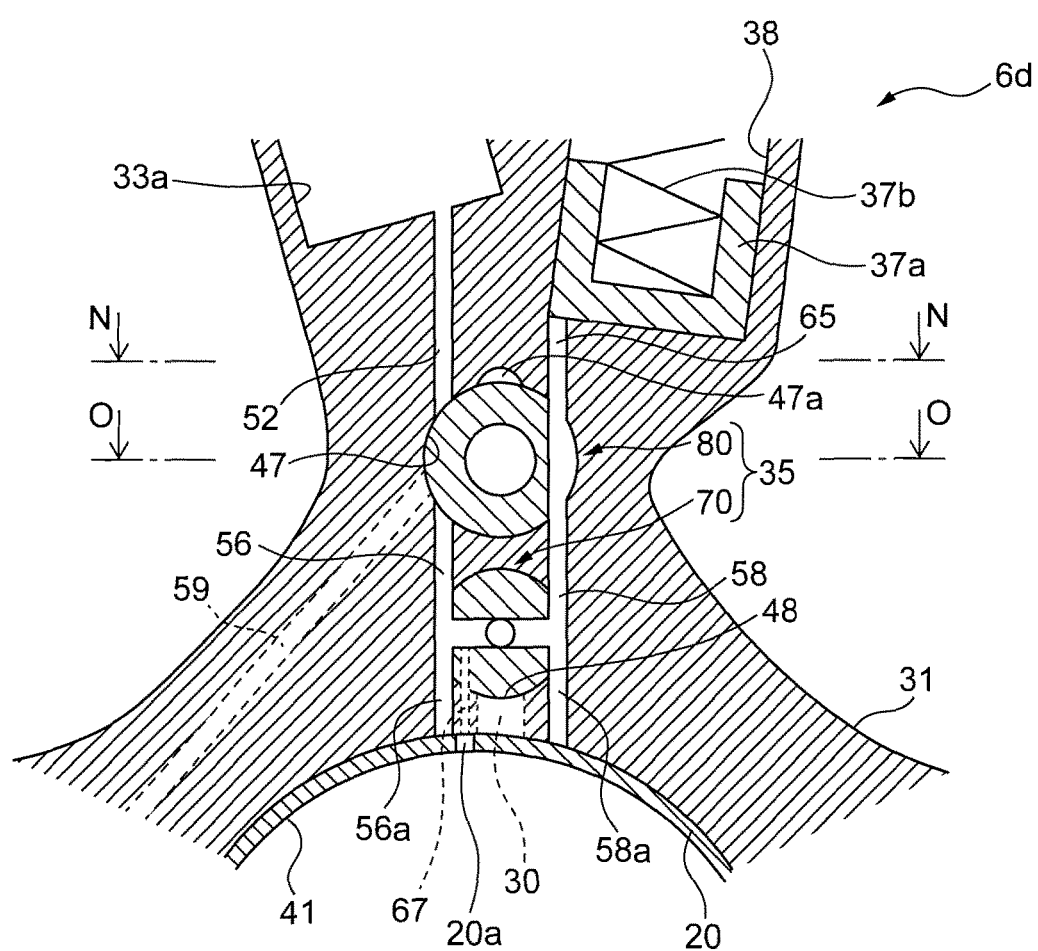
FIG. 35 is a side cross-sectional view of a variable length connecting rod enlarging the region in which the flow direction switching mechanism is provided.

FIG. 33 is a perspective view schematically showing a variable length connecting rod 6d according to the fifth embodiment. FIG. 34 is a side cross-sectional view schematically showing the variable length connecting rod 6d according to the fifth embodiment. The variable length connecting rod 6d further comprises a pushing mechanism 37 and storage chamber 38. Further, as shown in FIG. 35, in the fifth embodiment, in the same way as the first embodiment, inside of the connecting rod body 31, a refill-use oil path 67 for refilling hydraulic oil in the primary side of the check valve 70 is formed.

<Storage Chamber and Pushing Mechanism>

Below, referring to FIG. 34, the configurations of the storage chamber 38 and pushing mechanism 37 will be explained. The storage chamber 38 can be formed in the connecting rod body 31 and store hydraulic oil. The storage chamber 38 is arranged in its entirety at the second arm 32c side from the axial line X of the connecting rod 6. That is, the storage chamber 38 is arranged at the opposite side from the hydraulic cylinder 33a from the axial line X of the connecting rod 6. Further, the storage chamber 38 is arranged slanted by exactly a certain extent of angle with respect to the axial line X so as to stick out to the outside in the width direction of the connecting rod body 31 the closer to the small diameter end part 31b. The storage chamber 38 sticks out in a direction opposite to the direction of projection of the hydraulic cylinder 33a.

The pushing mechanism 37 is arranged inside the storage chamber 38 and pushes the hydraulic oil stored in the storage chamber 38 toward the flow direction switching mechanism 35. The pushing mechanism 37 has a pushing pin 37a, a pushing spring 37b pushing hydraulic oil through the pushing pin 37a, and a spring support member 37c supporting the pushing spring 37b. The pushing pin 37a has a columnar shape and slides inside the storage chamber 38. The pushing pin 37a is not connected with the eccentric member 32, so it can operate independently from the eccentric member 32.

The pushing spring 37b is, for example, a coil spring and is configured to push the pushing pin 37a toward the flow direction switching mechanism 35 regardless of the sliding position of the pushing pin 37a. The spring support member 37c is for example a C-ring, E-ring, or other snap ring and is arranged in a circumferential groove formed in the storage chamber 38.

Figure 36:
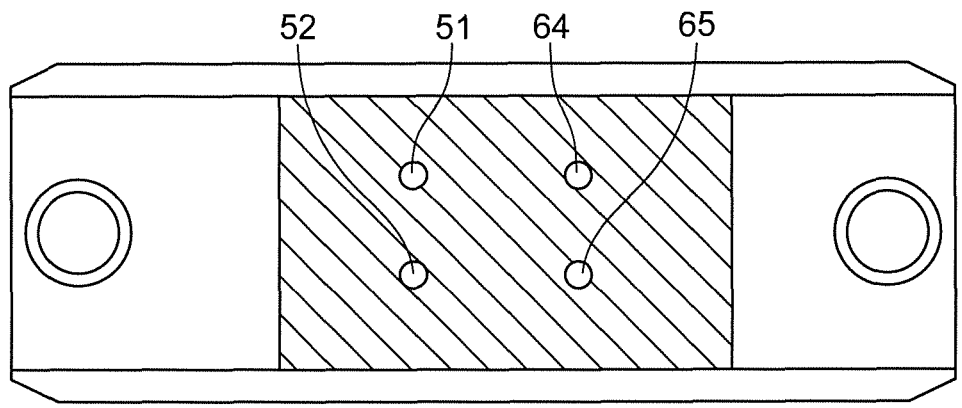
FIG. 36 is a cross-sectional view of a variable length connecting rod along the line N-N of FIG. 35.
Figure 37:
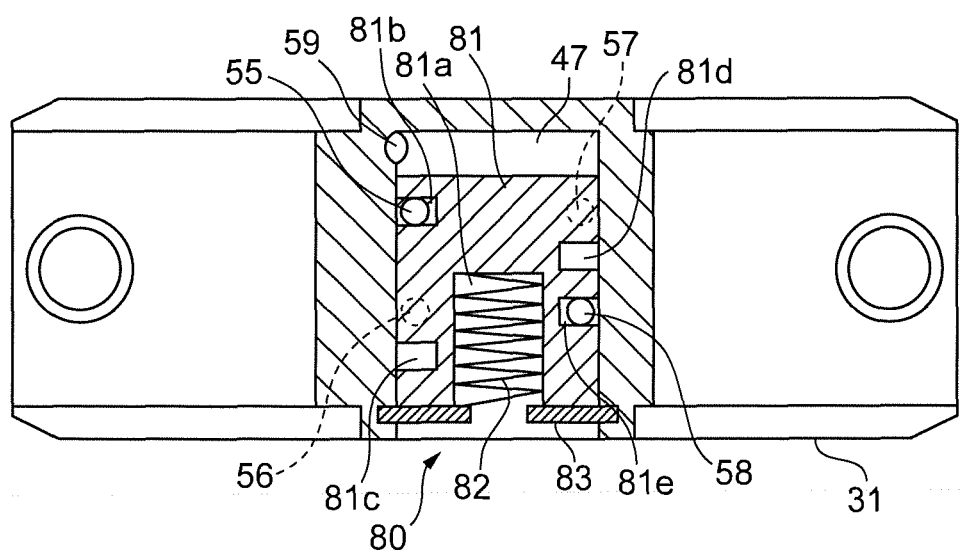
FIG. 37 is a cross-sectional view of a variable length connecting rod along the line O-O of FIG. 35.

FIG. 35 is a side cross-sectional view of a variable length connecting rod 6d enlarging the region in which the flow direction switching mechanism 35 is provided. FIG. 36 is a cross-sectional view of the variable length connecting rod 6d along the line N-N of FIG. 35. FIG. 37 is a cross-sectional view of the variable length connecting rod 6d along the line O-O of FIG. 35. As will be understood from FIG. 35 and FIG. 36, inside the connecting rod body 31, a first storage chamber communicating oil path 64 and second storage chamber communicating oil path 65, which are making the storage chamber 38 and the pin holding space 47 communicate, are formed. The first storage chamber communicating oil path 64 and the second storage chamber communicating oil path 65 extend in the axial line direction of the connecting rod body 31.

The first storage chamber communicating oil path 64 and the second storage chamber communicating oil path 65 are separated from each other in the thickness direction of the connecting rod body 31 and are formed at the same position in the axial line direction and width direction of the connecting rod body 31. The first piston communicating oil path 51 and first storage chamber communicating oil path 64 are separated from each other in the width direction of the connecting rod body 31 and are formed at the same position in the thickness direction of the connecting rod body 31. The second piston communicating oil path 52 and second storage chamber communicating oil path 65 are separated from each other in the width direction of the connecting rod body 31 and are formed at the same positions in the thickness direction of the connecting rod body 31.

The first storage chamber communicating oil path 64 and the third space communicating oil path 57 are formed on the same straight line, while the second storage chamber communicating oil path 65 and the fourth space communicating oil path 58 are formed on the same straight line. For this reason, it is possible to easily form the first storage chamber communicating oil path 64 and second storage chamber communicating oil path 65 by cutting from the crank receiving opening 41 by a drill etc.

<Operation of Variable Length Connecting Rod>

Figure 38:
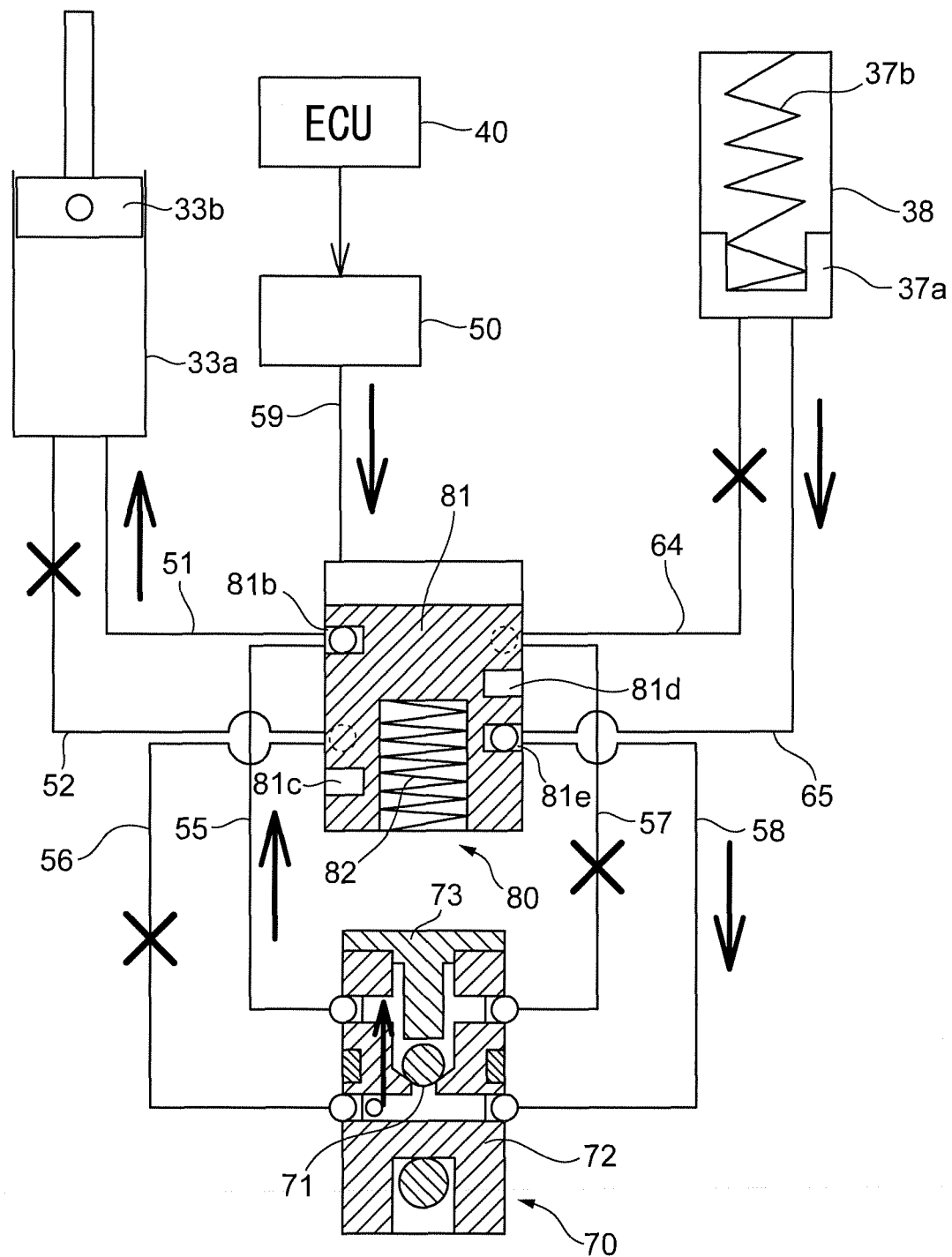
FIG. 38 is a schematic view explaining a flow of hydraulic oil when oil pressure is being supplied from an oil pressure supply source to a switching pin.
Figure 39:
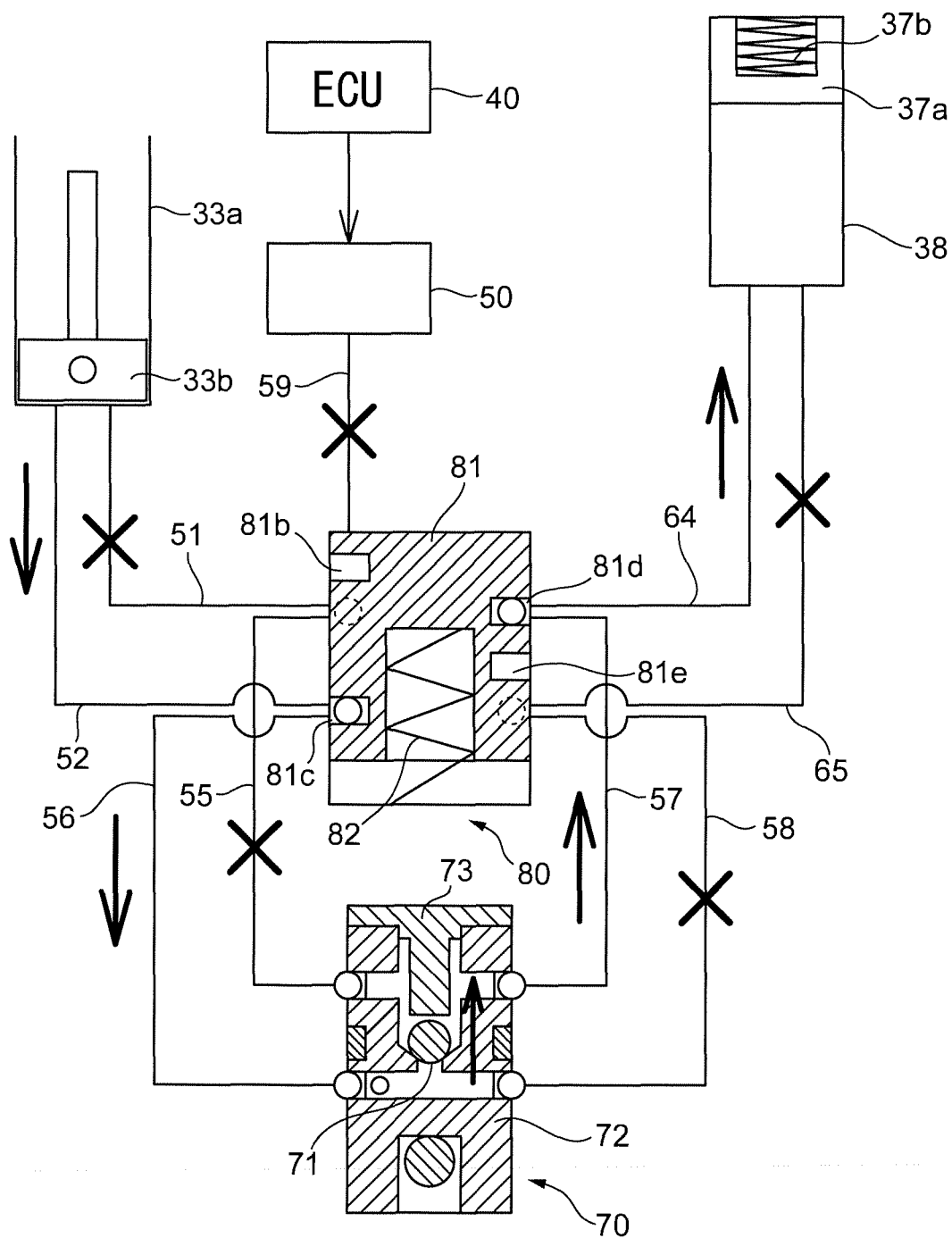
FIG. 39 is a schematic view explaining a flow of hydraulic oil when oil pressure is not being supplied from an oil pressure supply source to a switching pin.

Below, referring to FIG. 38 and FIG. 39, the operation of the variable length connecting rod 6d will be explained. FIG. 38 is a schematic view explaining a flow of hydraulic oil when oil pressure is being supplied from the oil pressure supply source 50 to the switching pin 81. Further, FIG. 39 is a schematic view explaining a flow of hydraulic oil when oil pressure is not being supplied from the oil pressure supply source 50 to the switching pin 81.

As shown in FIG. 38, when a predetermined pressure or more of oil pressure is being supplied from the oil pressure supply source 50, the switching pin 81 is positioned at the first position against the biasing force of the first biasing spring 82. At this time, the first piston communicating oil path 51 communicated with the hydraulic cylinder 33a and the first space communicating oil path 55 communicated with the secondary side of the check valve 70 are communicated through the first through hole 81b of the switching pin 81. Further, the second storage chamber communicating oil path 65 communicated with the storage chamber 38 and the fourth space communicating oil path 58 communicated with the primary side of the check valve 70 are communicated through the fourth through hole 81e of the switching pin 81. On the one hand, the communication between the second piston communicating oil path 52 communicated with the hydraulic cylinder 33a and the second space communicating oil path 56 communicated with the primary side of the check valve 70 is cut by the switching pin 81. Further, the communication between the first storage chamber communicating oil path 64 communicated with the storage chamber 38 and the third space communicating oil path 57 communicated with the secondary side of the check valve 70 is cut by the switching pin 81.

Therefore, at the first position, the switching pin 81 makes the first piston communicating oil path 51 communicate with the first space communicating oil path 55, and makes the second storage chamber communicating oil path 65 communicate with the fourth space communicating oil path 58. In other words, at the first position, the switching pin 81 makes the hydraulic cylinder 33a communicate with the secondary side of the check valve 70, and makes the storage chamber 38 communicate with the primary side of the check valve 70. Further, at the first position, the switching pin 81 cuts the communication between the second piston communicating oil path 52 and the second space communicating oil path 56, and cuts the communication between the first storage chamber communicating oil path 64 and the third space communicating oil path 57. In other words, at the first position, the switching pin 81 cuts the communication between the hydraulic cylinder 33a and the primary side of the check valve 70, and cuts the communication between the storage chamber 38 and the secondary side of the check valve 70.

As a result, the flow of hydraulic oil from the storage chamber 38 to the hydraulic cylinder 33a is permitted, while the flow of hydraulic oil from the hydraulic cylinder 33a to the storage chamber 38 is prohibited. Therefore, when the switching pin 81 is positioned at the first position, the flow direction switching mechanism 35 is in the first state where it prohibits the flow of hydraulic oil from the hydraulic cylinder 33a to the storage chamber 38 and permits the flow of hydraulic oil from the storage chamber 38 to the hydraulic cylinder 33a. If the flow direction switching mechanism 35 is made the first state, the storage chamber 38 supplies hydraulic oil to the hydraulic cylinder 33a. As a result, in the same way as the third embodiment, the eccentric member 32 turns in one direction and the effective length of the connecting rod 6d becomes longer. As a result, the mechanical compression ratio in the internal combustion engine 1 becomes higher.

On the one hand, as shown in FIG. 39, when oil pressure is not being supplied from the oil pressure supply source 50, the switching pin 81 is positioned at the second position by the biasing force of the first biasing spring 82. At this time, the second piston communicating oil path 52 communicated with the hydraulic cylinder 33a and the second space communicating oil path 56 communicated with the primary side of the check valve 70 are communicated through the second through hole 81c of the switching pin 81. Further, the first storage chamber communicating oil path 64 communicated with the storage chamber 38 and the third space communicating oil path 57 communicated with the secondary side of the check valve 70 are communicated through the third through hole 81d of the switching pin 81. On the other hand, the communication between the first piston communicating oil path 51 communicated with the hydraulic cylinder 33a and the first space communicating oil path 55 communicated with the secondary side of the check valve 70 is cut by the switching pin 81. Further, the communication between the second storage chamber communicating oil path 65 communicated with the storage chamber 38 and the fourth space communicating oil path 58 communicated with the primary side of the check valve 70 is cut by the switching pin 81.

Therefore, at the second position, the switching pin 81 makes the second piston communicating oil path 52 communicate with the second space communicating oil path 56, and makes the first storage chamber communicating oil path 64 communicate with the third space communicating oil path 57. In other words, at the second position, the switching pin 81 makes the hydraulic cylinder 33a communicate with the primary side of the check valve 70, and makes the storage chamber 38 communicate with the secondary side of the check valve 70. Further, at the second position, the switching pin 81 cuts the communication between the first piston communicating oil path 51 and the first space communicating oil path 55, and cuts the communication between the second storage chamber communicating oil path 65 and the fourth space communicating oil path 58. In other words, at the second position, the switching pin 81 cuts the communication between the hydraulic cylinder 33a and the secondary side of the check valve 70, and cuts the communication between the storage chamber 38 and the primary side of the check valve 70.

As a result, the flow of hydraulic oil from the hydraulic cylinder 33a to the storage chamber 38 is permitted, while the flow of hydraulic oil from the storage chamber 38 to the hydraulic cylinder 33a is prohibited. Therefore, when switching pin 81 is positioned at the second position, the flow direction switching mechanism 35 is in the second state where it prohibits the flow of hydraulic oil from the storage chamber 38 to the hydraulic cylinder 33a and permits the flow of hydraulic oil from the hydraulic cylinder 33a to the storage chamber 38. If the flow direction switching mechanism 35 is made the second state, the storage chamber 38 receives hydraulic oil from the hydraulic cylinder 33a. As a result, in the same way as the third embodiment, the eccentric member 32 turns in the other direction whereby the effective length of the connecting rod 6d becomes shorter. As a result, the mechanical compression ratio at the internal combustion engine 1 becomes lower.

In the present embodiment, the hydraulic oil discharged from the hydraulic cylinder 33a is stored in the storage chamber 38. The stored hydraulic oil is supplied from the storage chamber 38 to the hydraulic cylinder 33a. In other words, the hydraulic oil travels back and forth between the hydraulic cylinder 33a and the storage chamber 38. For this reason, except for refill oil supplied from the refill-use oil path 67 if hydraulic oil leaks from the oil seal 33c etc., there is no need to supply hydraulic oil from the oil pressure supply source 50 to the hydraulic cylinder 33a. Therefore, in the present embodiment, the load on the oil pressure supply source 50 can be lightened.

Note that, in the present embodiment, the first piston communicating oil path 51 and the second piston communicating oil path 52 correspond to a first oil path making the hydraulic cylinder 33a and the pin holding space 47 communicate. Further, the first storage chamber communicating oil path 64 and the second storage chamber communicating oil path 65 correspond to a second oil path making the hydraulic mechanism handling the hydraulic oil (storage chamber 38) and the pin holding space 47 communicate.

Sixth Embodiment

Next, referring to FIG. 40 to FIG. 49, a variable length connecting rod 6e according to a sixth embodiment of the present invention will be explained. The configuration and operation of the variable length connecting rod 6e according to the sixth embodiment are basically similar to the configuration and operation of the variable length connecting rod 6b according to the third embodiment except for the points explained below.

Figure 40:
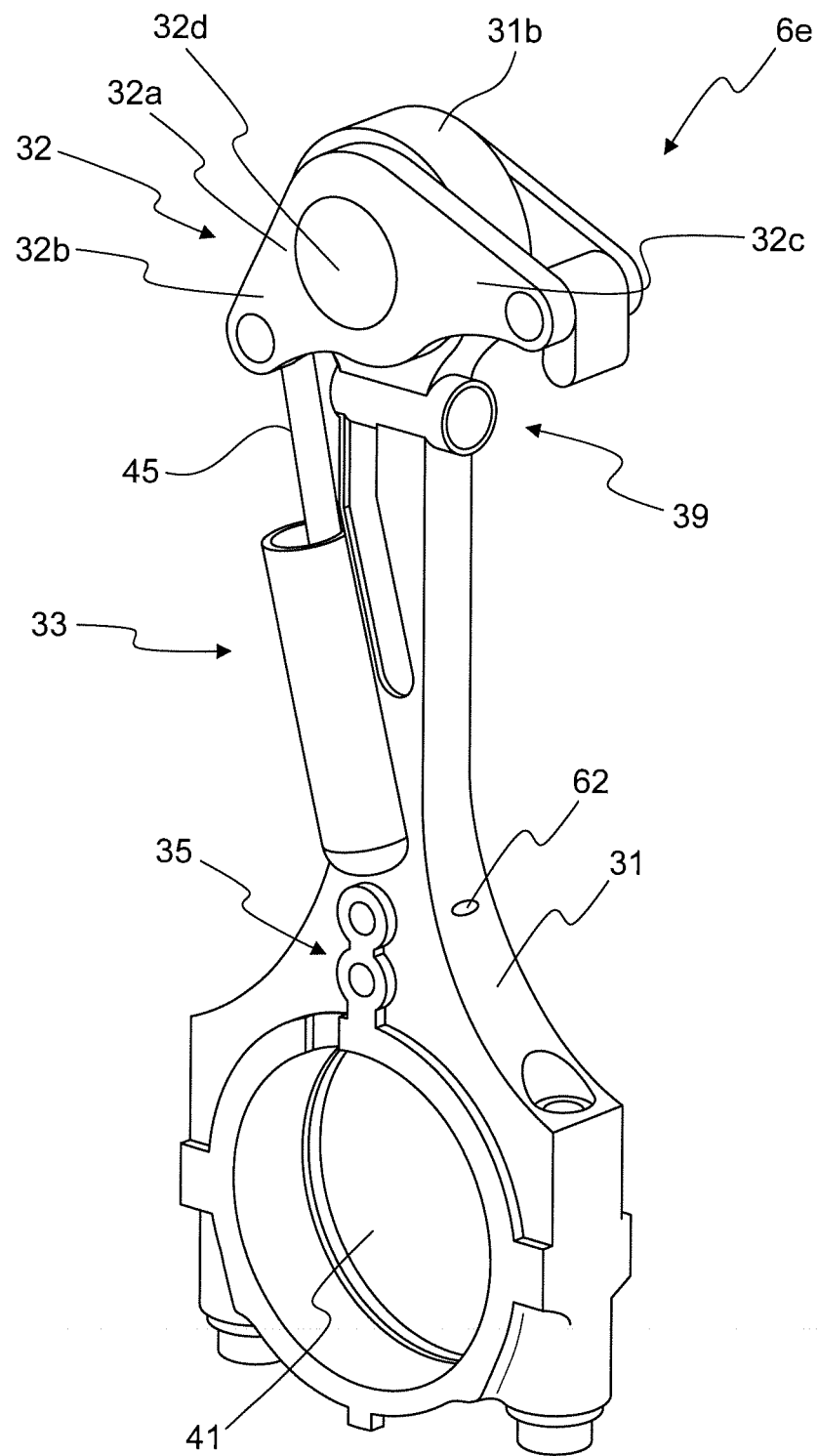
FIG. 40 is a perspective view schematically showing a variable length connecting rod according to a sixth embodiment.
Figure 41:
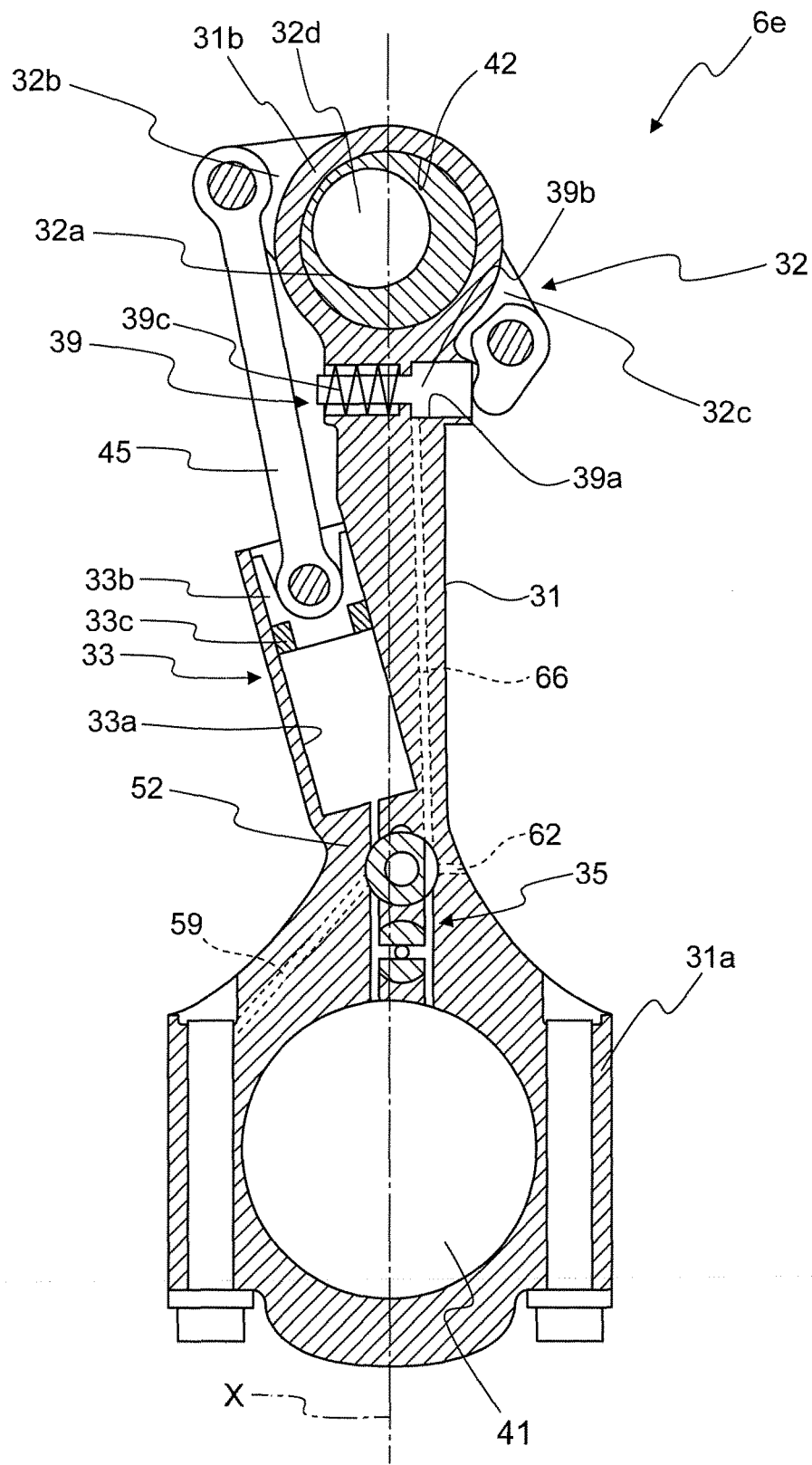
FIG. 41 is a side cross-sectional view schematically showing a variable length connecting rod according to the sixth embodiment.

FIG. 40 is a perspective view schematically showing the variable length connecting rod 6e according to the sixth embodiment. FIG. 41 is a side cross-sectional view schematically showing the variable length connecting rod 6e according to the sixth embodiment. The variable length connecting rod 6e further comprises a stop device 39.

<Stop Device>

Next, the stop device 39 will be explained. The stop device 39 is configured so as to switch the stop position of turning of the eccentric member 32 in one direction due to the oil pressure supplied from outside of the connecting rod body 31 (turning clockwise in FIG. 41) to two stages.

The stop device 39 comprises a stop cylinder 39a formed in the connecting rod body 31, a stop member 39b able to slide inside the stop cylinder 39a, and a third biasing spring 39c biasing the stop member 39b to the retracted position. In the example shown in FIG. 41, the stop cylinder 39a and the stop member 39b are arranged so that their axial lines extend in the width direction of the connecting rod body 31. However, these stop cylinder 39a and stop member 39b may extend in a slant with respect to the width direction of the connecting rod body 31.

The stop member 39b can slide between a projecting position where it at least partially projects out from the connecting rod body 31 at the second arm 32c side of the eccentric member 32, and a retracted position where at least almost all is held inside the connecting rod body 31 (that is, inside the stop cylinder 39a). The stop member 39b is arranged so that at the positions of both the projecting position and retracted position, it abuts against the second arm 32c of the eccentric member 32 turned in one direction.

Figure 42:
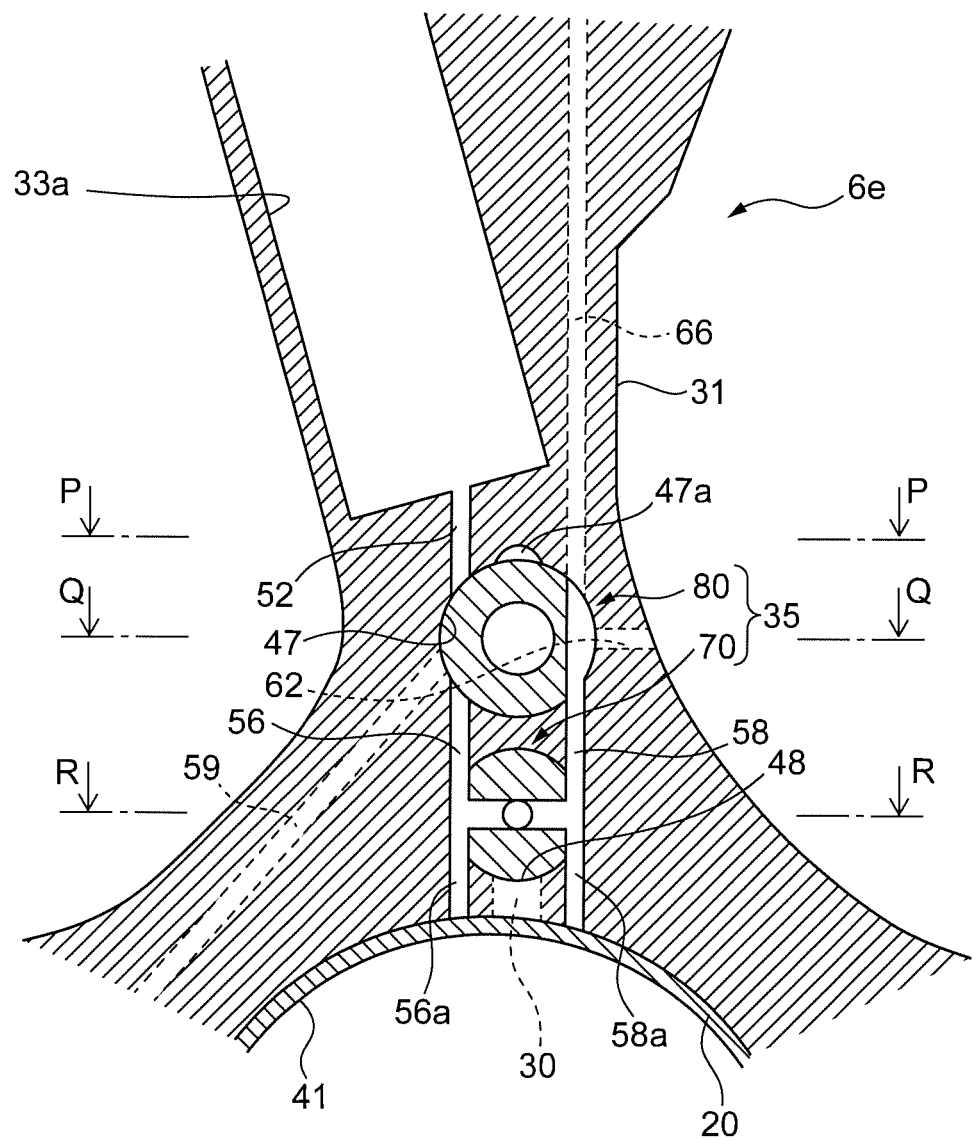
FIG. 42 is a side cross-sectional view of a variable length connecting rod enlarging the region in which the flow direction switching mechanism is provided.
Figure 43:
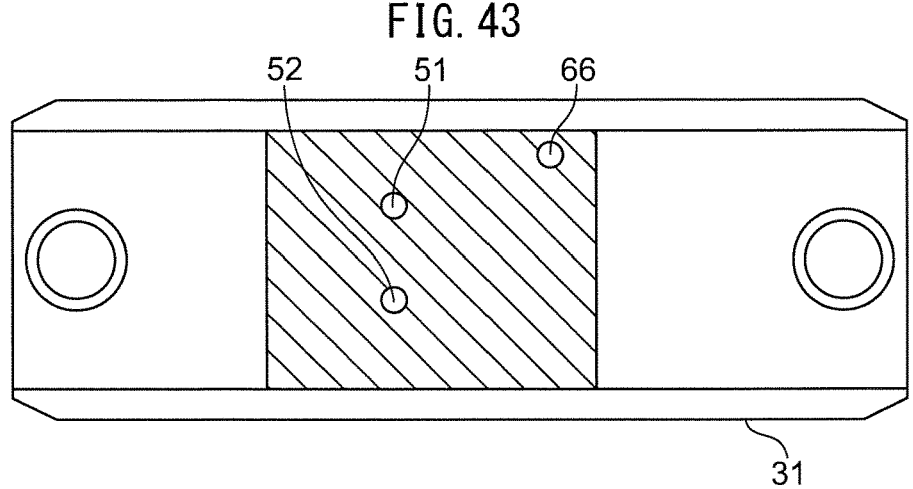
FIG. 43 is a cross-sectional view of a variable length connecting rod along the line P-P of FIG. 42.
Figure 44:
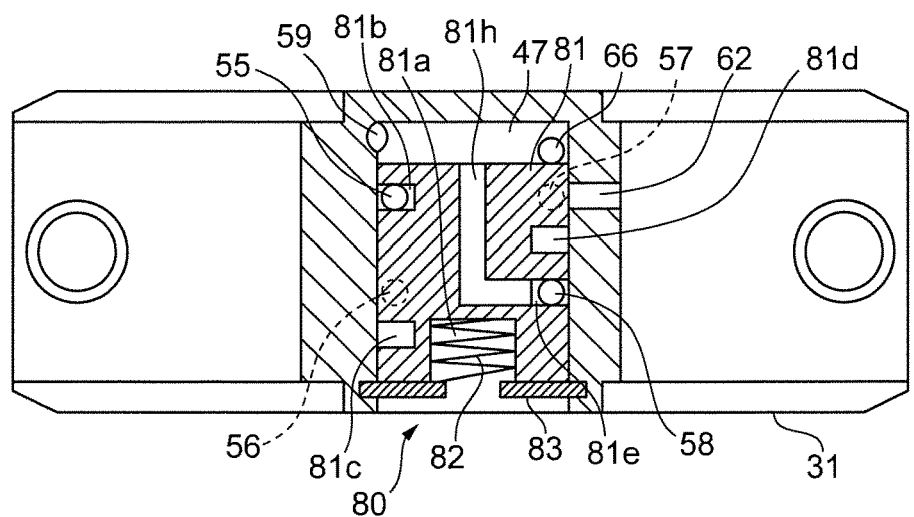
FIG. 44 is a cross-sectional view of a variable length connecting rod along the line Q-Q of FIG. 42.
Figure 45:
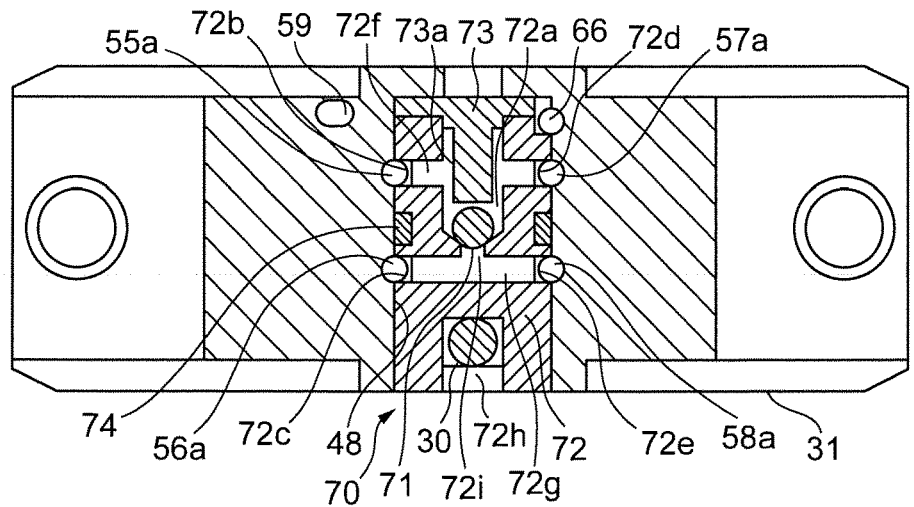
FIG. 45 is a cross-sectional view of a variable length connecting rod along the line R-R of FIG. 42.

FIG. 42 is a side cross-sectional view of the variable length connecting rod 6e enlarging the region in which the flow direction switching mechanism 35 is provided. FIG. 43 is a cross-sectional view of the variable length connecting rod 6e along the line P-P of FIG. 42. FIG. 44 is a cross-sectional view of the variable length connecting rod 6e along the line Q-Q of FIG. 42. FIG. 45 is a cross-sectional view of the variable length connecting rod 6e along the line R-R of FIG. 42.

As will be understood from FIG. 41 to FIG. 44, inside the connecting rod body 31, a hydraulic oil path 66 for supplying oil pressure from an oil pressure supply source outside of the connecting rod body 31 to the stop member 39b is formed. Note that, for reference, the hydraulic oil path 66 is shown by broken lines in FIG. 41 and FIG. 42. The hydraulic oil path 66 extends from the stop cylinder 39a to the crank receiving opening 41 in the axial line direction of the connecting rod body 31. For this reason, the hydraulic oil path 66 can be easily formed by cutting from the crank receiving opening 41 by a drill etc. Further, the hydraulic oil path 66 is for example closed by bearing metal 20. Due to this, the bearing metal 20 can be used to enable the hydraulic oil path 66 to be easily closed by just assembling the connecting rod 6 with the crank pin 22.

The hydraulic oil path 66 makes the stop cylinder 39a and the pin holding space 47 communicate. As shown in FIG. 44, the hydraulic oil path 66 is communicated with the pin holding space 47 at the closed end part side of the pin holding space 47 in the thickness direction of the connecting rod body 31. The hydraulic oil path 66 is arranged at substantially the same position as the oil pressure supply path 59 in the thickness direction of the connecting rod body 31.

As will be understood from FIG. 44, the hydraulic oil path 66 is communicated with the oil pressure supply path 59 through the pin holding space 47 when the switching pin 81 is positioned at the first position. Due to this, oil pressure is supplied through the oil pressure supply path 59, pin holding space 47, and hydraulic oil path 66 from an outside oil pressure supply source to the stop member 39b.

In the stop device 39, when the stop member 39b is not being supplied with a predetermined pressure or more of high oil pressure, the biasing force of the third biasing spring 39c causes the stop member 39b to be retracted to the retracted position. On the one hand, when the stop member 39b is being supplied with a predetermined pressure or more of high oil pressure, the oil pressure causes the stop member 39b to move to a projecting position.

<Operation of Variable Length Connecting Rod>

Figure 46:
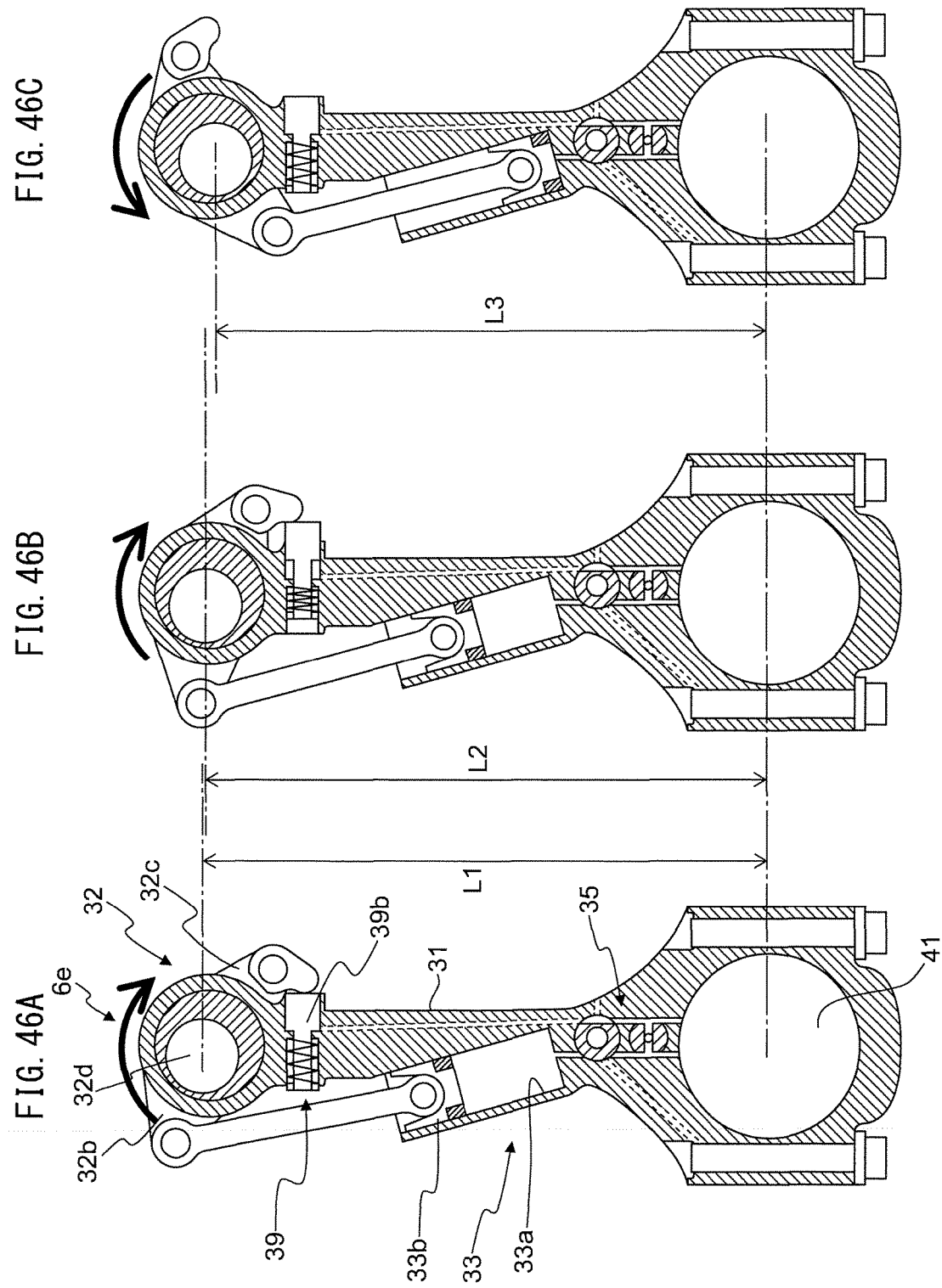
FIG. 46A is a side cross-sectional view schematically showing a variable length connecting rod according to the sixth embodiment.
FIG. 46B is a side cross-sectional view schematically showing a variable length connecting rod according to the sixth embodiment.
FIG. 46C is a side cross-sectional view schematically showing a variable length connecting rod according to the sixth embodiment.
Figure 47:
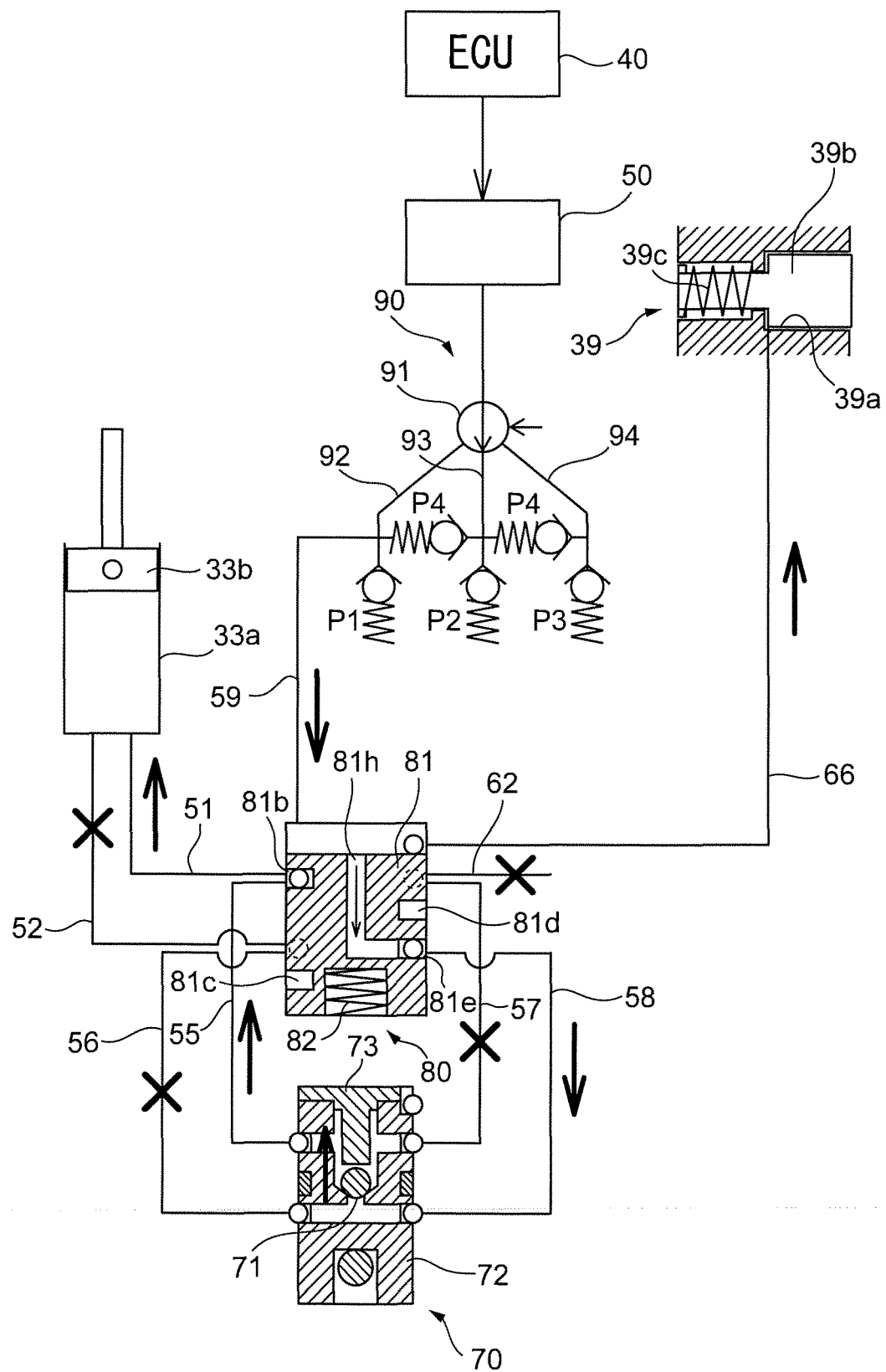
FIG. 47 is a schematic view explaining a flow of hydraulic oil when a medium extent of oil pressure is being supplied to a switching pin and stop member.
Figure 48:
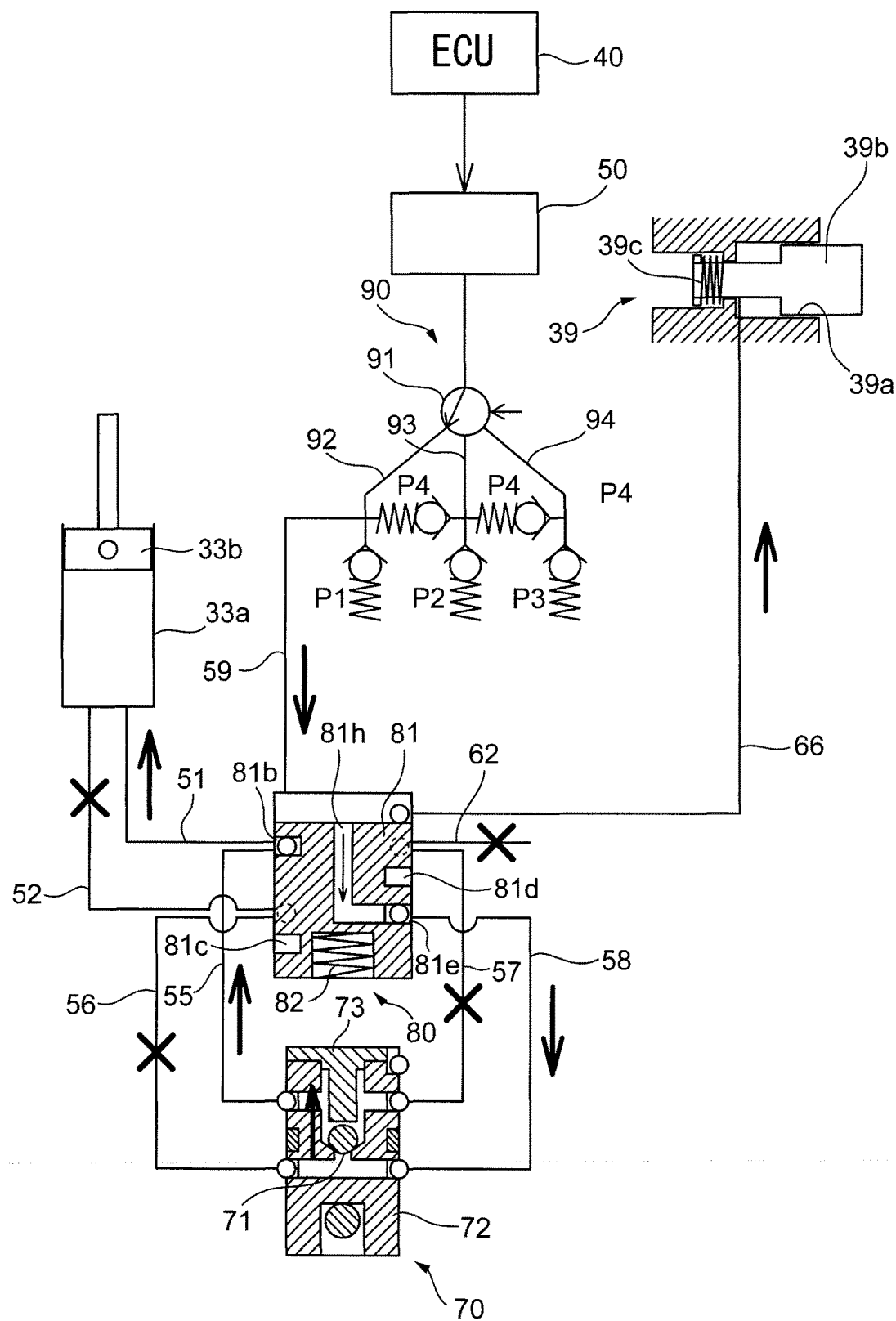
FIG. 48 is a schematic view explaining a flow of hydraulic oil when high oil pressure is being supplied to a switching pin and stop member.
Figure 49:
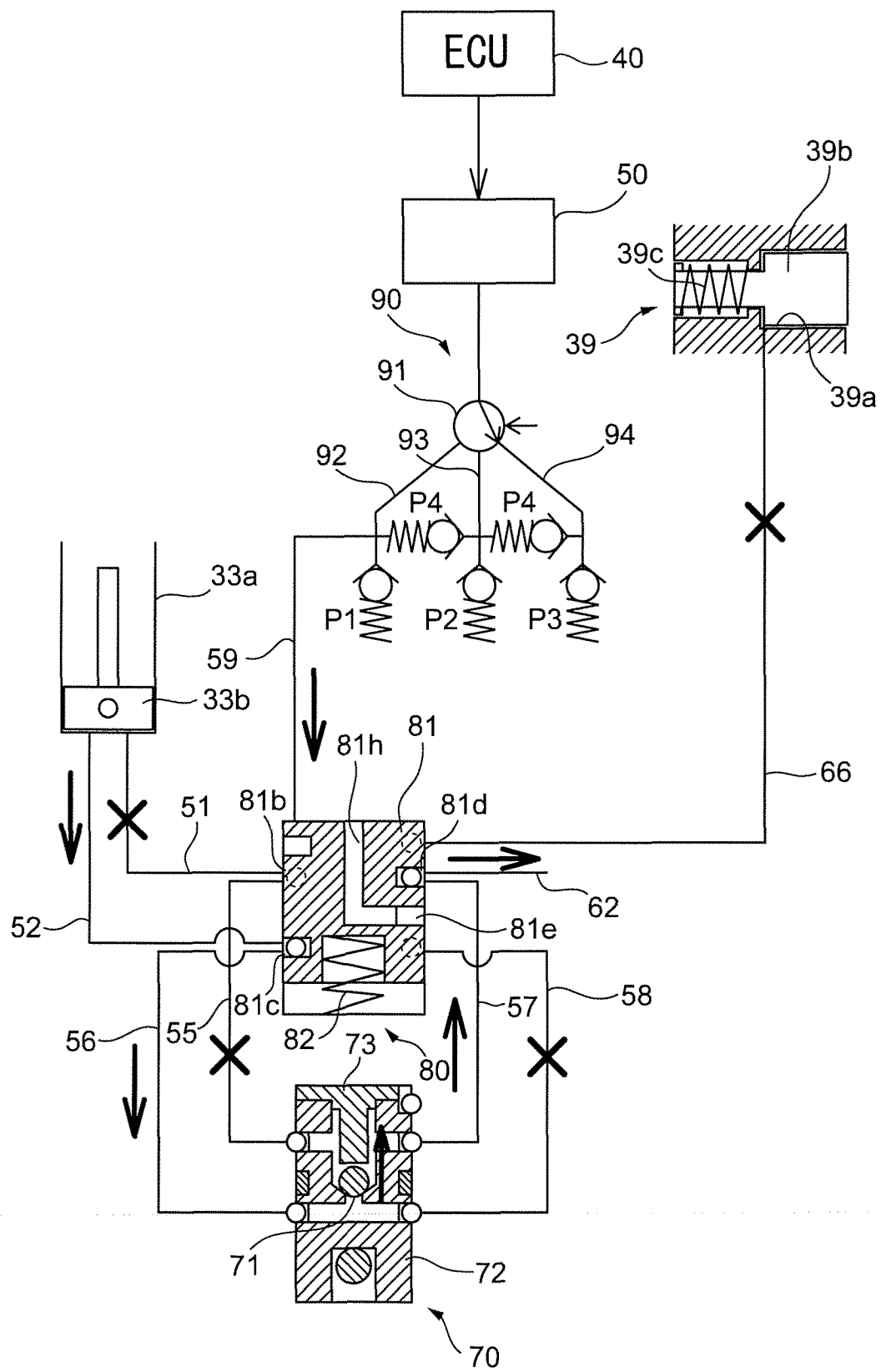
FIG. 49 is a schematic view explaining a flow of hydraulic oil when low oil pressure is being supplied to a switching pin.

Next, referring to FIG. 46A to FIG. 49, the operation of the variable length connecting rod 6e will be explained. FIGS. 46A to 46C are side cross-sectional views schematically showing the variable length connecting rod 6e according to the sixth embodiment. FIG. 46A shows a state where the flow direction switching mechanism 35 is in the first state and the stop member 39b is in the retracted position. FIG. 46B shows a state where the flow direction switching mechanism 35 is in the first state and the stop member 39b is in the projecting position. FIG. 46C shows a state where the flow direction switching mechanism 35 is in the second state and the stop member 39b is in the retracted position. FIG. 47 is a schematic view for explaining the flow of hydraulic oil when a medium extent of oil pressure is being supplied to the switching pin 81 and the stop member 39b. FIG. 48 is a schematic view for explaining the flow of hydraulic oil when a high oil pressure is being supplied to the switching pin 81 and the stop member 39b. FIG. 49 is a schematic view for explaining the flow of hydraulic oil when low oil pressure is being supplied to the switching pin 81.

Here, the oil pressure when the switching pin 81 switches between first position and the second position, that is, the oil pressure when the flow direction switching mechanism 35 switches between the first state and the second state, is made the "first threshold value". Further, the oil pressure when the operating position of the stop member 39b switches between the projecting position and retracted position is made the "second threshold value". The switching mechanism 80 and stop device 39 are configured so that the first threshold value becomes smaller than the second threshold value. Therefore, if the oil pressure supplied from the oil pressure supply source 50 rises, first, the switching pin 81 moves from the second position to the first position and the flow direction switching mechanism 35 changes from the second state to the first state. After that, if the oil pressure supplied from the oil pressure supply source 50 is made to further rise, the stop member 39b moves from the retracted position to the projecting position.

Further, in the present embodiment, the variable length connecting rod 6e further comprises an oil pressure switching mechanism 90. The oil pressure switching mechanism 90 is arranged between the oil pressure supply source 50 and oil pressure supply path 59. The oil pressure switching mechanism 90 comprises a three-way valve 91 communicating with the oil pressure supply source 50, and three oil paths 92 to 94 communicating with the three-way valve 91. The three-way valve 91 is controlled by the ECU 40.

The three oil paths 92 to 94 are provided with relief valves, respectively. The relief pressures of these relief valves are set so as to be different from each other. In the example shown in FIG. 47 to FIG. 49, the release pressures become lower in the order of the release pressure P1 of the relief valve provided at the oil path 92, the release pressure P2 of the relief valve provided at the oil path 93, and the release pressure P3 of the relief valve provided at the oil path 94 (P1>P2>P3). In addition, between the oil path 92 and the oil path 93, a relief valve opening when the pressure inside the oil path 93 becomes high is provided, while between the oil path 93 and the oil path 94, a relief valve opening when the pressure inside the oil path 94 becomes high is provided. The release pressure P4 of the relief valves provided between these oil paths is set lower than the release pressure P3 of the relief valve provided at the oil path 94. In addition, the oil path 92 communicates with the oil pressure supply path 59.

In the thus configured oil pressure switching mechanism 90, when the oil pressure supply source 50 is communicated with the oil path 93 due to the three-way valve 91, the oil pressure supplied to the oil pressure supply path 59 becomes a medium extent. In the present embodiment, the oil pressure at this time is made a pressure higher than the first threshold value and lower than the second threshold value. The oil pressure at this time is higher than the first threshold value, so, as shown in FIG. 47, the switching pin 81 is positioned at the first position against the first biasing spring 82. As a result, in the same way as the third embodiment, the flow of hydraulic oil from the oil pressure supply source 50 to the hydraulic cylinder 33a is permitted, while the flow of hydraulic oil from the hydraulic cylinder 33a to the outside space of the connecting rod 6e is prohibited. Therefore, the flow direction switching mechanism 35 is in the first state where it prohibits the flow of hydraulic oil from the hydraulic cylinder 33a to the outside space of the connecting rod 6e and permits the flow of hydraulic oil from the oil pressure supply source 50 to the hydraulic cylinder 33a.

At this time, the hydraulic cylinder 33a is supplied with hydraulic oil and the hydraulic piston 33b rises. Further, the oil pressure at this time is lower than the second threshold value, so, as shown in FIG. 47, the stop member 39b is arranged at the retracted position. As a result, as shown in FIG. 46A, the eccentric member 32 is turned to the position where it is turned the most in the direction of the arrow in the figure. Due to this, the piston pin receiving opening 32d rises in position the most. Therefore, the length between the center of the crank receiving opening 41 and the center of the piston pin receiving opening 32d, that is, the effective length of the connecting rod 6e, becomes the longest and becomes L1 in the figure. As a result, the mechanical compression ratio in the internal combustion engine 1 becomes the highest.

On the one hand, as shown in FIG. 48, in the oil pressure switching mechanism 90, when the oil pressure supply source 50 is communicated with the oil path 92 due to the three-way valve 91, the oil pressure supplied to the oil pressure supply path 59 becomes higher. In the present embodiment, the oil pressure at this time is made a pressure higher than the second threshold value. Therefore, since the oil pressure at this time is higher than the first threshold value, in the same way as the state shown in FIG. 47, the switching pin 81 is positioned at the first position against the first biasing spring 82.

As a result, the flow direction switching mechanism 35 is in the first state and the hydraulic piston 33b rises. Further, since the oil pressure at this time is higher than the second threshold value, as shown in FIG. 48, the stop member 39b is arranged at the projecting position. As a result, the turn angle of the eccentric member 32 in the direction shown by the arrow in FIG. 46B becomes slightly smaller than the state shown in FIG. 46A. Due to this, the position of the piston pin receiving opening 32d falls from the position raised the most. Therefore, compared with the state shown in FIG. 46A, the effective length of the connecting rod 6e becomes shorter and becomes L2 in the figure. As a result, the mechanical compression ratio in the internal combustion engine 1 becomes lower than the state shown in FIG. 46A.

On the other hand, as shown in FIG. 49, in the oil pressure switching mechanism 90, when the oil pressure supply source 50 is communicated with the oil path 94 due to the three-way valve 91, the oil pressure supplied to the oil pressure supply path 59 becomes lower. In the present embodiment, the oil pressure at this time is made a pressure lower than the first threshold value. Therefore, the oil pressure at this time is lower than the first threshold value, so, as shown in FIG. 49, the switching pin 81 is positioned at the second position by the biasing force of the first biasing spring 82. As a result, in the same way as the third embodiment, the flow of hydraulic oil from the hydraulic cylinder 33a to the outside space of the connecting rod 6e is permitted, while the flow of hydraulic oil from the oil pressure supply source 50 to the hydraulic cylinder 33a is prohibited. Therefore, when the switching pin 81 is positioned at the second position, the flow direction switching mechanism 35 is in the second state where it prohibits the flow of hydraulic oil from the oil pressure supply source 50 to the hydraulic cylinder 33a and permits the flow of hydraulic oil from the hydraulic cylinder 33a to the outside space of the connecting rod 6e.

At this time, hydraulic oil is discharged from the hydraulic cylinder 33a to the outside space of the connecting rod 6e and the hydraulic piston 33b descends. Further, at this time, the stop member 39b is not being supplied with oil pressure, so as shown in FIG. 49, the stop member 39b is arranged at the retracted position. As a result, as shown in FIG. 46C, the eccentric member 32 is turned up to the position turned the most in the direction of the arrow in the figure. Due to this, the piston pin receiving opening 32d descends the most in position. Therefore, the effective length of the connecting rod 6e becomes the shortest and becomes L3 in the figure. As a result, the mechanical compression ratio in the internal combustion engine 1 becomes the lowest.

In the present embodiments, as explained above, the flow direction switching mechanism 35 and stop device 39 can be used to switch the turn position of the eccentric member 32 to three stages. As a result, in the present embodiment, the effective length of the variable length connecting rod can be switched to three stages.

Note that, in this Description, rise of the piston 5 means movement of the piston 5 so as to approach the cylinder head 4, while descent of the piston 5 means movement of the piston 5 so as to separate from the cylinder head 4. Further, rise of the hydraulic pistons 33b, 34b means movement of the hydraulic pistons 33b, 34b so as to approach the small diameter end part 31b of the connecting rod body 31, while descent of the hydraulic pistons 33b, 34b means movement of the hydraulic pistons 33b, 34b so as to separate from the small diameter end part 31b.

Other Embodiments

Above, preferred embodiments of the present invention were explained, but the present invention is not limited to these embodiments and can be modified and changed in various ways within the language of the claims.

In the above-mentioned embodiments, when the switching pin is supplied with a predetermined pressure or more of oil pressure, the effective length of the connecting rod is made longer and the mechanical compression ratio in the internal combustion engine is made a high compression ratio, while when the switching pin is supplied with less than the predetermined pressure of oil pressure or the switching pin is not supplied with oil pressure, the effective length of the connecting rod is made shorter and the mechanical compression ratio in the internal combustion engine is made a low compression ratio. However, when the switching pin is supplied with less than the predetermined pressure of oil pressure or the switching pin is not supplied with oil pressure, the effective length of the connecting rod may be made longer and the mechanical compression ratio in the internal combustion engine may be made a high compression ratio. On the one hand, when the switching pin is supplied with a predetermined pressure or more of oil pressure, the connecting rod may be made shorter in effective length and the mechanical compression ratio in the internal combustion engine may be made a low compression ratio.

Further, so long as it is possible to switch the flow of hydraulic oil to the hydraulic cylinder by movement of a single switching pin, the detailed configurations of the first oil path to fourth oil path, check valve, and switching mechanism are not limited to the above-mentioned configuration.

For example, when the switching pin 81 is switched between the first position and the second position, instead of moving in the axial line direction, the switching pin 81 may turn in the circumferential direction. In this case, for example, the switching pin 81 is formed with a first through hole for making a first piston communicating oil path 51 and a first space communicating oil path 55 communicate at a first turn position, a second through hole for making a fourth piston communicating oil path 54 and a fourth space communicating oil path 58 communicate at the first turn position, a third through hole for making a second piston communicating oil path 52 and a second space communicating oil path 56 communicate at a second turn position, and a fourth through hole for making a third piston communicating oil path 53 and a third space communicating oil path 57 communicate at the second turn position.

Further, the switching pin 81 may move in a direction different from the center axial line of the crank receiving opening 41 when switched between the first position and the second position. For example, the switching pin 81 may move in the width direction or axial line direction of the connecting rod body 31 when switched between the first position and the second position. Further, the switching pin 81 may be switched between the first position and the second position by a mechanical mechanism (for example, a cam mechanism) instead of oil pressure.

Further, the above embodiments may be combined in any way when worked. For example, in the third embodiment to fifth embodiment, as shown in the sixth embodiment, the variable length connecting rod may comprise the stop device 39, and the hydraulic oil path 66 may be formed inside the connecting rod body 31.

Further, the variable length connecting rod in the third embodiment to sixth embodiment may be changed as shown in the second embodiment. Specifically, in the third embodiment, fourth embodiment, and sixth embodiment, there may be a single first oil path making the hydraulic cylinder 33*a* and the pin holding space 47 communicate and the switching pin 81 may be formed with the first communication groove 81*f*. Further, in the fifth embodiment, there may be a single first oil path making the hydraulic cylinder 33*a* and the pin holding space 47 communicate, there may be a single second oil path making the hydraulic mechanism (storage chamber 38) and the pin holding space 47 communicate, and the switching pin 81 may be formed with the first communication groove 81*f* and second communication groove 81*g*.

REFERENCE SIGNS LIST 1. internal combustion engine
6, 6*a*, 6*b*, 6*c*, 6*d*, 6*e*. variable length connecting rod
21. piston pin
22. crank pin
31. connecting rod body
31*a*. large diameter end part
31*b*. small diameter end part
32. eccentric member
32*d*. piston pin receiving opening
33*a*. first hydraulic cylinder, hydraulic cylinder
33*b*. first hydraulic piston, hydraulic piston
34*a*. second hydraulic cylinder
34*b*. second hydraulic piston
38. storage chamber
35. flow direction switching mechanism
41. crank receiving opening
42. sleeve receiving opening
47. pin holding space
50. oil pressure supply source
51. first piston communicating oil path
52. second piston communicating oil path
53. third piston communicating oil path
54. fourth piston communicating oil path
55. first space communicating oil path
56. second space communicating oil path
57. third space communicating oil path
58. fourth space communicating oil path
59. oil pressure supply path
60. fifth piston communicating oil path
61. sixth piston communicating oil path
62. discharge oil path
62*a*. first discharge oil path
62*b*. second discharge oil path
70. check valve
80. switching mechanism
81. switching pin

The invention claimed is:
1. A variable length connecting rod comprising:
a connecting rod body provided with a crank receiving opening for receiving a crank pin;
an eccentric member provided with a piston pin receiving opening for receiving a piston pin and attached to the connecting rod body to be able to turn so as to make a length between a center of the piston pin receiving opening and a center of the crank receiving opening change;
a hydraulic cylinder formed at the connecting rod body and supplied with hydraulic oil;
a hydraulic piston sliding inside the hydraulic cylinder and moving in linkage with the eccentric member;
a flow direction switching mechanism provided at the connecting rod body; and
a hydraulic mechanism handling the hydraulic oil separate from the hydraulic cylinder, the hydraulic piston, and the flow direction switching mechanism, wherein the flow direction switching mechanism comprises a single check valve and a single switching mechanism, the check valve is configured to permit a flow of hydraulic oil from a primary side of the check valve to a secondary side of the check valve and prohibit the flow of hydraulic oil from the secondary side to the primary side, the switching mechanism comprises a single switching pin, the switching pin is held in a pin holding space formed in the connecting rod body, the connecting rod body is formed with a first oil path making the hydraulic cylinder and the pin holding space communicate, a second oil path making the hydraulic mechanism or the hydraulic mechanism and an outside space of the variable length connecting rod, and the pin holding space communicate, a third oil path making the primary side of the check valve and the pin holding space communicate, and a fourth oil path making the secondary side of the check valve and the pin holding space communicate, and the switching pin is configured to be switched between a first position making the first oil path communicate with the fourth oil path and making the second oil path communicate with the third oil path, and a second position making the first oil path communicate with the third oil path and making the second oil path communicate with the fourth oil path.

2. The variable length connecting rod according to claim 1, wherein the switching pin linearly moves when switched between the first position and the second position.

3. The variable length connecting rod according to claim 2, wherein the switching pin moves in parallel with a center axial line of the crank receiving opening when switched between the first position and the second position.

4. The variable length connecting rod according to claim 2, wherein the switching pin has a columnar shape and the switching mechanism further comprises a turn preventing member preventing the switching pin from turning in a circumferential direction.

5. The variable length connecting rod according to claim 1, wherein the switching pin is switched between the first position and the second position by oil pressure supplied from outside of the connecting rod body.

6. The variable length connecting rod according to claim 1, wherein the hydraulic mechanism is a separate hydraulic cylinder formed at the connecting rod body and supplied with hydraulic oil, the variable length connecting rod further comprises a separate hydraulic piston sliding inside the separate hydraulic cylinder and moving in linkage with the eccentric member, and the second oil path is formed so as to make the separate hydraulic cylinder and the pin holding space communicate.

7. The variable length connecting rod according to claim 1, wherein the hydraulic mechanism is a storage chamber able to store hydraulic oil, and the second oil path is formed so as to make the storage chamber and the pin holding space communicate.

8. The variable length connecting rod according to claim 1, wherein the hydraulic mechanism is an oil pressure supply source arranged at an outside of the connecting rod body and supplying hydraulic oil to the hydraulic cylinder, the second oil path is a supply oil path for making the oil pressure supply source and the pin holding space communicate and a discharge oil path for making an outside space of the variable length connecting rod and the pin holding space communicate, and the switching pin is configured to be switched between a first position making the first oil path communicate with the fourth oil path and making the supply oil path communicate with the third oil path, and a second position making the first oil path communicate with the third oil path and making the discharge oil path communicate with the fourth oil path.

9. The variable length connecting rod according to claim 8, further comprising a backflow prevention mechanism arranged at the discharge oil path, wherein the backflow prevention mechanism is configured to permit movement of hydraulic oil from the flow direction switching mechanism to the outside space and prohibit movement of oil from the outside space to the flow direction switching mechanism when the switching pin is at the second position.

10. The variable length connecting rod according to claim 1, wherein the number of the first oil path is one.

11. The variable length connecting rod according to claim 1, wherein the number of the first oil path is one, and the number of the second oil path is one.

12. The variable length connecting rod according to claim 1, wherein the first oil path is formed on the same straight line as the third oil path or the fourth oil path.

13. The variable length connecting rod according to claim 1, wherein the first oil path is formed on the same straight line as the third oil path or the fourth oil path, and the second oil path is formed on the same straight line as the third oil path or the fourth oil path.

14. A variable length connecting rod according to claim 7, further comprising a stop device configured to switch a stop position of turning of the eccentric member in one direction to two stages by oil pressure supplied from an outside of the connecting rod body.

15. A variable compression ratio internal combustion engine able to change a mechanical compression ratio, comprising a variable length connecting rod according to claim 1, wherein the mechanical compression ratio is changed by changing a length between a center of the piston pin receiving opening and a center of the crank receiving opening by the variable length connecting rod.

* * * * *